United States Patent
Mine et al.

(10) Patent No.: US 9,514,515 B2
(45) Date of Patent: Dec. 6, 2016

(54) IMAGE PROCESSING DEVICE, IMAGE PROCESSING METHOD, IMAGE PROCESSING PROGRAM, AND IMAGE DISPLAY DEVICE

(71) Applicant: Sharp Kabushiki Kaisha, Osaka-shi, Osaka (JP)

(72) Inventors: Takashi Mine, Osaka (JP); Yoshimitsu Murahashi, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/770,621

(22) PCT Filed: Feb. 14, 2014

(86) PCT No.: PCT/JP2014/053561
§ 371 (c)(1),
(2) Date: Aug. 26, 2015

(87) PCT Pub. No.: WO2014/136552
PCT Pub. Date: Sep. 12, 2014

(65) Prior Publication Data
US 2016/0005148 A1 Jan. 7, 2016

(30) Foreign Application Priority Data
Mar. 8, 2013 (JP) ................................. 2013-047244

(51) Int. Cl.
G06K 9/40 (2006.01)
G06T 3/40 (2006.01)
H04N 5/21 (2006.01)
H04N 5/14 (2006.01)
(Continued)

(52) U.S. Cl.
CPC ............ G06T 3/403 (2013.01); G06T 3/4069 (2013.01); G06T 5/002 (2013.01); G06T 5/003 (2013.01);
(Continued)

(58) Field of Classification Search
CPC ..... G06T 3/403; G06T 3/4069; G06T 5/002; G06T 5/003; G06T 7/0085; G06T 2200/12; G06T 2207/20136; G06T 2207/20182; G06T 2207/20192; H04N 1/3935; H04N 1/4092; H04N 5/142; H04N 5/21
USPC ....... 382/131, 275, 261, 262, 265, 269, 264, 382/235, 239; 348/618, 242
See application file for complete search history.

(56) References Cited

U.S. PATENT DOCUMENTS 8,553,150 B2 * 10/2013 Sawada ..................... H04N 5/57
348/571
2003/0197867 A1* 10/2003 Kwon .................... G01N 21/59
356/437

(Continued)

FOREIGN PATENT DOCUMENTS

JP 08-163408 A 6/1996
JP 2004336652 A * 11/2004 ............... H04N 5/21

(Continued)

OTHER PUBLICATIONS

Official Communication issued in International Patent Application No. PCT/JP2014/053561, mailed on Apr. 28, 2014.

*Primary Examiner* — Mekonen Bekele
(74) *Attorney, Agent, or Firm* — Keating & Bennett, LLP

(57) ABSTRACT

Provided is an image processing device capable of performing appropriate noise removal or reduction on input images of various resolution. The image processing device includes a contour direction estimating unit (21) that estimates a contour direction in which a signal value is a constant value for each pixel, a low pass filter unit (20a) that smoothes the signal value of the pixel based on the signal value of each reference pixel serving as a pixel of a reference region according to the pixel and arranged in the contour direction of the pixel estimated by the contour direction estimating unit for each pixel, and a parameter deciding unit (20b) that decides intensity of smoothing by the low pass filter unit according to an enlargement factor obtained based on a ratio of resolution of an input image signal and resolution of an output image signal.

3 Claims, 31 Drawing Sheets

(51) Int. Cl.
  *H04N 1/393* (2006.01)
  *H04N 1/409* (2006.01)
  *G06T 5/00* (2006.01)
  *G06T 7/00* (2006.01)
(52) U.S. Cl.
  CPC ........... *G06T 7/0085* (2013.01); *H04N 1/3935* (2013.01); *H04N 1/4092* (2013.01); *H04N 5/142* (2013.01); *H04N 5/21* (2013.01); *G06T 2200/12* (2013.01); *G06T 2207/20136* (2013.01); *G06T 2207/20182* (2013.01); *G06T 2207/20192* (2013.01)

(56) References Cited

U.S. PATENT DOCUMENTS

| | | | |
|---|---|---|---|
| 2004/0101058 A1* | 5/2004 | Sasai | H04N 7/014 375/240.26 |
| 2005/0276506 A1 | 12/2005 | Kwon et al. | |
| 2006/0232690 A1* | 10/2006 | Tamura | H04N 9/045 348/242 |
| 2007/0229710 A1* | 10/2007 | Park | H04N 19/86 348/618 |
| 2008/0025622 A1* | 1/2008 | Hanamoto | G06T 3/4007 382/235 |
| 2009/0316047 A1 | 12/2009 | Sawada et al. | |
| 2015/0228058 A1* | 8/2015 | Murahashi | H04N 1/4092 382/254 |

FOREIGN PATENT DOCUMENTS

| | | |
|---|---|---|
| JP | 2005-353068 A | 12/2005 |
| JP | 2008-033692 A | 2/2008 |
| JP | 2010-004467 A | 1/2010 |
| JP | 2010-093856 A | 4/2010 |

* cited by examiner

PIXEL OF INTEREST 63 y DIRECTION PARTIAL DIFFERENTIAL 70

FIG. 35
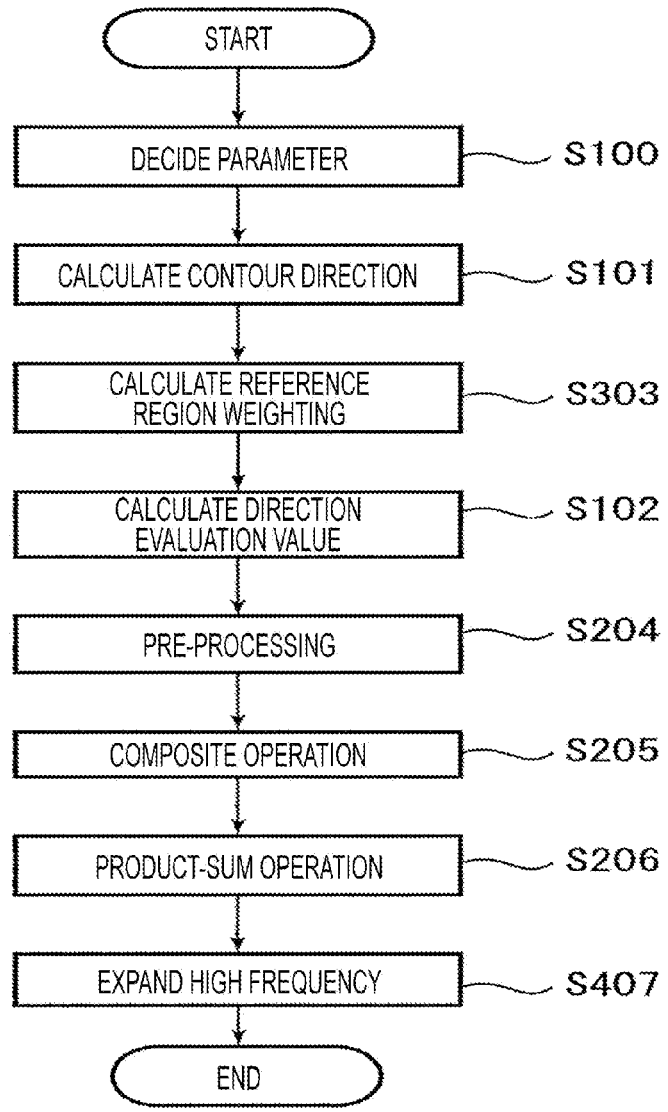
FIG. 36
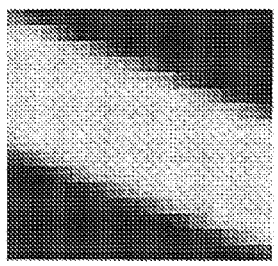
IMAGE 86
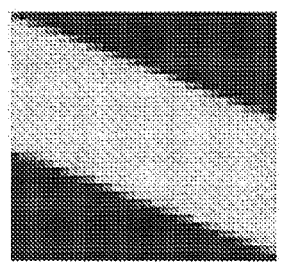
IMAGE 87
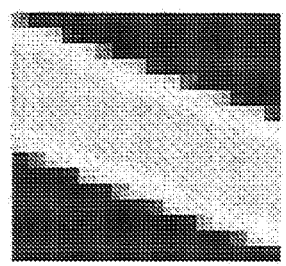
IMAGE 88

FIG. 37
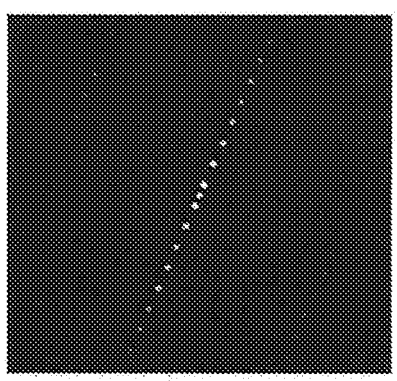
IMAGE 89
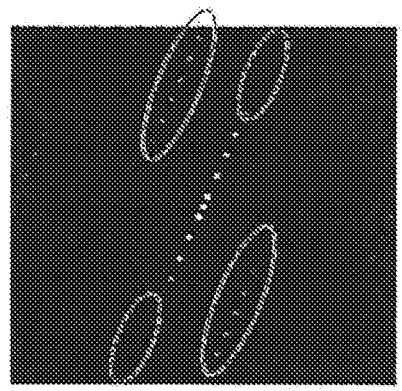
IMAGE 90
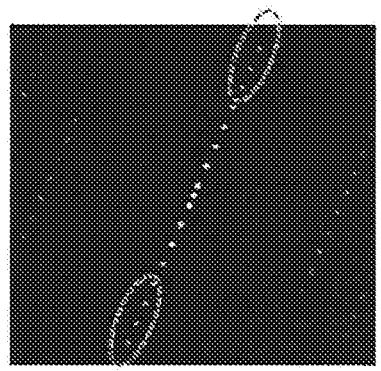
IMAGE 91
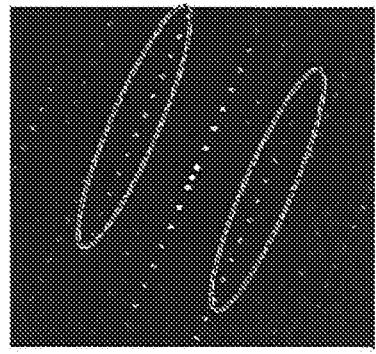
IMAGE 92

IMAGE PROCESSING DEVICE, IMAGE PROCESSING METHOD, IMAGE PROCESSING PROGRAM, AND IMAGE DISPLAY DEVICE

TECHNICAL FIELD

The present invention relates to an image processing device that performs image conversion according to resolution.

BACKGROUND ART

There is a demand for effectively utilizing image content by enabling image content with the spread of an information communication technology to be viewed under a condition different from a condition when created. For example, in an Internet protocol television (IPTV) or the like, there are cases in which image content (a so-called network moving image) of relatively low resolution that is originally created to be viewed through a mobile terminal device or the like is displayed on an image display device of high resolution. Here, image content having resolution of 640 pixels (a horizontal direction)×360 pixels (a vertical direction) is displayed on a display that supports a full high definition (HD) standard of 1920 pixels (the horizontal direction)×1080 pixels (the vertical direction). In this case, resolution may be converted into high resolution by interpolating a signal value of each pixel included in image content between pixels (this is also referred to as up-scaling or up-convert).

There are cases in which the following noises are remarkably shown in an image whose resolution is increased:

(1) jaggy: a step-like contour shown in a slant line or a curved line;

(2) mosquito noise: wave-like noise shown in a portion in which a contrasting density or color signal value abruptly changes or its vicinity when a compression-coded code is decoded; and (3) dot interference: noise shown in a granular form in a boundary in which a color changes when separation (YC separation) of a brightness signal and a color-difference signal from a composite signal is inappropriate.

In this regard, in the past, an attempt to cause a signal value interpolated into an image having an increased resolution to be subject to a low pass filter and reduce noise has been made. For example, in a processing device disclosed in JP 2005-353068 A, a window of a certain size is set on an input current frame/field based on a current pixel, an eigenvalue and an eigenvector used to determine characteristics of the window are calculated, the characteristics of the window are determined based on the calculated eigenvalue, a filtering weighted value to be applied is decided based on the determination result, and filtering is performed on the window based on the calculated eigenvector and the decided filtering weighted value.

In addition, an attempt to perform image sharpening (which is also referred to as "emphasis/enhancement") by emphasizing information of a high frequency component of an interpolated signal value has been made.

Further, an image processing device that performs image conversion according to a type of a broadcast wave of video has been proposed. For example, an image processing device disclosed in JP 2010-93856 A includes an image converting unit that converts a first video signal having first resolution into a second video signal having second resolution higher than the first resolution according to a parameter indicating a ratio of pixels of a high frequency component to be inserted into pixels of the first video signal and a control unit that performs control such that the parameter is changed according to a type of a broadcast wave of the first video signal.

SUMMARY OF INVENTION

Technical Problem

As described above, it is effective to perform a noise reduction process and an image sharpening process on an image having resolution. However, when the noise reduction process and the image sharpening process are performed on an image that is originally high in resolution and low in an interpolation process level or an image that has not undergone an interpolation process, an effect is reduced, and an artifact occurs instead.

Solution to Problem

The present invention was made in light of the foregoing, and it is desirable to provide an image processing device capable of performing appropriate noise removal or reduction on input images of various resolution.

An image processing device disclosed herein includes: a contour direction estimating unit that estimates a contour direction in which a signal value is a constant value for each pixel; a low pass filter unit that smoothes the signal value of the pixel based on the signal value of each reference pixel serving as a pixel of a reference region according to the pixel and arranged in the contour direction of the pixel estimated by the contour direction estimating unit for each pixel; and a parameter deciding unit that decides intensity of smoothing by the low pass filter unit according to an enlargement factor obtained based on a ratio of resolution of an input image signal and resolution of an output image signal.

Advantageous Effects of Invention

According to the present invention, it is possible to perform appropriate noise removal or reduction on input images of various resolution.

BRIEF DESCRIPTION OF DRAWINGS

FIG. 35 is a flowchart illustrating image processing according to the present modified example.

FIG. 36 illustrates an example of an image related to a brightness signal before and after processing is performed.

FIG. 37 illustrates an example of a spatial frequency characteristic of an image before and after processing is performed.

MODE FOR CARRYING OUT THE INVENTION

Figure 1:
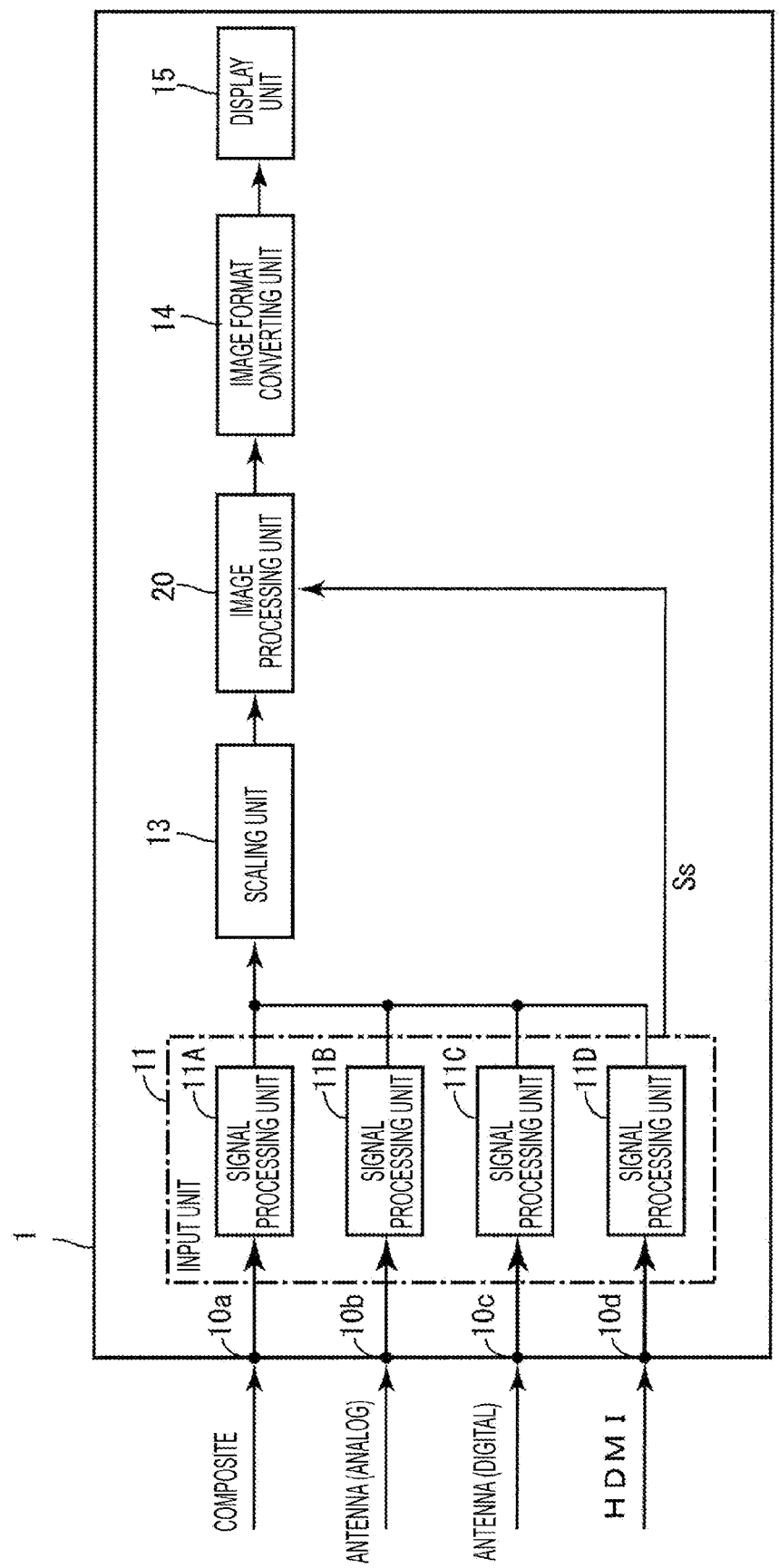
FIG. 1 is a schematic diagram illustrating a configuration of a display device according to a first embodiment of the invention.

An image processing device according to an embodiment of the present invention includes a contour direction estimating unit that estimates a contour direction in which a signal value is a constant value for each pixel, a low pass filter unit that smoothes the signal value of the pixel based on the signal value of each reference pixel serving as a pixel of a reference region according to the pixel and arranged in the contour direction of the pixel estimated by the contour direction estimating unit for each pixel, and a parameter deciding unit that decides intensity of smoothing by the low pass filter unit according to an enlargement factor obtained based on a ratio of resolution of an input image signal and resolution of an output image signal (a first configuration).

According to the above configuration, the signal value of each pixel is smoothed in the contour direction, and a noise in the contour direction which is visually sensitive is removed or reduced. Further, according to the above configuration, the image processing device can change intensity of smoothing according to the enlargement factor.

In the first configuration, a plurality of input terminals to which the input image signal is input may be further provided, and the parameter deciding unit may determine the resolution of the input image signal based on a type of the input terminal to which the input image signal is input among the plurality of input terminals (a second configuration).

In the first configuration, a scaling unit that obtains a resolution ratio serving as the ratio of the resolution of the input image signal and the resolution of the output image signal, performs interpolation of the input image based on the resolution ratio, and outputs the resolution ratio to the parameter deciding unit may be further provided, and the parameter deciding unit may use the resolution ratio as the enlargement factor (a third configuration).

In the first configuration, a plurality of input terminals to which the input image signal is input and a scaling unit that obtains a resolution ratio serving as the ratio of the resolution of the input image signal and the resolution of the output image signal, performs interpolation of the input image based on the resolution ratio, and outputs the resolution ratio to the parameter deciding unit may be further provided, and the parameter deciding unit may determine the resolution of the input image signal based on a type of the input terminal when the resolution of the input image signal is determined to be unique based on the type of the input terminal to which the input image signal is input among the plurality of input terminals and use the resolution ratio as the enlargement factor when the resolution of the input image signal is determined to be unique based on the type of the input terminal to which the input image signal is input among the plurality of input terminals (a fourth configuration).

In any one of the first to fourth configurations, preferably, a high frequency expanding unit that generates a high frequency component of the signal value of the pixel for each pixel, and expands a frequency band for the signal value of the pixel is further provided, and the parameter deciding unit decides intensity of processing by the high frequency expanding unit according to the enlargement factor (a fifth configuration).

According to the above configuration, the high frequency component of the smoothed signal value is compensated by the high frequency expanding unit. Thus, it is possible to sharpen an image while avoiding or suppressing a noise caused by aliasing. Further, according to the above configuration, the image processing device can change intensity of sharpness according to the enlargement factor.

EMBODIMENTS

Hereinafter, embodiments will be described with reference to the appended drawings.

First Embodiment

FIG. 1 is a schematic diagram illustrating a configuration of a display device 1 according to a first embodiment of the invention.

The display device 1 includes input terminals 10a to 10d, an input unit 11, a scaling unit 13, an image processing unit 20, an image format converting unit 14, and a display unit 15.

Signals are input from the outside to the input terminals 10a to 10d. Examples of the signals input to the input terminals 10a to 10d include a composite video signal, a high frequency signal related to analog television broadcasting, a high frequency signal related to digital television broadcasting, and a signal related to high-definition multimedia interface (HDMI).

The input unit 11 includes signal processing units 11A to 11D according to types of signals input to the input terminals 10a to 10d. Each of the signal processing units 11A to 11D converts the input signal into a certain image signal including a digital brightness signal Y, a digital color-difference signal Cb, and a digital color-difference signal Cr.

For example, the signal processing unit 11B extracts a modulation signal related to a channel designated from the high frequency signal input from the antenna (analog), and converts the extracted modulation signal into a modulation signal of a base frequency band. The signal processing unit 11B demodulates the converted modulation signal to generate an image signal, and separates the analog brightness signal Y, the analog color-difference signal Cb, and the analog color-difference signal Cr from the generated image signal. The signal processing unit 11B converts the separated signals from the analog signals to digital signals at a predetermined sampling frequency.

The input unit 11 selects one of a plurality of signals input to the input unit 11, converts the input signal through one of the signal processing units 11A to 11D, and outputs the converted signal to the scaling unit 13. At this time, the input unit 11 outputs a signal Ss of identifying the selected input signal to the image processing unit 20.

When the resolution (the number of pixels) of the image signal input from the input unit 11 is different from the resolution of the display unit 15, the scaling unit 13 adjusts (scales) the resolution of the input image signal so that the resolution of the image signal is equal to the resolution of the display unit 15. When the resolution of the display unit 15 is higher than the resolution of the input image, the scaling unit 13 performs interpolation on the input image signal. When the resolution of the display unit 15 is lower than the resolution of the input image, the scaling unit 13 performs down sampling on the input image signal. For example, the scaling unit 13 uses a scheme such as a bicubic technique or a bilinear technique as a scheme for interpolation or down sampling. The scaling unit 13 outputs the image signal having the adjusted resolution to the image processing unit 20. When the resolution of the input image signal is equal to the resolution of the display unit 15, the input image signal is output to the image processing unit 20.

In the following description, a ratio of the number of pixels of the display unit 15 in the horizontal direction (or the vertical direction) to the number of pixels of the input image signal in the horizontal direction (or the vertical direction) is referred to as an enlargement factor. For example, when the resolution of the input image signal is 640 pixels (the horizontal direction)×360 pixels (the vertical direction), and the resolution of the display unit 15 is 1920 pixels (the horizontal direction)×1080 pixels (the vertical direction), the enlargement factor is 3.

The image processing unit 20 performs processing related to noise reduction and image sharpening on the brightness signal Y among the image signals input from the scaling unit 13, and generates a brightness signal Z indicating an image obtained by the noise reduction and the sharpening. The image processing unit 20 updates the brightness signal Y input from the scaling unit 13 to the generated brightness signal Z, and synchronizes the brightness signal Z with the color-difference signals Cb and Cr. The image processing unit 20 outputs an image signal including the brightness signal Y" and the color-difference signals Cb and Cr to the image format converting unit 14. A configuration of the image processing unit 20 will be described later.

The image format converting unit 14 converts a format of the image signal input from the image processing unit 20. When the input image signal is an interlace signal, the image format converting unit 14 converts the format of the image signal into a progressive signal. The interlace signal is a signal obtained by scanning pixels in every other columns in the horizontal direction of the pixel, and a signal in which a scanning target column differs according to a frame. The progressive signal is a signal obtained by scanning pixels in every column in the horizontal direction of the pixel. The image format converting unit 14 converts the input image signal or the image signal having the converted format into an image signal (for example, an RGB signal: an image signal including signal values of red (R), green (G), and blue (B) colors) represented by a color system supported by the display unit 15, and outputs the converted image signal to the display unit 15.

The display unit 15 displays an image indicated by the image signal input from the image format converting unit 14. For example, the display unit 15 is a liquid crystal display (LCD) of a full high definition (which is also referred to as full HD) scheme, that is, an LCD having resolution of 1920 pixels (the horizontal direction)×1080 pixels (the vertical direction). The display unit 15 includes pixel elements of red, green, and blue colors that are arranged two-dimensionally. As a result, the display unit 15 emits, for example, backlight light through the pixel elements at a brightness according to signal values of the pixels indicated by the input image signal, and displays a color image.

(Configuration of Image Processing Unit 20)

Next, a configuration of the image processing unit 20 will be described.

Figure 2:
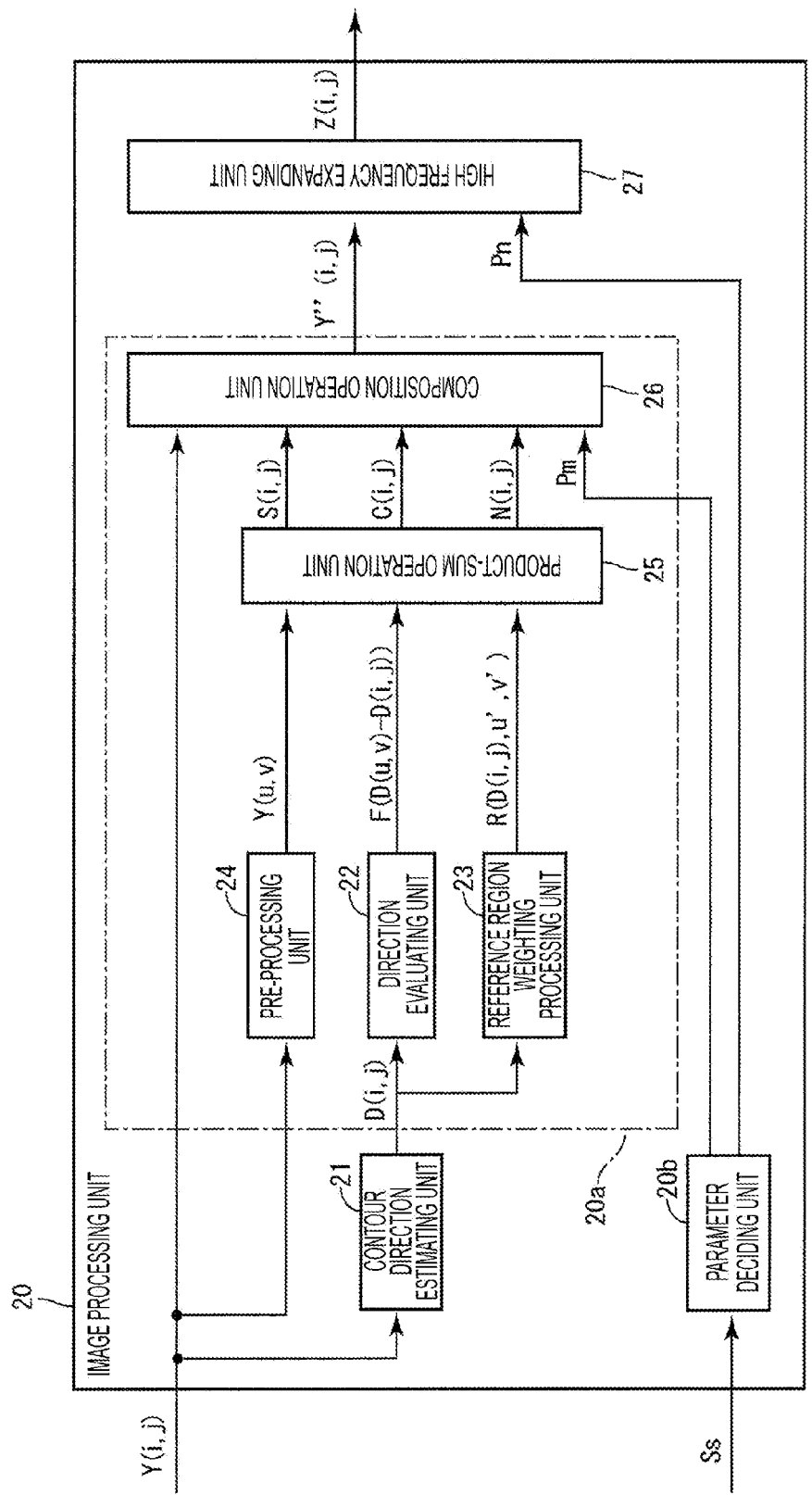
FIG. 2 is a schematic diagram illustrating a configuration of an image processing unit according to the present embodiment.

FIG. 2 is a schematic diagram illustrating a configuration of the image processing unit 20 according to the present embodiment.

The image processing unit 20 is configured to include a contour direction estimating unit 21, a low pass filter unit 20a, a parameter deciding unit 20b, and a high frequency expanding unit 27.

The contour direction estimating unit 21 estimates the contour direction for each pixel based on the signal value (the brightness value) of each pixel. The low pass filter unit 20a filters the signal value of each pixel using the signal value of each reference pixel that is arranged in the contour direction of each pixel estimated by the contour direction estimating unit 21 and in the predetermined reference region from each pixel.

The high frequency expanding unit 27 generates a high frequency component of the signal value of each pixel filtered by the low pass filter unit 20a, and expands the frequency band of the signal value of each pixel.

The parameter deciding unit 20b decides a parameter Pm and a parameter Pn based on the signal Ss. The parameter deciding unit 20b outputs the parameter Pm to the low pass filter unit 20a, and outputs the parameter Pn to the high frequency expanding unit 27.

The parameter Pm is a parameter of deciding a degree in which an effect of processing by the low pass filter unit 20a is reflected. For example, the parameter Pm has a value of $0 \leq Pm \leq 1$. As the value of Pm gets closer to 1, the effect of processing by the low pass filter unit 20a is increased, and when Pm=0, the effect of processing by the low pass filter unit 20a is not reflected.

The parameter Pn is a parameter of deciding a degree in which an effect of processing by the high frequency expanding unit 27 is reflected. For example, the parameter Pn has a value of $0 \leq Pn \leq 1$. As the value of Pn gets closer to 1, the effect of processing by the high frequency expanding unit 27 is increased, and when Pn=0, the effect of processing by the high frequency expanding unit 27 is not reflected.

The parameter deciding unit 20b decides a value that gets closer to 1 as the parameter Pm and the parameter Pn as the enlargement factor in the scaling is increased. In other words, the parameter Pm and the parameter Pn are decided such that when the enlargement factor is large, the effects of processing by the low pass filter unit 20a and the high frequency expanding unit 27 are strongly reflected, whereas when the enlargement factor is small, the effects of processing by the low pass filter unit 20a and the high frequency expanding unit 27 are less reflected. Here, even when the enlargement factor is 1 (when the interpolation and the like are not performed), it is desirable to decide a larger value than 0 as the parameter Pm and the parameter Pn in order to enhance by removing a fine noise.

In the present embodiment, the parameter deciding unit 20b decides the parameters Pm and Pn based on the signal Ss input from the input unit 11 to the parameter deciding unit 20b. More specifically, the parameter deciding unit 20b includes a memory (not illustrated). A table of the value of the parameter Pm according to the signal Ss and the value of the parameter Pn according to the signal Ss which are set in advance is stored in the memory. The parameter deciding unit 20b decides the parameter Pm and the parameter Pn with reference to the table.

An example of a relation among an input terminal (terminal), input resolution, and intensity of processing (processing intensity) by the low pass filter unit 20a and the high frequency expanding unit 27 is shown in Table 1.

TABLE 1

| Terminal | Input resolution | Processing intensity |
|---|---|---|
| Composite | SD | Strong |
| Antenna (analog) | SD | Strong |
| Antenna (digital) | SD | weak |
| HDMI | SD to HD | weak |

The resolution of input signals from the composite terminal and the antenna (analog) terminal is a standard definition (SD) of 720×480 pixels. Further, it is possible to determine whether an input signal from the antenna terminal is an analog signal or a digital signal in a tuner. When the resolution of the display unit 15 is HD, the enlargement factor is 2.67 or 2.25. The parameter deciding unit 20b decides the parameters so that processing by the low pass filter unit 20a and the high frequency expanding unit 27 is enhanced in order to reduce a noise such as a jaggy associated with scaling (up-scaling) from SD to HD. Specifically, a certain value (for example, 0.9) close to 1 is set to the table stored in the memory of the parameter deciding unit 20b as the values of the parameter Pm and Pn for the composite terminal and the antenna (analog) terminal.

The resolution of an input signal from the antenna (digital) terminal is HD. When the resolution of the display unit 15 is HD, the enlargement factor is 1. When the enlargement factor is 1 or when the enlargement factor is close to 1, a noise generated by up-scaling is small. When the effects of processing by the low pass filter unit 20a and the high frequency expanding unit 27 are strongly reflected on the image, it may cause an artifact contrarily. For this reason, the parameter deciding unit 20b decides the parameters so that intensity of processing by the low pass filter unit 20a and the high frequency expanding unit 27 is decreased. Specifically, for example, a certain value (for example, 0.9) close to 1 is set to the table stored in the memory of the parameter deciding unit 20b as the values of the parameter Pm and Pn for the composite terminal and the antenna (analog) terminal.

An input signal from the HDMI terminal may have a wide range of resolution of SD to HD. As described above, processing by the low pass filter unit 20a and the high frequency expanding unit 27 is effective in removal of a noise associated with up-scaling but may cause an artifact when the enlargement factor is 1 or close to 1. Since the occurrence of an artifact is more undesirable than when a noise remains, in the example of Table 1, the parameter deciding unit 20b decides the parameters so that intensity of processing by the low pass filter unit 20a and the high frequency expanding unit 27 is decreased.

For example, the parameter deciding unit 20b may be configured to decide different values as the parameter Pm and the parameter Pn in order to obtain a desired image processing effect. For example, in order to generate an image in which a sense of fineness is strong felt, the parameter Pm may be set to a value smaller than the parameter Pn in the table stored in the memory of the parameter deciding unit 20b.

The low pass filter unit 20a is configured to include a direction evaluating unit 22, a reference region weighting processing unit 23, a pre-processing unit 24, a product-sum operation unit 25, and a composition operation unit 26.

The contour direction estimating unit 21 estimates a contour direction of each pixel based on a signal value of each pixel indicated by the brightness signal Y input from the scaling unit 13. The contour direction refers to a direction perpendicular to a normal line of a line serving as a contour, that is, a tangential direction of a line serving as a contour. A line serving as a contour represents a light indicating a space in which a signal value is substantially constant, and may be a curved line or a straight line. Thus, a contour is not limited to a region in which a signal value changes abruptly according to a change in a position. A relation between a line serving as a contour and a signal value corresponds to a relation between a contour line and an altitude. Since a position of each pixel is given discretely or influenced by noise around a contour serving as an improvement target in the invention such as jaggy, dot interference, and mosquito noise, there are cases in which it is difficult to decide a contour direction using a line passing between pixels having constant signal values as a line serving as a contour. Here, a signal value is assumed to be differentiable (that is, continuous) in a space representing coordinates of each pixel. The contour direction estimating unit 21 calculates a contour direction θ based on a differential value of a signal value in the horizontal direction or the vertical direction, for example, based on Formula (1) for each pixel.

[Mathematical Formula 1]

$$\theta = \tan^{-1}(-[\partial Y(x,y)/\partial x]/[\partial Y(x,y)/\partial y]) \quad (1)$$

In Formula (1), the contour direction θ is a counterclockwise angle based on the horizontal direction (the x direction). x and y are coordinates in the horizontal direction and the vertical direction, respectively. Y(x,y) is a signal value at the coordinates (x,y). In other words, the contour direction θ is calculated as an angle providing a tangent value obtained by dividing a partial differential of the signal value Y(x,y) in the x direction by a partial differential of the signal value Y(x,y) in the y direction. Formula (1) can be derived from a relation in which the signal value Y(x,y) is constant although the coordinates (x,y) are different. Here, $G_x(x,y)$ and $G_y(x,y)$ indicate the partial differential of the signal value Y(x,y) in the x direction and the partial differential of the signal value Y(x,y) in the y direction, respectively. In the following description, $G_x(x,y)$ and $G_y(x,y)$ are also referred to as an x direction partial differential and a y direction partial differential, respectively.

Unless otherwise set forth in the following description, a position (coordinates) of a pixel (i,j) indicates a center of gravity point of the pixel. A variable a in the position of the pixel is indicated by a(i,j) or the like.

For example, the contour direction estimating unit 21 calculates an x direction partial differential $G_x(i,j)$ and a y direction partial differential $G_y(i,j)$ of the signal value Y(i,j) of each pixel (i,j) using Formulae (2) and (3).

[Mathematical Formula 2]

$$G_x(i, j) = \sum_{u',v'} Y(u, v) W_x(u', v') \quad (2)$$

[Mathematical Formula 3]

$$G_y(i, j) = \sum_{u',v'} Y(u, v) W_y(u', v') \quad (3)$$

In Formulae (2) and (3), i and j are integer values indicating an index of a pixel of interest in the x direction and the y direction, respectively. A pixel of interest is a pixel attracting attention as a direct processing target. $W_x(u',v')$ and $W_y(u',v')$ indicate filter coefficients of the x direction and y direction differential filters, respectively. u and v are integer values indicating an index of a reference pixel in the x direction and the y direction, respectively. A reference pixel is a pixel that is in a range decided according to a predetermined rule based on a pixel of interest and referred to when processing on a pixel of interest is performed. A reference pixel includes a pixel of interest. u' and v' are integer values indicating an index of a reference pixel in the x direction and the y direction when a pixel of interest is assumed as an original point, respectively. Thus, u=i+u' and v=j+v' are held.

For example, the differential filter has the filter coefficients $W_x(u',v')$ and $W_y(u',v')$ for each of (u',v')s of a total of (2n+1)·(2n+1) reference pixels, that is, 2n+1 reference pixels in the x direction and 2n+1 reference pixels in the y direction. In the following description, a region to which the reference pixel given the filter coefficient belongs is also referred to as a reference region. n is an integer value (for example, 2) larger than 1. Here, the filter coefficients $W_x(u',v')$ and $W_y(u',v')$ are 1 for a reference pixel in a positive direction based on a pixel of interest, are 0 for a reference pixel having a coordinate value in the same differential direction (the x direction) as a pixel of interest, and are −1 for a reference pixel in a negative direction based on a pixel of interest. In other words, the filter coefficient $W_x(u',v')$ of the x direction differential filter is 1 (0<u' n), 0 (u'=0), or −1 (0>u'≥−n). The filter coefficient $W_y(u',v')$ of the y direction differential filter is 1 (0<v'≤n), 0 (v'=0), or −1 (0>v'≥−n). Further, n is an integer value that is equal to an enlargement factor of an image or larger than the enlargement factor. Thus, since the signal value is smoothed in the positive direction and the negative direction based on the pixel of interest, noise generated by changing resolution can be reduced. Here, when n is large and a reference pixel away from a pixel of interest is considered, there are cases in which a partial differential value serving as a local value originally is not properly calculated. Thus, n is decided to be a value smaller than a predetermined maximum value, for example, an integer value equal to an enlargement factor, an integer value obtained by rounding up a digit after a decimal point of an enlargement factor, or a value that is larger than any of the integer values by a predetermined value.

The contour direction estimating unit 21 quantizes the contour direction θ(i,j) calculated based on the calculated x direction partial differential $G_x(i,j)$ and the y direction partial differential $G_y(i,j)$, and calculates a quantization contour direction D(i,j) indicating the quantized contour direction. The contour direction estimating unit 21 calculates the quantization contour direction D(i,j), for example, using Formula (4).

[Mathematical Formula 4]

$$D(i, j) = \text{round}\left(\frac{N_d}{\pi} \tan^{-1}(G_y(i, j)/G_x(i, j))\right) \quad (4)$$

In Formula (4), round ( . . . ) is a rounding function that provides an integer value obtained by rounding off a digit after a decimal point of a real number . . . . $N_d$ is a constant indicating a number (a quantization contour direction number) of the quantized contour direction. For example, the quantization contour direction number $N_d$ is any of values of 8 to 32. Further, in order to avoid division by zero, when an absolute value $|G_x(i,j)|$ of the x direction partial differential $G_x(i,j)$ is smaller than a predetermined small real number value (for example, $10^{-6}$), $\pi/2$ is used as $\tan^{-1}$. In other words, the quantization contour direction $D(i,j)$ is indicated by any of integers of 0 to $N_d-1$ obtained by rounding a value obtained by dividing the contour direction $\theta$ by a quantization interval of $\pi/N_d$. As a result, a degree of freedom of the contour direction $\theta$ is restricted, and a processing load which will be described later is reduced.

The contour direction estimating unit 21 outputs quantization contour direction information indicating the calculated quantization contour direction $D(i,j)$ to the direction evaluating unit 22 and the reference region weighting processing unit 23.

The direction evaluating unit 22 calculates a direction evaluation value of each reference pixel belonging to a reference region centering on a pixel of interest based on the quantization contour direction of each pixel indicated by the quantization contour direction information input from the contour direction estimating unit 21 for each pixel of interest. Here, the direction evaluating unit 22 decides the direction evaluation value of the reference pixel such that as the difference between the quantization contour direction $D(i,j)$ of the pixel of interest $(i,j)$ and the quantization contour direction $D(u,v)$ of the reference pixel $(u,v)$ decreases, the direction evaluation value increases. For example, the direction evaluating unit 22 calculates a differential value $D=D(u,v)-D(i,j)$ between the quantization contour direction $D(i,j)$ for the pixel of interest $(i,j)$ and the quantization contour direction $D(u,v)$ for the reference pixel $(u,v)$. Here, when the differential value $D$ is 0, that is, when $D(u,v)$ is equal to $D(i,j)$, a direction evaluation value $F(|\Delta D|)$ is decided to be a maximum value 1. When the differential value $D$ is not 0, that is, when $D(u,v)$ is not equal to $D(i,j)$, the direction evaluation value $F(|\Delta D|)$ is decided to be a minimum value 0.

The direction evaluating unit 22 may decide the direction evaluation value $F(\Delta D)$ such that as the quantization contour direction $D(i,j)$ for the pixel of interest $(i,j)$ approximates to the quantization contour direction $D(u,v)$ for the reference pixel $(u,v)$, that is, as an absolute value $|\Delta D|$ of the differential value $D$ decreases, the direction evaluation value $F(\Delta D)$ increases. For example, the direction evaluating unit 22 decides $F(0)=1$, $F(1)=0.75$, $F(2)=0.5$, $F(3)=0.25$, and $F(|\Delta D|)=0(|\Delta D|>3)$.

When one of the quantization contour direction $D(i,j)$ and the quantization contour direction $D(u,v)$ is larger than $N_d/2$, and the other is smaller than $N_d/2$, since the absolute value $|\Delta D|$ increases although the respective contour directions approximate to each other, there are cases in which an erroneous direction evaluation value $F(\Delta D)$ is calculated. For example, when $D(i,j)$ is 7, and $D(u,v)$ is 0, $|\Delta D|$ is 7. However, the difference between the quantization contour directions is $\pi/8$, and $|\Delta D|$ has to be decided to be 1 originally. In this regard, when one of the quantization contour direction $D(i,j)$ and the quantization contour direction $D(u,v)$ is larger than $N_d/2$, the direction evaluating unit 22 adds $N_d$ to a value of the other quantization contour direction, and calculates a corrective value. The direction evaluating unit 22 calculates an absolute value of a differential value between the calculated corrective value and one quantization contour direction. As a result, a desired direction evaluation value is decided using the calculated absolute value as $|\Delta D|$ described above.

In the product-sum operation unit 25 which will be described later, as the direction evaluation value $F(|\Delta D|)$ is used, influence by the reference pixel $(u,v)$ having the contour direction different from the contour direction of the pixel of interest $(i,j)$ can be ignored or disregarded.

Even in the direction evaluating unit 22, the size of the reference region to which the reference pixel $(u,v)$ belongs, that is, the number of pixels in the horizontal direction or the vertical direction is preferably 2n+1 or larger. Further, the size of the reference region in the direction evaluating unit 22 may be different from the size of the reference region in the contour direction estimating unit 21. For example, the number of pixels of the reference region in the horizontal direction and the vertical direction in the direction evaluating unit 22 may be 7, respectively, whereas the number of pixels of the reference region in the horizontal direction and the vertical direction in the contour direction estimating unit 21 may be 5, respectively.

The direction evaluating unit 22 outputs direction evaluation value information indicating the direction evaluation value $F(\Delta D)$ of each reference pixel $(u,v)$ for each pixel of interest $(i,j)$ to the product-sum operation unit 25. An exemplary numerical value of the direction evaluation value $F(\Delta D)$ will be described later.

The reference region weighting processing unit 23 decides reference region weighting information for each pixel of interest $(i,j)$ based on the quantization contour direction $D(i,j)$ of each pixel indicated by the quantization contour direction information input from the contour direction estimating unit 21. The reference region weighting information is information indicating a weighting coefficient $R(D(i,j),u',v')$ of each reference pixel $(u',v')$ belonging to a reference region centering on a certain pixel of interest $(i,j)$. This weighting coefficient is also referred to as a reference region weighting. The size of the reference region in the reference region weighting processing unit 23 is decided in advance to be equal to the size of the reference region in the direction evaluating unit 22.

The reference region weighting processing unit 23 decides a value larger than the weighting coefficients of the reference pixels in directions of the other ranges to be the weighting coefficient $R(D(i,j),u',v')$ of the reference pixel in a direction of a predetermined range from the quantization contour direction $D(i,j)$ of the pixel of interest $(i,j)$. For example, the reference region weighting processing unit 23 decides "1" as the weighting coefficient $R(D(i,j),u',v')$ of the reference pixel $(u',v')$ in the quantization contour direction or a direction approximating to the quantization contour direction from the pixel of interest $(i,j)$, and decides "0" as the weighting coefficients $R(D(i,j),u',v')$ of the reference pixel $(u',v')$ in the other directions. Specifically, the reference pixel in the quantization contour direction or a direction approximating to the quantization contour direction from the pixel of interest refers to the reference pixel $(u',v')$ in which a line segment extending from the center of the pixel of interest $(i,j)$ in the quantization contour direction passes through the region. The reference region weighting processing unit 23 may decide the weighting coefficient such that the weighting coefficient has a large value for the reference pixel $(u',v')$ in which a length of the line segment passing through the region is large.

Further, the weighting coefficient of each reference pixel in each quantization contour direction may be calculated in advance. The reference region weighting processing unit 23 includes a storage unit that stores in advance the reference region weighting information indicating the calculated weighting coefficient of each reference pixel in association with the quantization contour direction information. The reference region weighting processing unit 23 reads the reference region weighting information corresponding to the quantization contour direction indicated by the input quantization contour direction information from the storage unit.

The reference region weighting processing unit 23 outputs the reference region weighting information decided for each pixel of interest (i,j) to the product-sum operation unit 25. An exemplary numerical value of the reference region weighting will be described later.

The pre-processing unit 24 extracts a brightness signal indicating the signal value Y(u,v) of each reference pixel (u,v) belonging to the reference region centering on the pixel of interest (i,j) for each pixel of interest (i,j) from the brightness signal Y input from the scaling unit 13. The pre-processing unit 24 outputs the brightness signal Y extracted for each pixel of interest (i,j) to the product-sum operation unit 25. The size of the reference region in the pre-processing unit 24 is decided in advance to be equal to the sizes of the reference regions in the direction evaluating unit 22 and the reference region weighting processing unit 23.

The product-sum operation unit 25 receives the direction evaluation value information, the reference region weighting information, and the brightness signal from the direction evaluating unit 22, the reference region weighting processing unit 23, and the pre-processing unit 24, respectively, for each pixel of interest (i,j).

The product-sum operation unit 25 calculates a product-sum value S(i,j), for example, using Formula (5) based on the direction evaluation value F(ΔD) indicated by the direction evaluation value information, the reference region weighting R(D(i,j),u',v') indicated by the reference region weighting information, and the signal value Y(u,v) indicated by the brightness signal.

[Mathematical Formula 5]

$$S(i, j) = \sum_{u', v'} F(|\Delta D|) R(D(i, j), u', v') Y(u, v) \quad (5)$$

Formula (5) represents that the product of the direction evaluation value F(|ΔD|), the reference region weighting R(D(i,j),u',v'), and the signal value Y(u,v) indicated by the brightness signal is calculated for each reference pixel, and the sum of the calculated products of the reference pixels belonging to the reference region is calculated as the product-sum value S(i,j). That is, in Formula (5), the product-sum value S(i,j) is considered to be calculated by weighting and adding the signal value Y(u,v) using the product of the direction evaluation value F(|ΔD|) and the reference region weighting R(D(i,j),u',v') as the weighting coefficient. The product of the direction evaluation value F(|ΔD|) and the reference region weighting R(D(i,j),u',v') is also referred to as a direction evaluation region weighting.

The product-sum operation unit 25 calculates a weighting area C(i,j), for example, using Formula (6) based on the direction evaluation value F(|ΔD|) indicated by the direction evaluation value information and the reference region weighting R(D(i,j),u',v') indicated by the reference region weighting information.

[Mathematical Formula 6]

$$C(i, j) = \sum_{u', v'} F(|\Delta D|) R(D(i, j), u', v') \quad (6)$$

Formula (6) represents that the product of the direction evaluation value F(|ΔD|) and the reference region weighting R(D(i,j),u',v') is calculated for each reference pixel, and the sum of the calculated products of the reference pixels belonging to the reference region is calculated as the weighting area C(i,j). That is, the weighting area C(i,j) indicates a value obtained by weighting the reference region weighting R(D(i,j),u',v') by the direction evaluation value F(|ΔD|) for each reference pixel, that is, the number of reference pixels that is actually referred to in the product-sum operation of Formula (5). In other words, Formula (6) represents the weighting area C(i,j) is calculated by obtaining the sum of the direction evaluation region weightings in the reference region. Further, the product-sum operation unit 25 calculates the sum of the reference region weightings R(D(i,j),u',v') indicated by the reference region weighting information for the reference pixels belonging to the reference region as a reference area N(i,j). The reference area N(i,j) indicates the number of reference pixels that are nominally referred to in the product-sum operation of Formula (5).

The product-sum operation unit 25 outputs product-sum value information indicating the product-sum value S(i,j) calculated for each pixel of interest (i,j), weighting area information indicating the weighting area C(i,j), and reference area information indicating the reference area N(i,j) to the composition operation unit 26.

The composition operation unit 26 receives the product-sum value information, the weighting area information, and the reference area information from the product-sum operation unit 25. Further, the composition operation unit 26 receives the parameter Pm from the parameter deciding unit 20b. The composition operation unit 26 calculates a direction smoothing value Y'(i,j) by dividing the product-sum value S(i,j) indicated by the product-sum value information by the weighting area C(i,j) indicated by the weighting area information. That is, the calculated direction smoothing value Y'(i,j) indicates a signal value smoothed between the reference pixels that are in the quantization contour direction of the pixel of interest (i,j) or the direction approximating to the quantization contour direction and have the contour direction that is the same as or approximates to the contour direction of the pixel of interest.

The composition operation unit 26 calculates a mixing ratio w(i,j) by dividing the weighting area C(i,j) by the reference area N(i,j) indicated by the reference area information. The mixing ratio w(i,j) indicates a ratio of the number of reference pixels having the contour direction that is the same or approximates to the contour direction of the pixel of interest to the number of reference pixels that are in the quantization contour direction of the pixel of interest (i,j) or the direction approximating to the quantization contour direction.

The composition operation unit 26 calculates a low pass signal value Y''(i,j) by performing a weighting addition (a composition operation) on the direction smoothing value Y'(i,j) and the signal value Y(i,j) indicated by the brightness signal input from the scaling unit 13 using w(i,j)Pm and (1−w(i,j)Pm), respectively. The weighting addition is represented by Formula (7).

[Mathematical Formula 7]

$$Y''(i,j) = w(i,j) Y'(i,j) + (1 - w(i,j)) Y(i,j) \quad (7)$$

The parameter Pm is a parameter of deciding a degree in which the effect of processing by the low pass filter unit 20a is reflected as described above. For example, when Pm=0, Formula (7) becomes Y''(i,j)=Y(i,j), and the effect of processing by the low pass filter unit 20a is not reflected. On the other hand, when Pm=1, Y"(i,j)=w(i,j)Y'(i,j)+(1−w(i,j))Y(i,j), and the effect of processing by the low pass filter unit 20a is most strongly reflected.

The composition operation unit 26 generates the brightness signal Y" indicating the calculated low pass signal value Y"(i,j). The composition operation unit 26 outputs the generated brightness signal Y" to the high frequency expanding unit 27.

Next, a configuration of the high frequency expanding unit 27 will be described.

Figure 3:
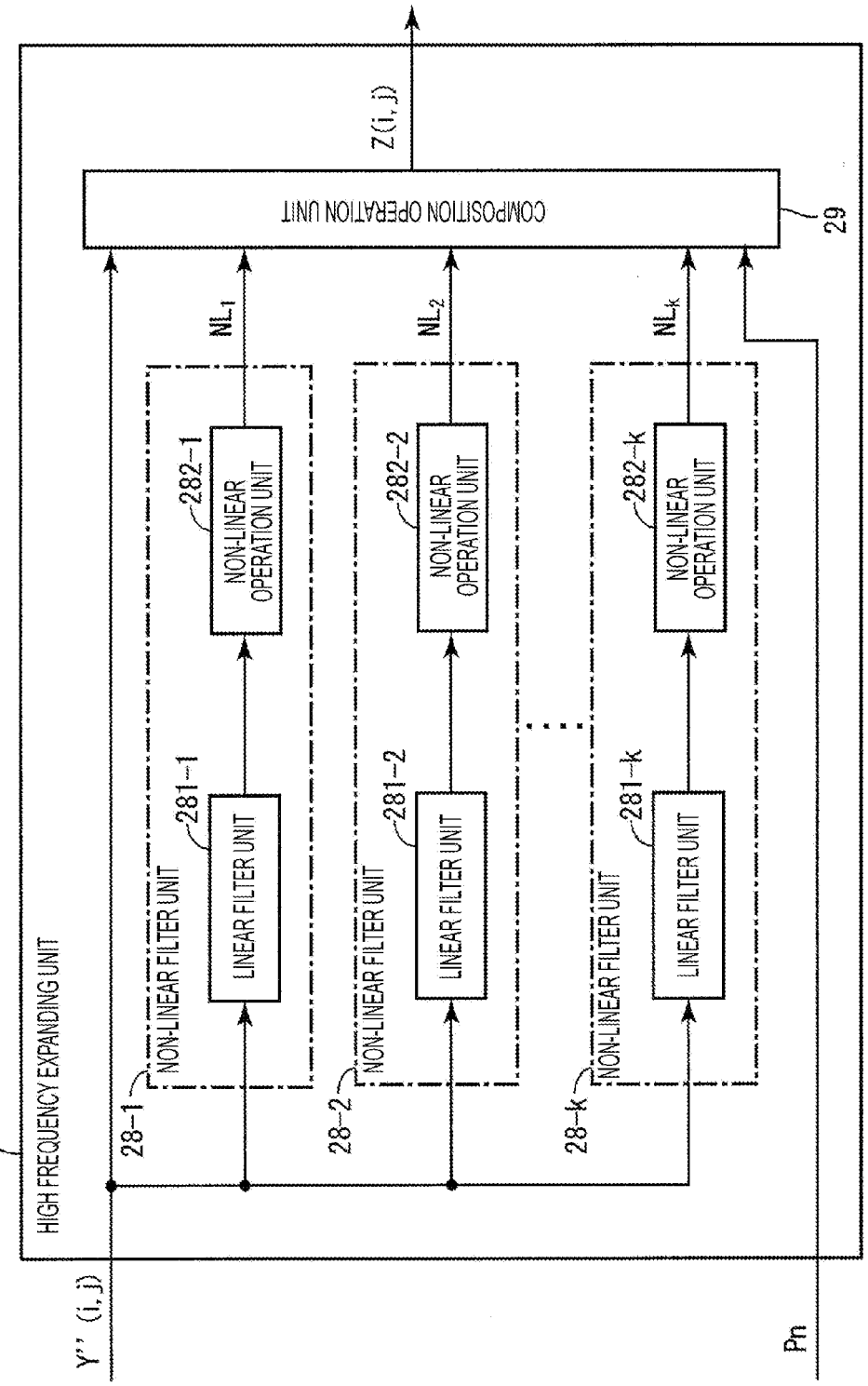
FIG. 3 is a conceptual diagram illustrating a configuration of a high frequency expanding unit according to the present embodiment.

FIG. 3 is a conceptual diagram illustrating a configuration of the high frequency expanding unit 27 according to the present embodiment.

The high frequency expanding unit 27 is configured to include k (k is an integer of 1 or larger) non-linear filter units 28-1 to 28-k and a composition operation unit 29.

Each of the non-linear filter units 28-1 to 28-k calculates a frequency component value for the low pass signal value Y"(i,j) of each pixel indicated by the brightness signal Y" input from the composition operation unit 26, and outputs the calculated high frequency component values $NL_1$ to $NL_k$ to the composition operation unit 29.

Here, the non-linear filter units 28-1 to 28-k include linear filter units 281-1 to 281-k and non-linear operation units 282-1 to 282-k, respectively.

Each of the linear filter units 281-1 to 281-k extracts a component indicating a line drawing (for example, a contour) facing in a certain direction. The linear filter units 281-1 to 281-k output a direction component signal indicating the extracted component to the non-linear operation units 282-1 to 282-k, respectively.

A specific example of the component extracted by the linear filter units 281-1 to 281-k will be described later.

The non-linear operation units 282-1 to 282-k perform a non-linear operation on signal values indicated by the direction component signals input from the linear filter units 281-1 to 281-k, and calculate non-linear output values. The non-linear operation units 282-1 to 282-k generate direction component signals indicated by the calculated non-linear output values, and output the generated direction component signals to the composition operation unit 29, respectively.

For example, the non-linear operation performed by the non-linear operation units 282-1 to 282-k is a high dimensional function f(W) of an input signal value W. For example, f(W) is $sgn(W)|W|^2$, $W^3$, $sgn(W)|W|^4$, $W^5$ ..., or a linear combination thereof. sgn( ... ) indicates a signum function of a real number " . . . ." In other words, sgn( ... ) is a function of outputting 1 when " ... " is larger than 0, −1 when " ... " is smaller than 0, and 0 when " ... " is 0. The function is an odd function, and thus an output value includes an odd-order harmonic component.

The composition operation unit 29 receives high frequency component values $NL_1$ to $NL_k$ from the non-linear filter units 28-1 to 28-k. Further, the composition operation unit 29 receives the parameter Pn from the parameter deciding unit 20b. The composition operation unit calculates a high frequency extension signal value Z(i,j) by adding (synthesizing) the product of the high frequency component value $NL_1$ to $NL_k$ and the parameter Pn and adding (synthesizing) the low pass signal value Y"(i,j) of the respective pixels. The composition operation unit 29 generates the brightness signal Z indicating the calculated high frequency extension signal value Z(i,j). This addition is expressed as in Formula (8).

[Mathematical Formula 8]

$$Z(i, j) = Y''(i, j) + Pn\sum_{k} NL_k \qquad (8)$$

The parameter Pn is a parameter of deciding a degree in which the effect of processing by the high frequency expanding unit 27 is reflected as described above. For example, when Pn=0, Formula (8) becomes Z(i,j)=Y"(i,j), and the effect of processing by the high frequency expanding unit 27 is not reflected. On the other hand, when Pn=1, Z (i,j)=Y"(i,j)+$\Sigma NL_k$, and the effect of processing by the high frequency expanding unit 27 is most strongly reflected.

Next, an exemplary configuration of the high frequency expanding unit 27 will be described.

Figure 4:
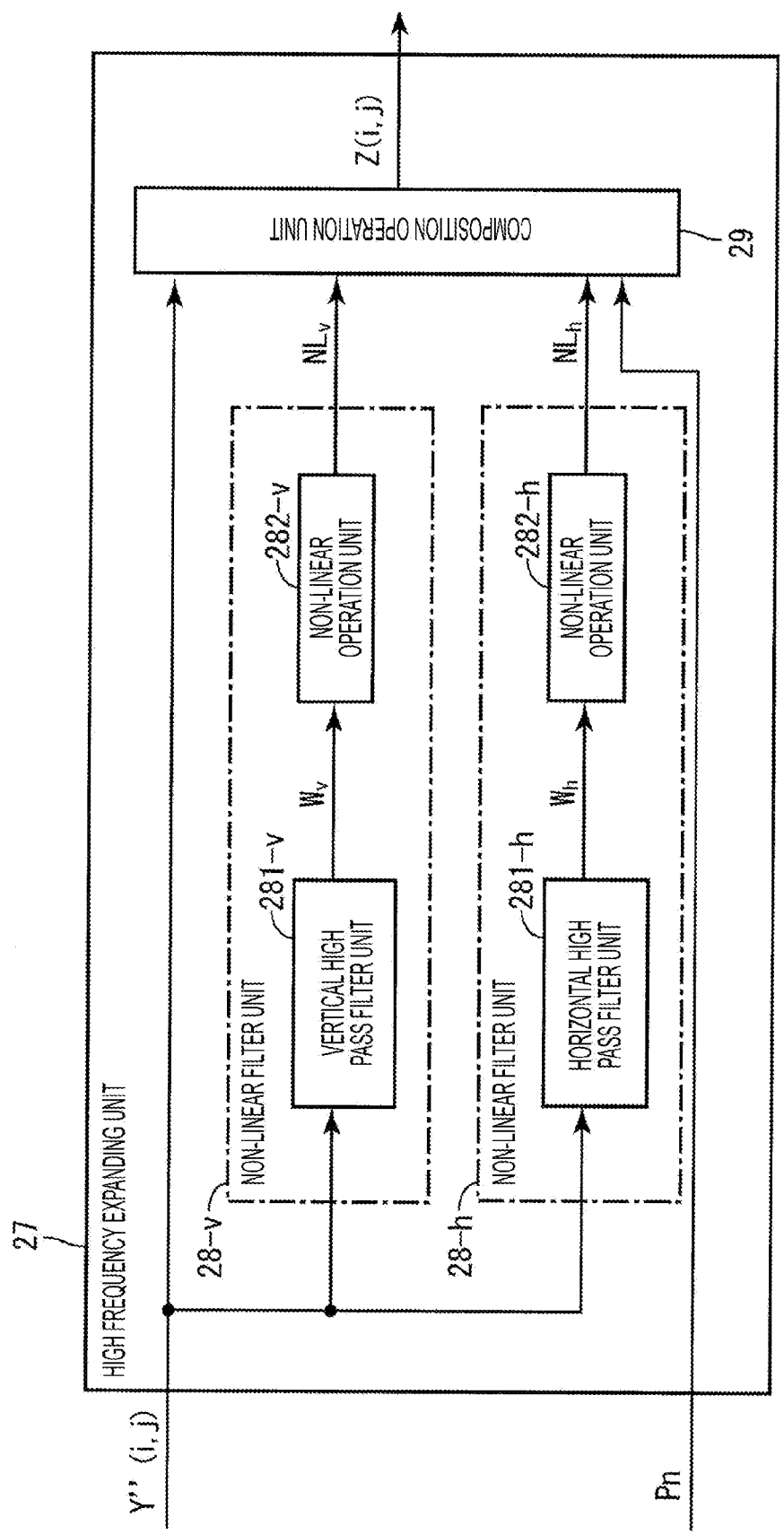
FIG. 4 is a schematic diagram illustrating an exemplary configuration of a high frequency expanding unit according to the present embodiment.

FIG. 4 is a schematic diagram illustrating an exemplary configuration of the high frequency expanding unit 27 according to the present embodiment.

The high frequency expanding unit 27 according to the present exemplary configuration generates harmonic components of components indicating line drawings in the vertical direction and the horizontal direction. The high frequency expanding unit 27 is configured to include two non-linear filter units 28-v and 28-h and a composition operation unit 29. In other words, the non-linear filter units 28-v and 28-h are examples of the non-linear filter units 28-1 and 28-2 (FIG. 3).

The non-linear filter unit 28-v generates a direction component signal indicating a line drawing in the vertical direction based on the brightness signal Y" input from the composition operation unit 26. The non-linear filter unit 28-v is configured to include a vertical high pass filter unit 281-v and a non-linear operation unit 282-v.

The vertical high pass filter unit 281-v and a horizontal high pass filter unit 281-h are examples of the linear filter unit 281-1 or the like. The vertical high pass filter unit 281-v extracts a component indicating a line drawing facing in the vertical direction, and outputs a vertical direction component signal $W_v$ indicating the extracted component to the non-linear operation unit 282-v. The horizontal high pass filter unit 281-h extracts a component indicating a line drawing facing in the horizontal direction, and outputs a horizontal direction component signal $W_h$ indicating the extracted component to the non-linear operation unit 282-h.

The non-linear operation units 282-v and 282-h are examples of the non-linear operation unit 282-1 or the like. The non-linear operation units 282-v and 282-h perform the above-described non-linear operation on signal values indicated by the direction component signals $W_v$ and $W_h$ input from the vertical high pass filter unit 281-v and the horizontal high pass filter unit 281-h. The non-linear operation units 282-v and 282-h generate a vertical direction high frequency component value $NL_v$ and a horizontal direction high frequency component value $NL_h$ indicated by the calculated non-linear output values, and output the generated vertical direction high frequency component value $NL_v$ and the horizontal direction high frequency component value $NL_h$ to the composition operation unit 29. The composition operation unit 29 has the same configuration as the composition operation unit 29 described above.

Next, a configuration of the vertical high pass filter unit 281-v will be described.

Figure 5:
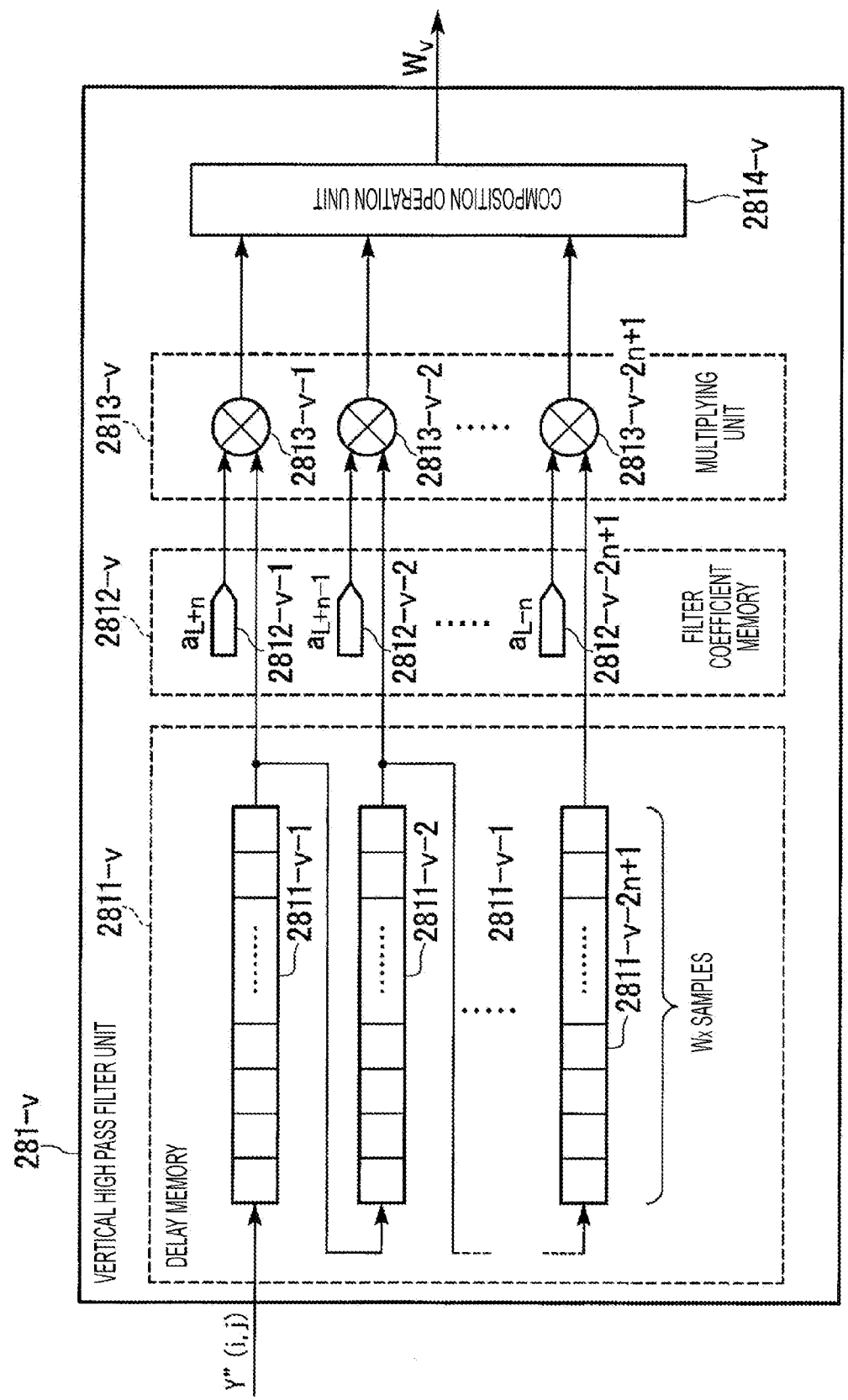
FIG. 5 is a schematic diagram illustrating a configuration of a vertical high pass filter unit according to the present embodiment.

FIG. 5 is a schematic diagram illustrating a configuration of the vertical high pass filter unit 281-v according to the present embodiment.

The vertical high pass filter unit 281-v is configured to include a delay memory 2811-v, a filter coefficient memory 2812-v, a multiplying unit 2813-v, and a composition operation unit 2814-v.

The delay memories 2811-v output delay signals obtained by delaying a low-pass signal value based on the input brightness signal Y" by $W_x$, $2·W_x$, ..., $(2n+1)·W_x$ samples to the multiplying unit 2813-v. $W_x$ indicates the number of pixels in the horizontal direction included in an image of one frame. Thus, signal values of 2n+1 pixels neighboring in the vertical direction centering on the pixel of interest are output to the multiplying unit 2813-v.

Here, the delay memory 2811-v includes 2n+1 delay elements 2811-v-1 to 2811-v-2n+1 that delay an input signal by $W_x$ samples. The delay elements 2811-v-1 to 2811-v-2n+1 are connected in series. One end of the delay element 2811-v-1 receives the brightness signal Y", and the other end of the delay element 2811-v-1 outputs the delay signal obtained by delaying by $W_x$ samples to the multiplying unit 2813-v and one end of the delay element 2811-v-2. One ends of the delay element 2811-v-2 to 2811-v-2n+1 receive the delay signals obtained by delaying by $W_x$ to $2n·W_x$ samples from the other ends of the delay elements 2811-v-1 to 2811-v-2n. The other ends of the delay element 2811-v-2 to 2811-v-2n output the delay signals obtained by delaying $2·W_x$ to $2n·W_x$ samples to one ends of the multiplying unit 2813-v and the delay elements 2811-v-3 to 2811-v-2n+1. The other end of the delay element 2811-v-2n+1 outputs the delay signal obtained by delaying by $(2n+1)·W_x$ samples to the multiplying unit 2813-v.

The filter coefficient memory 2812-v includes 2n+1 memory elements 2812-v-1 to 2812-v-2n+1. The memory elements 2812-v-1 to 2812-v-2n+1 store filter coefficients $a_{L+1}$ to $a_{L-n}$.

The multiplying unit 2813-v includes 2n+1 multipliers 2813-v-1 to 2813-v-2n+1. The multipliers 2813-v-1 to 2813-v-2n+1 multiply the signal values input from the delay elements 2811-v-1 to 2811-v-2n+1 by the filter coefficient $a_{L+n}$ to $a_{L-n}$ stored in the memory elements 2812-v-1 to 2812-v-2n+1. The multipliers 2813-v-1 to 2813-v-2n+1 outputs multiplication values obtained by the multiplying to the composition operation unit 2814-v.

The composition operation unit 2814-v calculates a composite value by adding the multiplication values input from the multipliers 2813-v-1 to 2813-v-2n+1. The calculated composite value is a value obtained by performing the product-sum operation on the signal values of 2n+1 pixels neighboring the vertical direction centering on the pixel of interest and the filter coefficient $a_{L+n}$ to $a_{L-n}$. The composition operation unit 2814-v outputs the vertical direction component signal Wv indicating the calculated composite value to the non-linear operation unit 282-v.

Next, a configuration of the horizontal high pass filter unit 281-h will be described.

Figure 6:
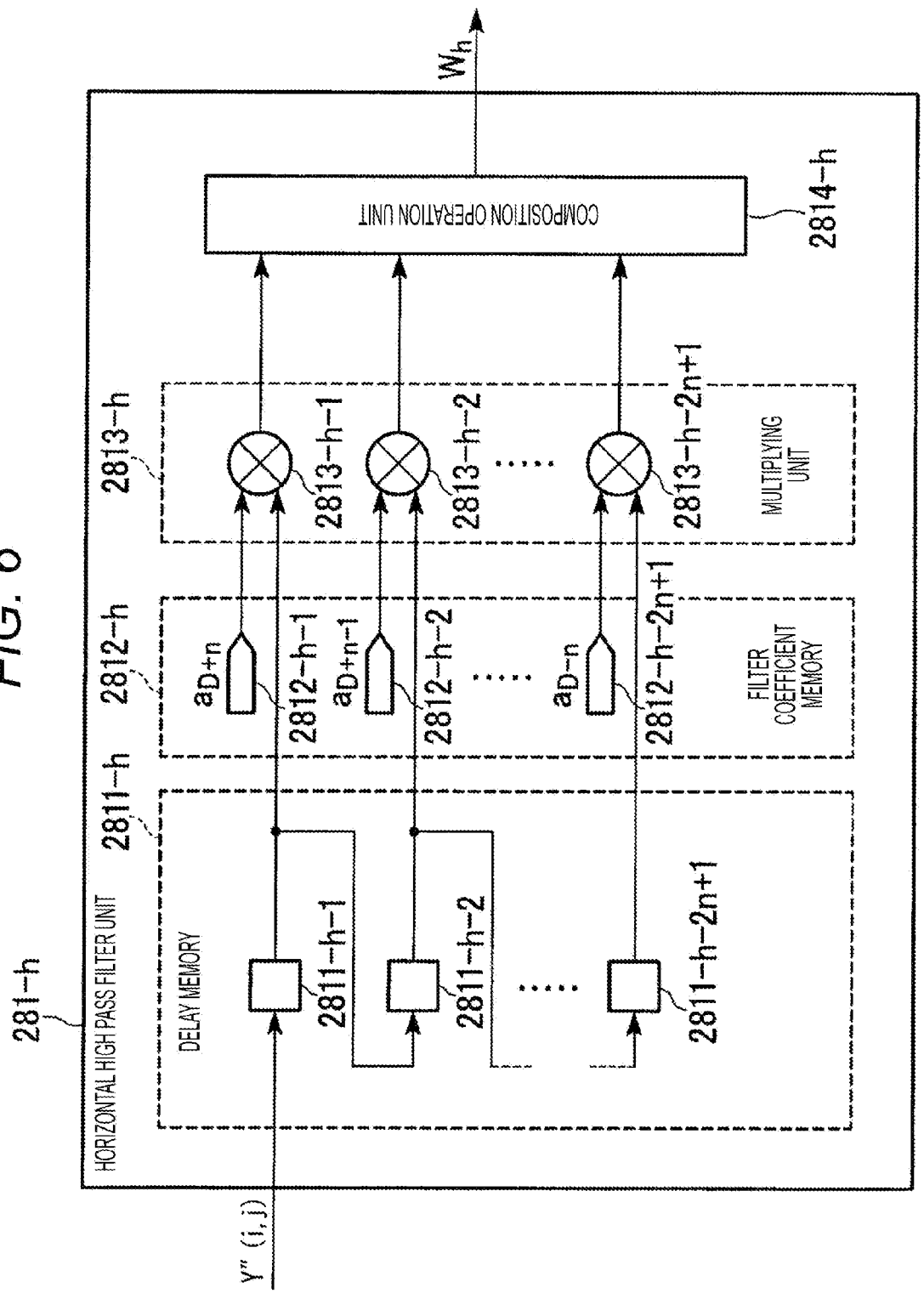
FIG. 6 is a schematic diagram illustrating a configuration of a horizontal high pass filter unit according to the present embodiment.

FIG. 6 is a schematic diagram illustrating a configuration of the horizontal high pass filter unit 281-h according to the present embodiment.

The horizontal high pass filter unit 281-h is configured to include a delay memory 2811-h, a filter coefficient memory 2812-h, a multiplying unit 2813-h, and a composition operation unit 2814-h.

The delay memory 2811-h, the filter coefficient memory 2812-h, the multiplying unit 2813-h, and the composition operation unit 2814-h have the same configurations as the delay memory 2811-v, the filter coefficient memory 2812-v, the multiplying unit 2813-v, and the composition operation unit 2814-v.

Here, the delay memory 2811-h includes 2n+1 delay elements 2811-h-1 to 2811-h-2n+1 that delay an input signal by one sample instead of the delay elements 2811-v-1 to 2811-v-2n+1 that delay an input signal by Wx samples, respectively.

The filter coefficient memory 2812-h includes memory elements 2812-h-1 to 2812-h-2n+1 instead of the memory elements 2812-v-1 to 2812-v-2n+1. The memory elements 2812-h-1 to 2812-h-2n+1 store filter coefficients $a_{D+n}$ to $a_{D-n}$, respectively.

Thus, the composition operation unit 2814-h calculates a value obtained by performing the product-sum operation on signal values of 2n+1 pixels neighboring in the horizontal direction centering on the pixel of interest and the filter coefficients $a_{D+n}$ to $a_{D-n}$, respectively. The composition operation unit 2814-h outputs a horizontal direction component signal $W_h$ indicating the calculated composite value to the non-linear operation unit 282-h.

The filter coefficients $a_{L-n}$, $a_{L-n+1}$, to $a_{L+n}$ are high-pass filter coefficients used to implement a high pass filter through the product-sum operation with the signal value. A total value of the filter coefficient $a_{L+n}$ to $a_{L-n}$ and a total value of the filter coefficient $a_{D+n}$ to $a_{D-n}$ are 0, that is, a transfer function of a direct current (DC) component is 0. As a result, no DC component is included in the calculated composite value. The filter coefficient $a_{L+n}$ to $a_{L-n}$ have characteristics (high-pass characteristics) of passing through a frequency component higher than a spatial frequency that is lower than a Nyquist frequency $f_{nyq}'$ of a non-enlarged brightness signal by a predetermined frequency f. The Nyquist frequency $f_{nyq}'$ of the non-enlarged brightness signal is a frequency obtained by dividing a sampling frequency $f_s$ of a brightness signal of a processing target by 2n (n is an enlargement factor). For example, the filter coefficients $a_{L+3}$, $a_{L+2}$, $a_{L+1}$, $a_L$, $a_{L-1}$, $a_{L-2}$, and $a_{L-3}$ are −0.0637, 0.0, 0.5732, −0.0189, 0.5732, 0.0000, and −0.0637. The filter coefficients $a_{D+3}$, $a_{D+2}$, $a_{D+1}$, $a_D$, $a_{D-1}$, $a_{D-2}$, and $a_{D-3}$ may be values having high-pass characteristics, similarly to the filter coefficients $a_{L+3}$, $a_{L+2}$, $a_{L+1}$, $a_L$, $a_{L-1}$, $a_{L-2}$, and $a_{L-3}$, respectively.

Next, an exemplary configuration (a non-linear operation unit 282-A) of the non-linear operation unit 282-1 or the like will be described.

Figure 7:
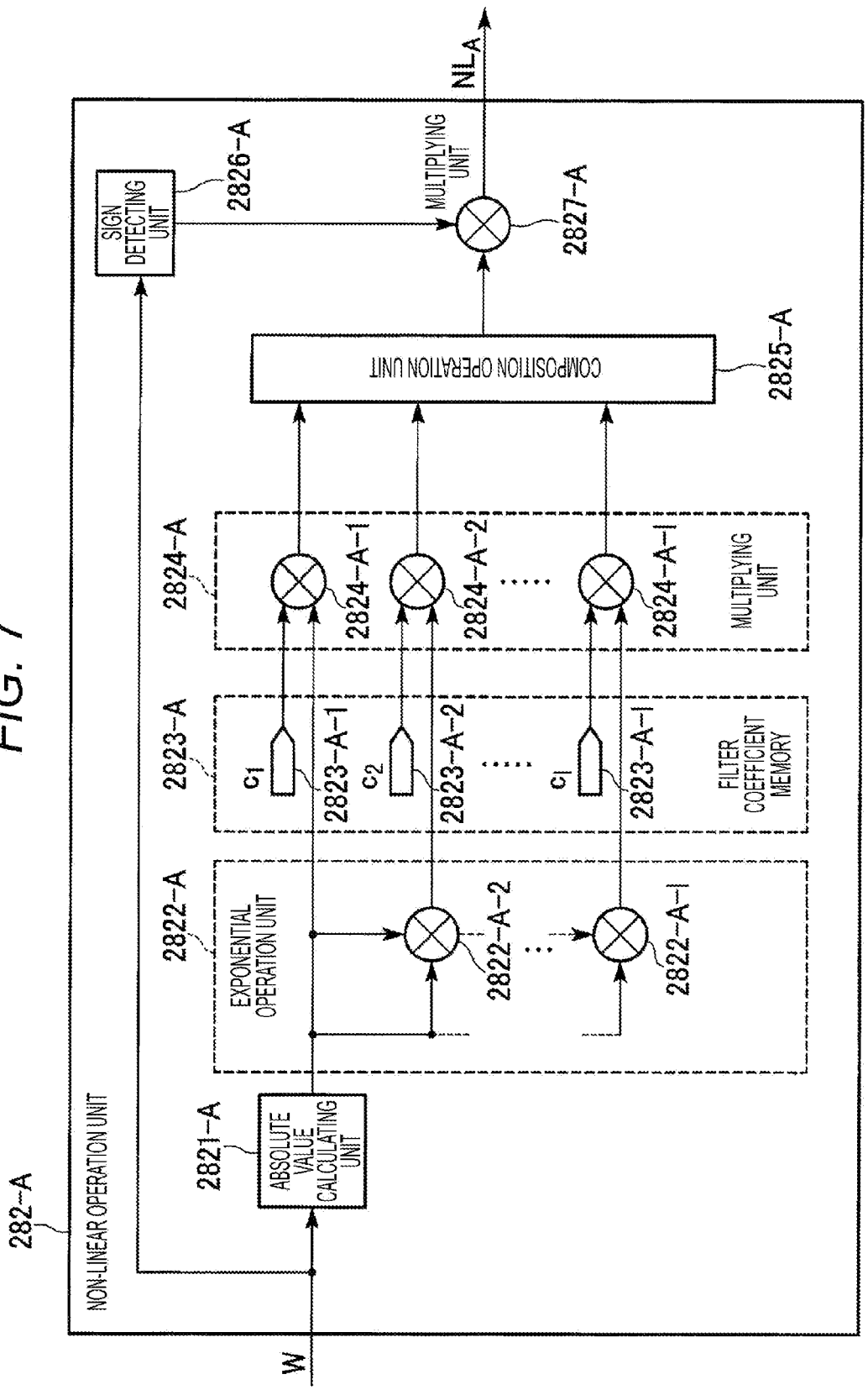
FIG. 7 is a schematic diagram illustrating an exemplary configuration of a non-linear operation unit according to the present embodiment.

FIG. 7 is a schematic diagram illustrating the non-linear operation unit 282-A according to the present embodiment.

The non-linear operation unit 282-A is configured to include an absolute value calculating unit 2821-A, an exponential operation unit 2822-A, a filter coefficient memory 2823-A, a multiplying unit 2824-A, a composition operation unit 2825-A, a sign detecting unit 2826-A, and a multiplying unit 2827-A.

The non-linear operation unit 282-A outputs an l-order odd function $sgn|W|·(c_1·|W|+c_2·|W|^2+ ... +c_l·|W|^l)$ (l is an integer of 1 or larger) on an input signal value W as a non-linear output value $NL_A$. $c_1, c_2, ..., $ and $c_l$ are 1, 2, ..., and l-order coefficients.

The absolute value calculating unit 2821-A calculates the absolute value |W| of the signal value W indicated by the direction component signal input from the linear filter unit 281-1 or the like, and outputs the calculated absolute value |W| to the exponential operation unit 2822-A.

The exponential operation unit 2822-A includes (l−1) multipliers 2822-A-2 to 2822-A-1, and outputs the absolute value |W| input from the absolute value calculating unit 2821-A to the multiplying unit 2824-A. The multiplier 2822-A-2 calculates an absolute square value $|W|^2$ by multiplying the absolute values |W| input from the absolute value calculating unit 2821-A. The multiplier 2822-A-2 outputs the calculated absolute square value $|W|^2$ to the multiplier 2822-A-3 and the multiplying unit 2824-A. The multipliers 2822-A-3 to 2822-A1-1 calculate the absolute cube value $|W|^3$ to an absolute (l-1)-th power value by multiplying the absolute square value $|W|^2$ to an absolute (l-2)-th power value $|W|^{l-2}$ input from the multipliers 2822-A-2 to 2822-A-l-2 by the absolute value $|W|$ input from the absolute value calculating unit 2821-A. The multipliers 2822-A-3 to 2822-A-l-1 outputs the calculated absolute cube value $|W|^3$ to the absolute (l-1)-th power value $|W|^{l-1}$ to the multiplier 2822-A-4 to 2822-A-1 and the multiplying unit 2824-A, respectively. The multiplier 2822-A-1 calculates an absolute l-th power value $|W|^l$ by multiplying the absolute (l-1)-th power value $|W|^{l-1}$ input from the multiplier 2822-A-l-1 by the absolute value IWI input from the absolute value calculating unit 2821-A. The multiplier 2822-A-1 outputs the calculated absolute l-th power value $|W|^l$ to the multiplying unit 2824-A.

The filter coefficient memory 2823-A includes l memory elements 2823-A-1 to 2823-A-1. The memory elements 2823-A-1 to 2823-A-1 store the first to l-order coefficients $c_1$ to $c_l$.

The multiplying unit 2824-A includes l multipliers 2824-A-1 to 2824-A-1.

The multipliers 2824-A-1 to 2824-A-1 calculate multiplication values by multiplying the absolute value $|W|$ to the absolute l-th power value $|W|^l$ input from the exponential operation unit 2822-A by the first to l-order coefficients $c_1$ to $c_l$ stored in the memory elements 2823-A-1 to 2823-A-1. The multipliers 2824-A-1 to 2824-A-1 output the calculated multiplication values to the composition operation unit 2825-A.

The composition operation unit 2825-A calculates a composite value by adding the multiplication values input from the multipliers 2824-A-1 to 2824-A-1. The composition operation unit 2825-A outputs the calculated composite value to the multiplying unit 2827-A.

The sign detecting unit 2826-A detects a sign of the signal value W indicated by the direction component signal input from the linear filter unit 281-1 or the like, that is, a negative or positive sign of the signal value W. When the signal value is smaller than 0, the sign detecting unit 2826-A outputs −1 to the multiplying unit 2827-A as a sign value. When the signal value is 0 or larger, the sign detecting unit 2826-A outputs 1 to the multiplying unit 2827-A as a sign value.

The multiplying unit 2827-A calculates a high frequency component value $NL_A$ by multiplying the composite value input from the composition operation unit 2825-A by the sign value input from the sign detecting unit 2826-A. The multiplying unit 2827-A outputs the calculated high frequency component value to the composition operation unit 29.

The non-linear operation unit 282-A having the above configuration has a relatively large circuit size, but can adjust the high frequency component value to be output using a small number of coefficients.

Further, when the coefficient values $c_1$ to $c_{l-1}$ excluding the highest-order coefficient value, that is, the l-order coefficient value are 0, the configuration related to the product-sum operation for such orders may be omitted. A configuration that can be omitted includes the memory elements 2823-A-1 to 2823-A-l-1 and the multipliers 2824-A-1 to 2824-A-l-1 in the non-linear operation unit 282-A. For example, when $f(W)=sgn(W)|W|^2$, the memory element 2823-A-1 and the multiplier 2824-A-1 may be omitted.

Next, another exemplary configuration (a non-linear operation unit 282-B) of the non-linear operation unit 282-1 or the like will be described.

Figure 8:
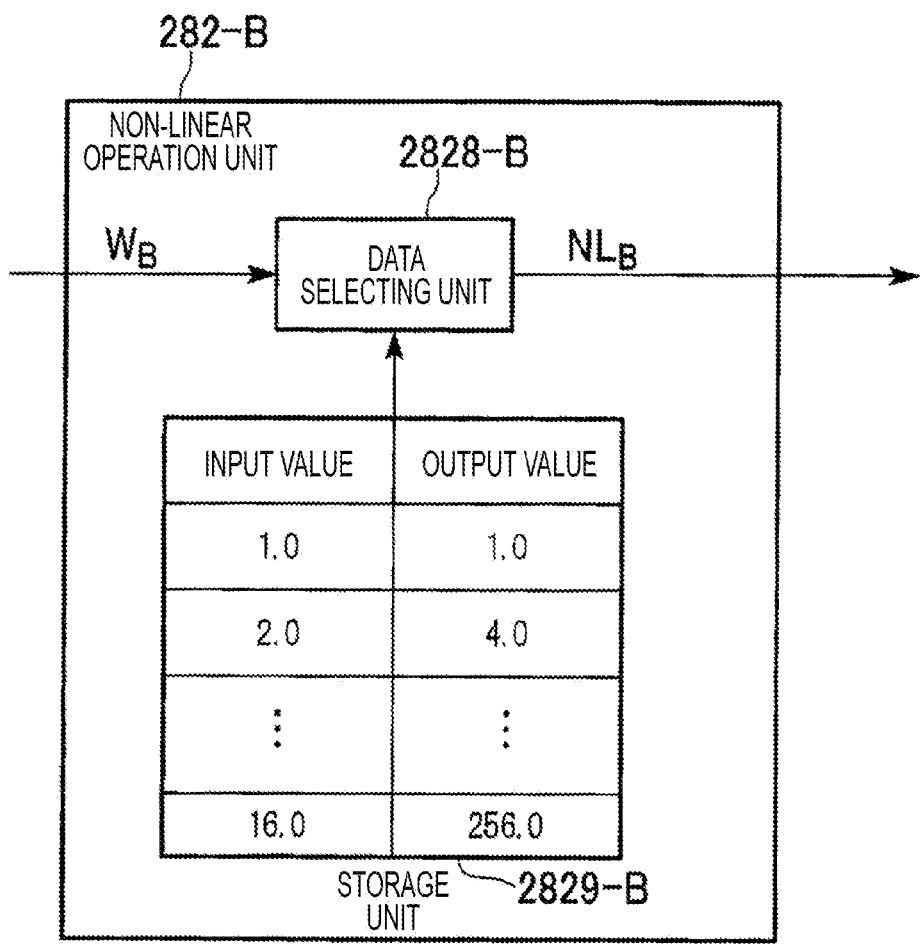
FIG. 8 is a schematic diagram illustrating another exemplary configuration of a non-linear operation unit according to the present embodiment.

FIG. 8 is a schematic diagram illustrating a configuration of the non-linear operation unit 282-B according to the present embodiment.

The non-linear operation unit 282-B is configured to include a data selecting unit 2828-B and a storage unit 2829-B.

The storage unit 2829-B stores an input value W and an output value indicating a high dimensional function f(W) of the input value W in association with each other. In the example illustrated in FIG. 8, input values 1.0, 4.0, . . . , and 16.0 and output values 1.0, 4.0, . . . , and 256.0 are stored in association with each other.

The data selecting unit 2828-B searches for an input value equal to the signal value W indicated by the direction component signal input from the linear filter unit 281-1 or the like in the storage unit 2829-B, and reads an output value corresponding to the searched input value. The data selecting unit 2828-B outputs the read output value to the composition operation unit 29 as the high frequency component value $NL_B$.

The non-linear operation unit 282-B having the above configuration has many input values to be set in advance and many output values, but has a small circuit size. When the input value equal to the signal value W is not stored in the data selecting unit 2828-B, the non-linear operation unit 282-B selects an input value that best approximates to the signal value W and is smaller or larger than the signal value W. The non-linear operation unit 282-B may interpolate or extrapolate the output value corresponding to the selected input value and calculate the high frequency component value $NL_B$.

(Exemplary Contour)

Next, an exemplary contour will be described.

Figure 9:
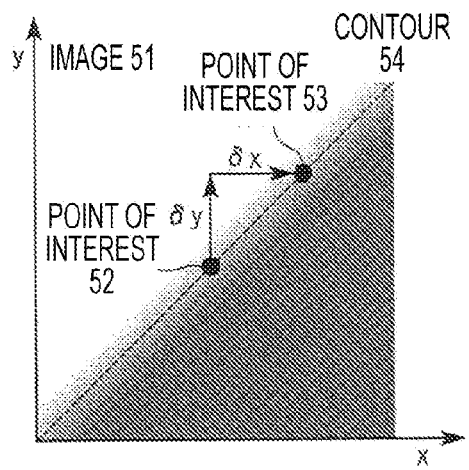
FIG. 9 is a conceptual diagram illustrating an exemplary contour.

FIG. 9 is a conceptual diagram illustrating an exemplary contour.

In FIG. 9, a horizontal axis denotes the x direction, and a vertical axis denotes the y direction. In an image 51, a magnitude of the signal value Y(x,y) is indicated by a contrasting density. A bright portion has a large signal value Y(x,y), and a dark portion has a small signal value Y(x,y).

A dotted line passing through points of interest 52 and 53 indicates a contour 54. The point of interest 53 is at a position away from the point of interest 52 by a small amount (δx,δy). The contour 54 is a line segment (a contour line) that passes through the point of interest 53 and indicates positions at which the signal values are equal to the signal value Y(x,y) of the point of interest 52. Generally, when the signal value Y(x,y) is assumed to be differentiable for the coordinates (x,y), a difference Y between a signal value Y(x+δx,y+δy) of the point of interest 53 and the signal value Y(x,y) of the point of interest 52 is the sum of a small change $δx·G_x(x,y)$ in the x direction and a small change $δy·G_y(x,y)$ in the y direction. Formula (1) is derived from a relation in which the contour 54 passes through both of the points of interest 52 and 53, that is, Y is 0. Thus, the contour direction estimating unit 21 can calculate the contour direction θ using Formulae (1) to (3) based on the signal values Y(i,j) of the pixels whose positions are spatially discrete.

(Exemplary Reference Region)

Next, an exemplary reference region will be described.

Figure 10:
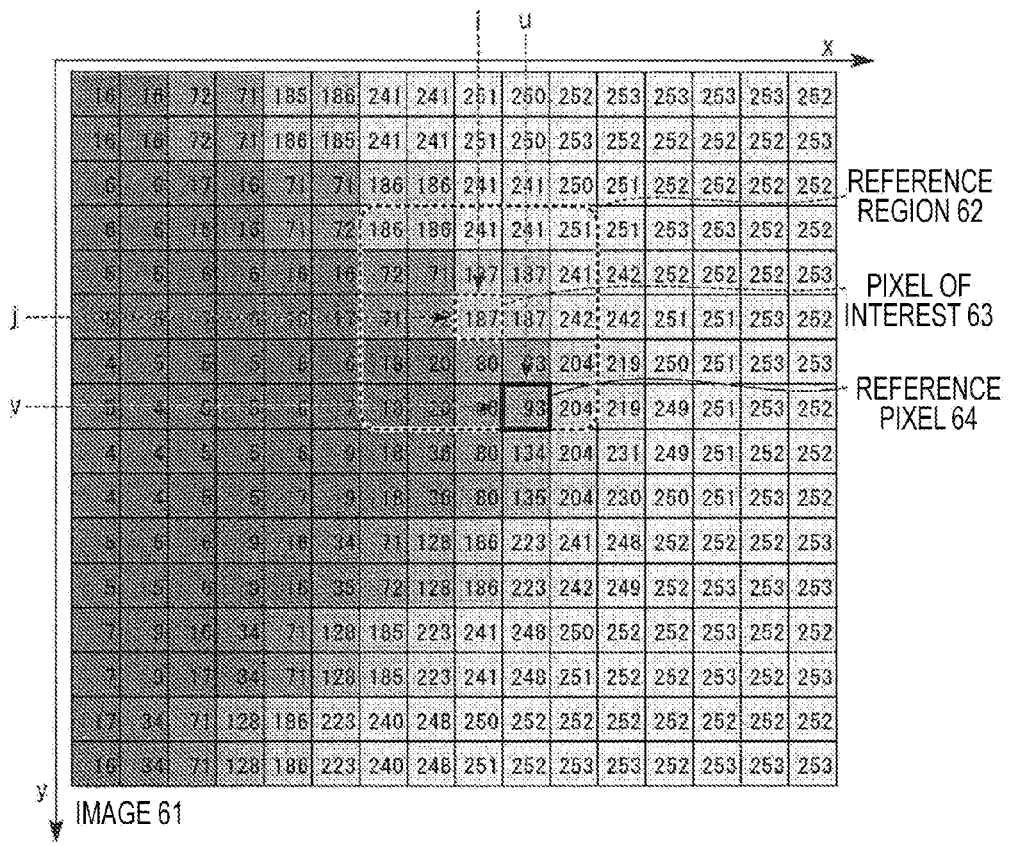
FIG. 10 is a conceptual diagram illustrating an exemplary reference region.

FIG. 10 is a conceptual diagram illustrating an exemplary reference region.

A relation between a horizontal axis and a vertical axis of FIG. 10 is the same as in FIG. 9. An image 61 is an image indicated by the brightness signal Y. Small quadrangles included in the image 61 indicate pixels. A numerical value shown in each quadrangle indicates the signal value Y(i,j) of each pixel. A contrasting density of each quadrangle indicates a magnitude of the signal value Y(i,j). A bright portion has a large signal value Y(i,j), and a dark portion has a small signal value Y(i,j). In FIG. 10, the signal values Y(i,j) at the left side are larger than those at the right side. Here, a boundary between a region having a large signal value Y(i,j) and a region having a small signal value Y(i,j) is inclined to the left side as it is closer to both upper and lower ends and inclined to the right side as it is closer to the center.

A region surrounded by a dotted line at an upper side from the central portion of the image 61 indicates a reference region 62. A quadrangle at the center of the reference region 62 indicates a pixel of interest 63. Arrows that are indicated by i and j serving as a starting point and directed toward the pixel of interest 63 indicate that an index of the pixel of interest 63 is (i,j). A quadrangle at a fourth column from a leftmost column of a bottom row of the reference region 62 indicates a reference pixel 64. Arrows that are indicated by u and v serving as a starting point and directed toward the reference pixel 64 indicate that an index of the reference pixel 64 is (u,v).

(Exemplary Differential Filter)

Next, an exemplary differential filter will be described.

Figure 11:
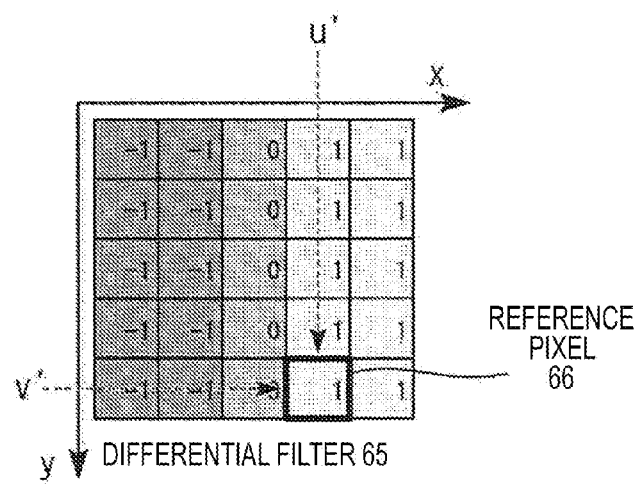
FIG. 11 is a conceptual diagram illustrating an exemplary x direction differential filter.

FIG. 11 is a conceptual diagram illustrating an exemplary x direction differential filter (a differential filter 65).

A relation of a horizontal axis and a vertical axis in FIG. 11 is the same as in FIG. 10.

Small quadrangles included in the differential filter 65 indicate reference pixels. The differential filter 65 is an x direction differential filter in which the number of pixels in the x direction and the number of pixels in the y direction are 5, respectively. A numerical value shown in each quadrangle indicates the filter coefficient $W_x(u',v')$. The filter coefficient $W_x(u',v')$ is 1 when u'>0, 0 when u'=0, and −1 when u'<0. A quadrangle at a fourth column from a leftmost column of a bottom row of the differential filter 65 indicates a reference pixel 66. Arrows that are indicated by u' and v' serving as a starting point and directed toward the reference pixel 66 indicate that an index of the reference pixel 66 is (u',v'), and corresponds to the index (u,v) of the reference pixel 64 (FIG. 10). Thus, in the product-sum operation of Formula (2), a signal value 93 related to the reference pixel 64 is multiplied by the filter coefficient 1 related to the reference pixel 66.

Figure 12:
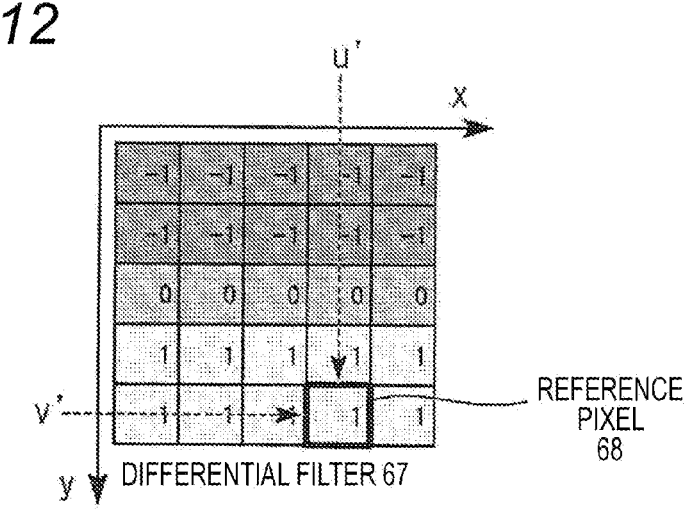
FIG. 12 is a conceptual diagram illustrating an exemplary y direction differential filter.

FIG. 12 is a conceptual diagram illustrating an exemplary y direction differential filter (a differential filter 67).

A relation of a horizontal axis and a vertical axis in FIG. 12 is the same as in FIG. 10.

Small quadrangles included in the differential filter 67 indicate reference pixels. The differential filter 67 is a vertical direction differential filter in which the number of pixels in the x direction and the number of pixels in the y direction are 5, respectively. A numerical value shown in each quadrangle indicates the filter coefficient $W_y(u',v')$. The filter coefficient $W_y(u',v')$ is 1 when v'>0, 0 when v'=0, and −1 when v'<0. A quadrangle at a fourth column from a leftmost column of a bottom row of the differential filter 67 indicates a reference pixel 68. Arrows that are indicated by u' and v' serving as a starting point and directed toward the reference pixel 68 indicate that an index of the reference pixel 68 is (u',v'), and corresponds to the index (u,v) of the reference pixel 64 (FIG. 10). Thus, in the product-sum operation of Formula (3), the signal value 93 related to the reference pixel 64 is multiplied by the filter coefficient 1 related to the reference pixel 68.

(Exemplary Calculation of Partial Differential)

Figure 13:
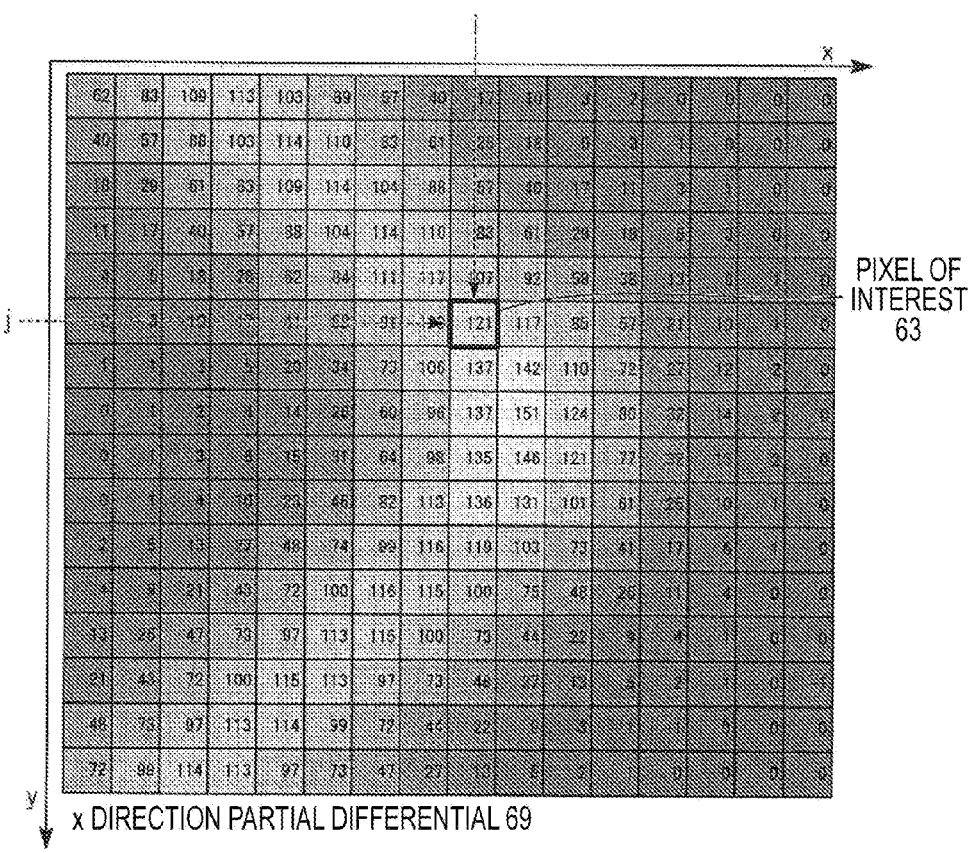
FIG. 13 is a conceptual diagram illustrating an exemplary x direction partial differential.

FIG. 13 is a conceptual diagram illustrating an exemplary x direction partial differential (an x direction partial differential 69).

A relation among a horizontal axis, a vertical axis, and the pixel of interest 63 in FIG. 13 is the same as in FIG. 10.

Small quadrangles included in the x direction partial differential 69 indicate pixel. A numerical value shown in each quadrangle indicates a value of the x direction partial differential $G_x(i,j)$. The x direction partial differential $G_x(i,j)$ illustrated in FIG. 13 is a value calculated using Formula (2) based on the signal value Y(i,j) illustrated in FIG. 10. A contrasting density of each quadrangle indicates a magnitude of the x direction partial differential $G_x(i,j)$. A bright portion has a large x direction partial differential $G_x(i,j)$, and a dark portion has a small x direction partial differential $G_x(i,j)$. In FIG. 13, the x direction partial differentials $G_x(i,j)$ at both left and right ends are small. Here, regions having a large x direction partial differential $G_x(i,j)$ are inclined to the left side as it is closer to both upper and lower ends and inclined to the right side as it is closer to the center. This corresponds to what the boundary between the region having the large signal value Y(i,j) and the regions having the small signal value Y(i,j) is inclined to the left side as it is closer to both upper and lower ends and inclined to the right side as it is closer to the center in FIG. 10. The x direction partial differential $G_x(i,j)$ of the pixel of interest 63 is 121.

Figure 14:
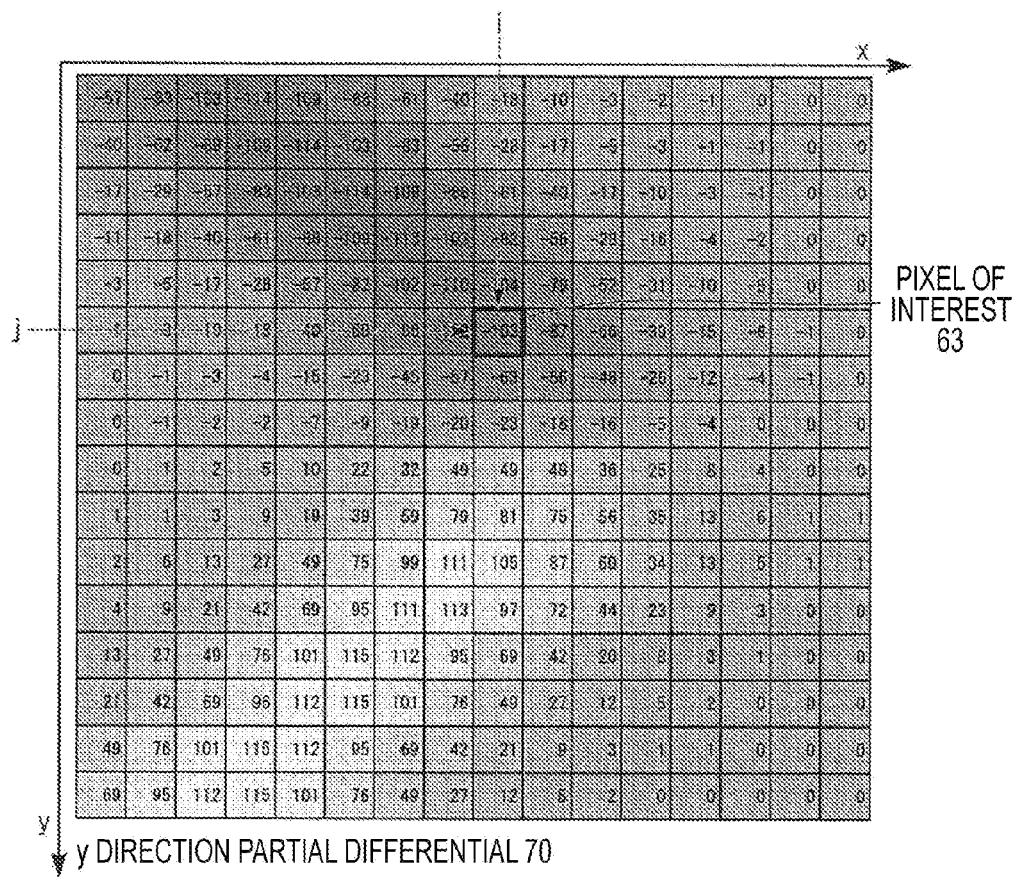
FIG. 14 is a conceptual diagram illustrating an exemplary y direction partial differential.

FIG. 14 is a conceptual diagram illustrating an exemplary y direction partial differential (a y direction partial differential 70).

A relation among a horizontal axis, a vertical axis, and the pixel of interest 63 in FIG. 14 is the same as in FIG. 10.

Small quadrangles included in the y direction partial differential 70 indicate pixels. A numerical value shown in each quadrangle indicate a value of the y direction partial differential $G_y(i,j)$. The y direction partial differential $G_y(i,j)$ illustrated in FIG. 14 is a value calculated using Formula (3) based on the signal value Y(i,j) illustrated in FIG. 10. A contrasting density of each quadrangle indicates a magnitude of the y direction partial differential $G_y(i,j)$. A bright portion has a large y direction partial differential $G_y(i,j)$, and a dark portion has a small y direction partial differential $G_y(i,j)$. In FIG. 14, the y direction partial differential $G_x(i,j)$ approximates to an intermediate value 0 at both left and right ends. Here, regions having the large y direction partial differential $G_x(i,j)$ are inclined to the left side as it is closer to the lower end and inclined to the right side as it is closer to the center. Regions having the small y direction partial differential $G_x(i,j)$ are inclined to the left side as it is closer to the upper end and inclined to the right side as it is closer to the center. The regions having the large y direction partial differential $G_y(i,j)$ and the regions having the small y direction partial differential $G_y(i,j)$ are almost symmetric centering on the central axis in the y direction.

This corresponds to what the boundary between the regions having the large signal value Y(i,j) and the regions having the small signal value Y(i,j) is inclined to the left side as it is closer to both upper and lower ends and inclined to the right side as it is closer to the center in FIG. 14. The y direction partial differential $G_y(i,j)$ of the pixel of interest 63 is −103.

(Exemplary Contour Direction Calculation)

Next, an exemplary contour direction calculation will be described.

Figure 15:
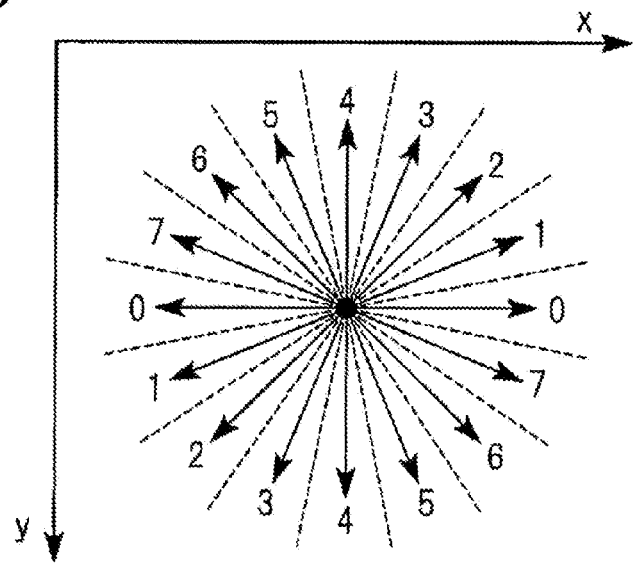
FIG. 15 illustrates an exemplary quantization contour direction candidate.

FIG. 15 illustrates exemplary quantization contour direction candidates.

In FIG. 15, a horizontal axis denotes the x direction, and a vertical axis denotes the y direction. In this example, the quantization contour direction number $N_d$ is 8. Arrows radially extending from one original point indicate quantization contour direction candidates, and a number at the end point of each arrow is a numerical value indicating the quantization contour direction. In other words, numerical values 0 to 7 indicate contour direction angles 0 to $7\pi/8$ or $\pi$ to $15\pi/8$. A region surrounded by a dotted line extending from an original point centering on each arrow indicates a range of the contour direction (before quantization) to be quantized in the quantization contour direction indicated by each arrow. For example, when the contour direction angle is included in any of 0 to $\pi/16$, $15\pi/16$ to $17\pi/16$, and $31\pi/16$ to $2\pi$, the numerical value indicating the quantization contour direction is 0.

Figure 16:
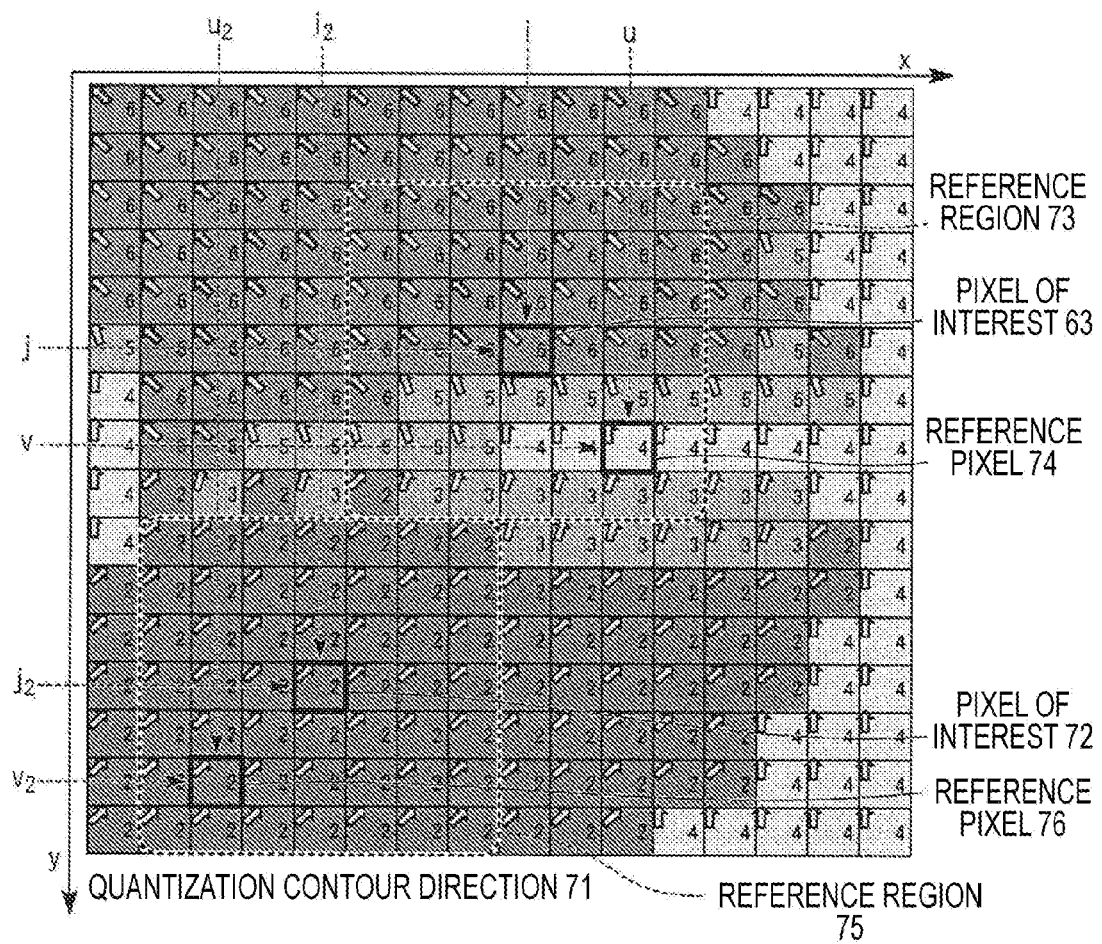
FIG. 16 is a conceptual diagram illustrating an exemplary quantization contour direction calculation.

FIG. 16 is a conceptual diagram illustrating an exemplary quantization contour direction calculation (a quantization contour direction 71).

A relation among a horizontal axis, a vertical axis, and the pixel of interest 63 in FIG. 16 is the same as in FIG. 10.

Small quadrangles included in the quantization contour direction 71 indicate pixels. Arrows that are indicated by $i_2$ and $j_2$ serving as a starting point and directed toward a pixel of interest 72 positioned in a left lower portion of the quantization contour direction 71 represent that an index of the pixel of interest 72 is $(i_2, j_2)$.

In FIG. 16, reference regions 73 and 75 are regions in which the number of pixels in the x direction centering on the pixels of interest 63 and 72 is 7, and the number of pixels in the y direction is 7. Arrows that are indicated by u and v serving as a starting point and directed toward a reference pixel 74 positioned in a right lower portion of the pixel of interest 63 represent that an index of the reference pixel 74 is (u,v). Arrows that are indicated by $u_2$ and $v_2$ serving as a starting point and directed toward a reference pixel 76 positioned in a left lower portion of the pixel of interest 72 represent that an index of the reference pixel 76 is $(u_2, v_2)$. The reference regions 73 and 75 and the reference pixels 74 and 76 will be described later.

A numerical value and an arrow shown in each quadrangle indicate a value of the quantization contour direction D(i,j) and a contour direction indicated by the value. The quantization contour direction D(i,j) illustrated in FIG. 16 is a value that is calculated using Formula (4) based on the x direction partial differential $G_x(i,j)$ illustrated in FIG. 13 and the y direction partial differential $G_y(i,j)$ illustrated in FIG. 14. As a result, the quantization contour direction in most of the pixels at the left upper side from the center of FIG. 16 is a left upper direction. The quantization contour direction in most of the pixels at the left lower side from the center is a right upper direction. This corresponding to what the boundary between the regions having the large signal value Y(i,j) and the regions having the small signal value Y(i,j) is inclined to the left side as it is closer to both upper and lower ends and inclined to the right side as it is closer to the center.

Here, the quantization contour direction D(i,j) in the pixel of interest 63 is 6. Thus, the reference region weighting processing unit 23 selects the reference region weighting R(6,u',v') for the pixel of interest 63. The quantization contour direction $D(i_2, j_2)$ in the pixel of interest 72 is 2. Thus, the reference region weighting processing unit 23 selects the reference region weighting R(2,u',v') for the pixel of interest 72.

(Exemplary Reference Region Weighting)

Next, an exemplary reference region weighting will be described.

Figure 17:
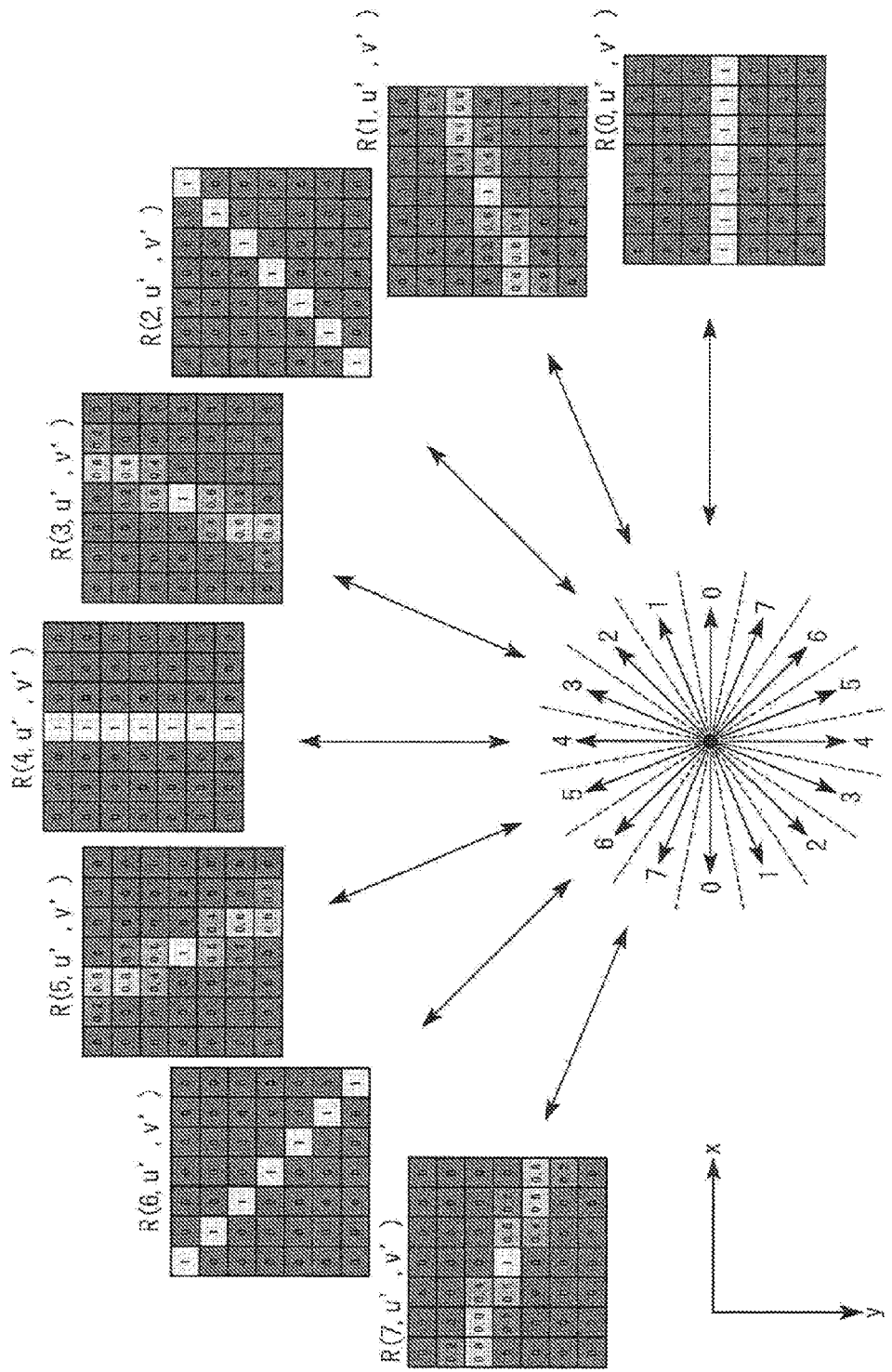
FIG. 17 is a conceptual diagram illustrating an exemplary reference region weighting.

FIG. 17 is a conceptual diagram illustrating an exemplary reference region weighting.

A relation between a horizontal axis and a vertical axis in FIG. 17 is the same as in FIGS. 15 and 16.

Arrows radially extending from one original point at the lower side than the center of FIG. 17 and numerical values shown at end points of the arrows indicate quantization contour directions, similarly to FIG. 15. Each of grid-like diagrams in directions in which arrows indicated by numerical values 0 to 7 counterclockwise from the right side of an original point move toward an upper half plane indicates the reference region weighting R(D(i,j),u',v') corresponding to the quantization contour direction D(i,j). FIG. 17 illustrates the reference region weightings R(0,u',v') to R(7,u',v') in the counterclockwise order from the right side. Small quadrangles included in each reference region weighting R(D(i,j),u',v') indicate reference images. In FIG. 17, the number of reference images included in each reference region weighting R(D(i,j),u',v') is 7 in the horizontal direction and 7 in the vertical direction. A numerical value shown in each quadrangle is a reference region weighting value. The reference region weighting value is 1 for the reference pixel in the quantization contour direction from the center (the pixel of interest) of the reference region, and has a value that increases as the direction of the reference pixel approximates more to the direction. For example, the reference region weighting R(0,u',v') corresponding to the quantization contour direction 0 is 1 for all the reference pixels in a fourth row, and 0 for all the reference pixels in the other rows. The reference region weighting R(6,u',v') corresponding to the quantization contour direction 6 is 1 for all the reference pixels in a first row of a first column to a seventh row of a seventh column and 0 for all the other reference pixels. The quantization contour direction is not necessarily the horizontal direction, the vertical direction, or a diagonal direction ($\pi/4$ or $3\pi/4$). When the quantization contour direction is any other direction, the reference region weighting R(D(i,j),u',v') is decided to be proportional to a distance by which the line segment extending from the center of the reference region in the quantization contour direction passes through. For example, the reference region weighting R(1,u',v') corresponding to the quantization contour direction 1 for a pixel in a seventh column from a leftmost column of a second row from a topmost row is 0.2. The reference region weightings R(1,u',v') corresponding to the quantization contour direction 1 for pixels in fifth to seventh columns of a third row are 0.4, 0.8, and 0.8, respectively. The reference region weightings R(1,u',v') corresponding to the quantization contour direction 1 for pixels in second to sixth columns of a fourth row are 0.2, 0.6, 1.0, 0.6, and 0.2, respectively. The reference region weighting R(1,u',v') corresponding to the quantization contour direction 1 for pixels in first to third columns of a fifth row are 0.8, 0.8, and 0.4, respectively. The reference region weighting R(1,u',v') corresponding to the quantization contour direction 1 for a pixel in a first column of a sixth row is 0.2. The reference region weightings R(1,u',v') corresponding to the quantization contour direction 1 for the other reference pixels are 0.

Figure 18:
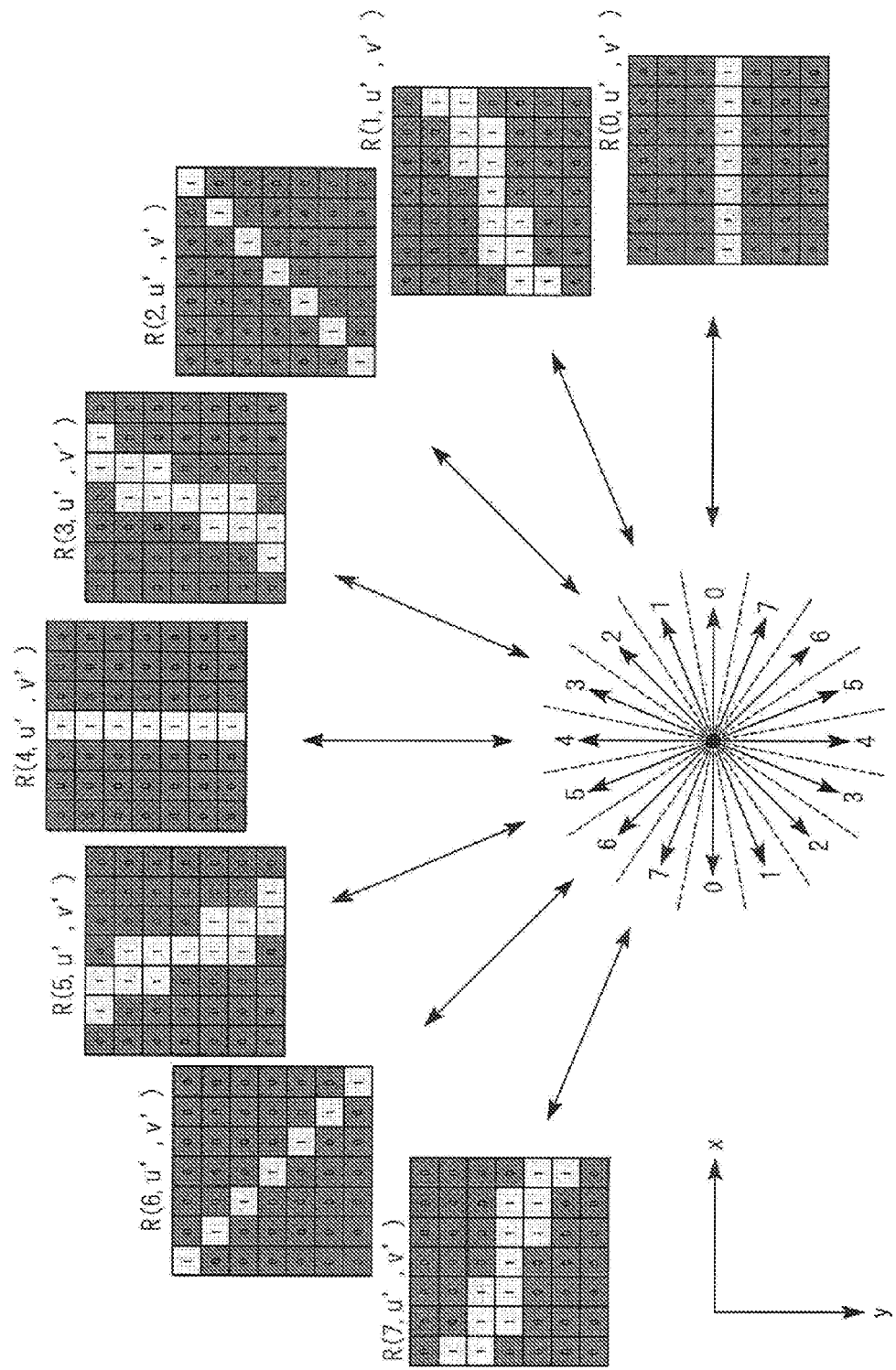
FIG. 18 is a conceptual diagram illustrating another exemplary reference region weighting.

FIG. 18 is a conceptual diagram illustrating another exemplary reference region weighting.

A relation between a horizontal axis and a vertical axis of and a relation between arrows indicating the quantization contour directions and grid-like diagrams corresponding to the quantization contour directions in FIG. 18 are the same as in FIG. 17. The quantization contour directions for the reference region weightings R(D(i,j),u',v') corresponding to the quantization contour directions 0, 2, 4, and 6 that are the horizontal direction, the vertical direction, and the diagonal direction (π/4 and 3π/4) are the same as in the example illustrated in FIG. 17.

The reference region weightings R(D(i,j),u',v') for the other quantization contour directions are different from those of FIG. 17. In the example illustrated in FIG. 18, the reference region weightings R(D(i,j),u',v') for the reference pixels through which a line segment extending from the center of the reference region in the quantization contour direction passes are decided to be 1. The reference region weighting R(D(i,j),u',v') for the other reference pixels are decided to be 1. For example, the reference region weightings R(1,u',v') corresponding to the quantization contour direction 1 for pixels in a seventh column from a leftmost column in a second row from a topmost row, pixels in fifth to seventh columns of a third row, pixels in second to sixth columns of a fourth row, pixels in first to third columns of a fifth row, and pixels in a first column of a sixth row are 1. The reference region weightings R(1,u',v') corresponding to the quantization contour direction 1 for the other reference pixels are 0. In other words, in the example illustrated in FIG. 18, the reference region weighting R(D(i,j),u',v') indicates whether or not the reference pixel is selected according to whether or not the line segment extending from the center of the reference region in the quantization contour direction passes through.

(Exemplary Direction Evaluation Value Calculation)

Next, an exemplary direction evaluation value calculation will be described.

Figure 19:
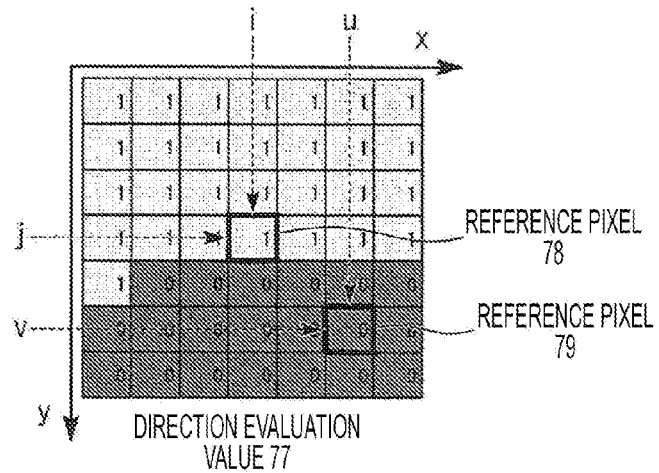
FIG. 19 is a conceptual diagram illustrating an exemplary direction evaluation value.

FIG. 19 is a conceptual diagram illustrating an exemplary direction evaluation value (a direction evaluation value 77).

A horizontal axis and a vertical axis of FIG. 19 are the same as in FIG. 11.

Small quadrangles included in the direction evaluation value 77 indicate reference pixels. A numerical value shown in each quadrangle indicates a value of the direction evaluation value F(ΔD) for the pixel of interest 63 (see FIG. 16). The direction evaluation value F(ΔD) is the direction evaluation value that is calculated based on D(i,j) for the pixel of interest 63 (see FIG. 16) and the quantization contour direction D(u,v) for each reference pixel (u,v) belonging to the reference region 73 (see FIG. 16) through the direction evaluating unit 22. In FIG. 19, the direction evaluation values F(ΔD) for the reference pixels in a topmost row to a fourth row are 1. The direction evaluation values F(ΔD) for the reference pixels in a fifth row to a seventh row excluding the reference pixels in a leftmost fifth row are 0. In other words, FIG. 19 illustrates that the quantization contour directions related to the reference pixels in the topmost row to the fourth row of the reference region 73 (see FIG. 16) are the same to the quantization contour directions related to the pixel of interest 63 (see FIG. 16). FIG. 19 illustrates that the quantization contour directions related to most of the reference pixels in the fifth to seventh rows of the reference region 73 (see FIG. 16) are different from the quantization contour directions related to the pixel of interest 63 (see FIG. 16).

Here, arrows that are indicated by i and j serving as a starting point and directed toward a reference pixel 78 indicate that the reference pixel 78 is a reference pixel corresponding to the pixel of interest 63 having the same index (i,j). It indicates that the direction evaluating unit 22 has decided "1" as the direction evaluation value F(ΔD) because the quantization contour direction D(i,j) of the pixel of interest 63 is the same as the quantization contour direction D(i,j) of the pixel of interest 63 serving as the reference pixel.

Arrows that are indicated by u and v serving as a starting point and directed toward a reference pixel 79 indicate that the reference pixel 79 is a reference pixel corresponding to the reference pixel 74 having the same index (u,v). It indicates that the direction evaluating unit 22 has decided "0" as the direction evaluation value F(ΔD) because the quantization contour direction D(i,j) of the pixel of interest 63 and the quantization contour direction D(i,j) of the reference pixel 74 are 5 and 4, respectively, and different from each other.

Figure 20:
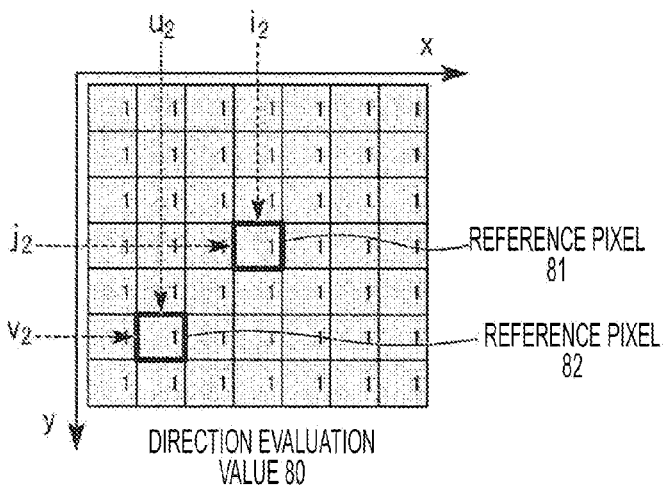
FIG. 20 is a conceptual diagram illustrating another exemplary direction evaluation value.

FIG. 20 is a conceptual diagram illustrating another exemplary direction evaluation value (a direction evaluation value 80).

A horizontal axis and a vertical axis of FIG. 20 are the same as in FIG. 12.

Small quadrangles included in the direction evaluation value 80 indicate reference pixels. A numerical value shown in each quadrangle indicates a value of the direction evaluation value F(ΔD) for the pixel of interest 72 (see FIG. 16). The direction evaluation value F(ΔD) is the direction evaluation value that is calculated based on $D(i_2,j_2)$ for the pixel of interest 72 (see FIG. 16) and the quantization contour direction $D(u_2,v_2)$ for each reference pixel $(u_2,v_2)$ belonging to the reference region 75 (see FIG. 16) through the direction evaluating unit 22. In FIG. 20, the direction evaluation values F(ΔD) for all the reference pixels are 1. In other words, FIG. 20 illustrates that the quantization contour directions related to all the reference pixels belonging to the reference region 75 (see FIG. 16) are the same as the quantization contour directions related to the pixel of interest 72 (see FIG. 16).

Here, arrows that are indicated by $i_2$ and $j_2$ serving as a starting point and directed toward a reference pixel 81 indicate that the reference pixel 81 is a reference pixel corresponding to the pixel of interest 72 (see FIG. 16) having the same index $(i_2,j_2)$. It indicates that the direction evaluating unit 22 has decided "1" as the direction evaluation value F(ΔD) because the quantization contour direction $D(i_2,j_2)$ of the pixel of interest 72 is the same as the quantization contour direction $D(i_2,j_2)$ of the pixel of interest 72 (see FIG. 16) serving as the reference pixel.

Arrows that are indicated by $u_2$ and $v_2$ serving as a starting point and directed toward a reference pixel 82 indicate that the reference pixel 82 is a reference pixel corresponding to the reference pixel 76 (see FIG. 16) having the same index $(u_2,v_2)$. It indicates that the direction evaluating unit 22 has decided "1" as the direction evaluation value F(ΔD) because the quantization contour direction $D(i_2,j_2)$ of the pixel of interest 72 (see FIG. 16) and the quantization contour direction $D(i_2,j_2)$ of the reference pixel 76 (see FIG. 16) are 2 and 2, respectively, and the same as each other.

(Exemplary Direction Evaluation Region Weighting Calculation)

Next, an exemplary direction evaluation region weighting calculation will be described.

Figure 21:
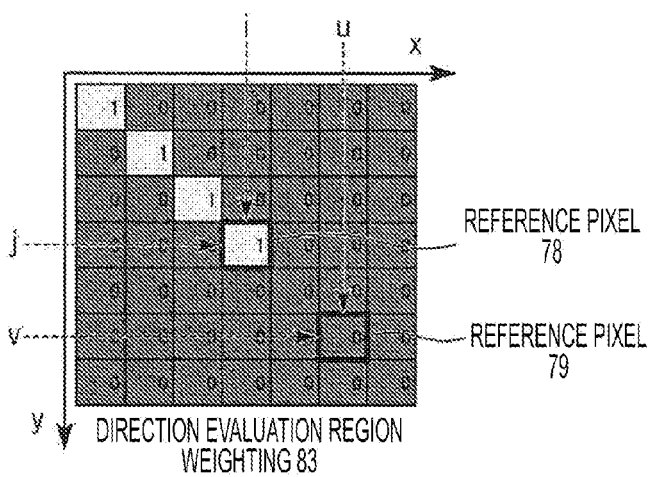
FIG. 21 is a conceptual diagram illustrating an exemplary direction evaluation region weighting.

FIG. 21 is a conceptual diagram illustrating an exemplary direction evaluation region (the direction evaluation region weighting 83).

A horizontal axis and a vertical axis of FIG. 21 are the same as in FIG. 11.

Small quadrangles included in the direction evaluation region weighting 83 indicate reference pixels. A numerical value shown in each quadrangle indicates a direction evaluation region weighting value corresponding to the reference pixel. The direction evaluation region weighting value is a value that is obtained by multiplying the reference region weighting R(6,u',v') (see FIG. 17) of each reference pixel for the pixel of interest 63 (see FIG. 16) by the direction evaluation value F(ΔD) of the corresponding reference pixel (see FIG. 19) through the product-sum operation unit 25. In FIG. 21, the direction evaluation region weighting values for a reference pixel in a topmost leftmost column to a reference pixel (the reference pixels 78) in a fourth column of a fourth row are 1. The direction evaluation region weighting values for the other reference pixels are 0.

Here, arrows that are indicated by i and j serving as a starting point and directed toward a reference pixel 78 indicate that the reference pixel 78 corresponds to the reference pixel 78 (see FIG. 19) having the same index (i,j). The reference pixel 78 corresponds to the pixel of interest 63 (see FIG. 16). In other words, it indicates that the direction evaluation region weighting value for the reference pixel 78 is calculated by multiplying the direction evaluation value F(ΔD) (see FIG. 19) for the reference pixel 78 by the reference region weighting R(6,0,0) (see FIG. 17) corresponding to the reference pixel. Arrows that are indicated by u and v serving as a starting point and directed toward a reference pixel 79 correspond to the reference pixel 79 having the same index (u,v). The reference pixel 79 corresponds to the reference pixel 74 (see FIG. 19). In other words, it indicates that the direction evaluation region weighting value for the reference pixel 79 is calculated by multiplying the direction evaluation value F(ΔD) (see FIG. 19) for the reference pixel 79 by the reference region weighting R(6,2,2) (see FIG. 17) corresponding to the reference pixel.

Figure 22:
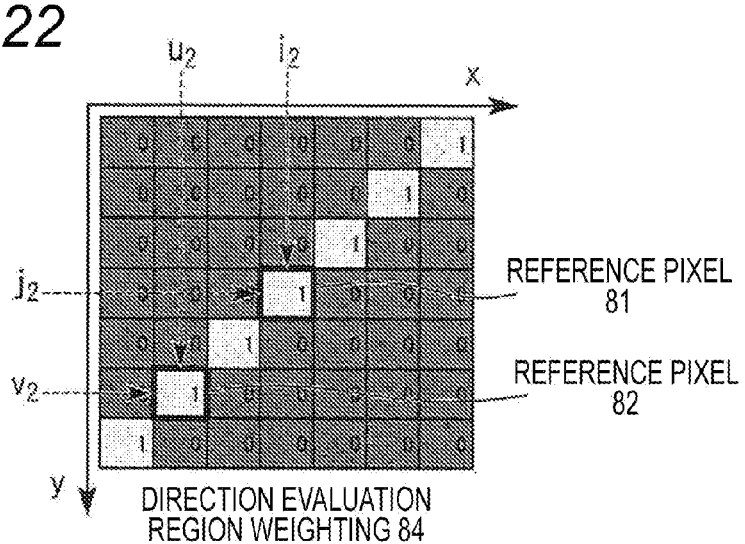
FIG. 22 is a conceptual diagram illustrating another exemplary direction evaluation region weighting.

FIG. 22 is a conceptual diagram illustrating another exemplary direction evaluation region weighting (a direction evaluation region weighting 84).

A horizontal axis and a vertical axis of FIG. 22 are the same as in FIG. 12.

Small quadrangles included in the direction evaluation region weighting 84 indicate reference pixels. A numerical value shown in each quadrangle indicates a direction evaluation region weighting value corresponding to the reference pixel. The direction evaluation region weighting value is a value that is obtained by multiplying the reference region weighting R(2,u',v') (see FIG. 17) of each reference pixel for the pixel of interest 72 (see FIG. 16) by the direction evaluation value F(ΔD) of the corresponding reference pixel (see FIG. 19) through the product-sum operation unit 25. In FIG. 22, the direction evaluation region weighting values for all the reference pixels on a diagonal line from a leftmost column of a lowest row to a rightmost column of a topmost row are 1. The direction evaluation region weighting values for the other reference pixels are 0.

Here, arrows that are indicated by $i_2$ and $j_2$ serving as a starting point and directed toward the reference pixel 81 indicate that the reference pixel 81 corresponds to the reference pixel 81 (see FIG. 22) having the same index $(i_2,j_2)$. The reference pixel 81 corresponds to the pixel of interest 72 (see FIG. 16). In other words, it indicates that the direction evaluation region weighting value for the reference pixel 81 is calculated by multiplying the direction evaluation value F(ΔD) (see FIG. 20) for the reference pixel 81 by the reference region weighting R(2,0,0) (see FIG. 17) corresponding to the reference pixel. Arrows that are indicated by $u_2$ and $v_2$ serving as a starting point and directed toward the reference pixel 79 correspond to a reference pixel 82 having the same index $(u_2,v_2)$. The reference pixel 76 (see FIG. 16) corresponds to the reference pixel 82. In other words, it indicates that the direction evaluation region weighting value for the reference pixel 82 is calculated by multiplying the direction evaluation value F(ΔD) (see FIG. 20) for the reference pixel 82 by the reference region weighting R(2,-2,2) (see FIG. 17) corresponding to the reference pixel.

Next, a pixel (i,j) related to the signal value Y(i,j) that is multiplied by the direction evaluation region weighting value having a value (for example, 1) other than 0 in the product-sum operation unit 25 will be described. Hereinafter, this pixel is referred to as a smoothing target pixel.

Figure 23:
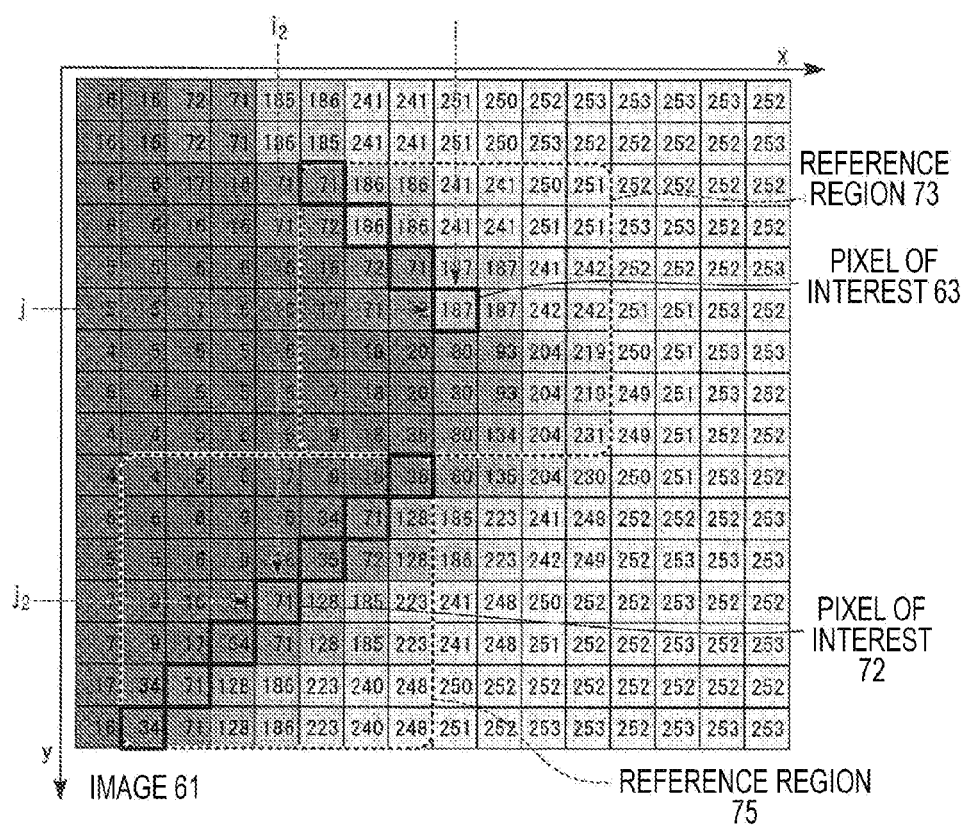
FIG. 23 is a conceptual diagram illustrating an exemplary smoothing target pixel.

FIG. 23 is a conceptual diagram illustrating an exemplary smoothing target pixel.

A relation between a horizontal axis and a vertical axis of FIG. 23 is the same as in FIG. 10. An image 61 is the same as the image 61 illustrated in FIG. 10. In FIG. 23, a positional relation between pixels of interest 63 and 72 and reference regions 73 and 75 is the same as the positional relation in FIG. 10. In other words, the direction evaluation region weightings related to the reference regions 73 and 75 are the same as the direction evaluation region weighting 83 (see FIG. 21) and the direction evaluation region weighting 84 (see FIG. 22), respectively. The direction evaluation region weightings 83 and 85 are used when the product-sum operation unit 25 calculates the product-sum value S(i,j), the weighting area C(i,j), and the reference area N(i,j) corresponding to the pixels of interest 63 and 72.

Small quadrangles drawn by thick lines in the reference regions 73 and 75 indicate smoothing target pixels. The smoothing target pixels included in the reference region 73 are reference pixels in a topmost leftmost column to a fourth column of a fourth row. The smoothing target pixels included in the reference region 75 are all reference pixels on a diagonal line from a leftmost column of a lowest row to a rightmost column of a topmost row. Thus, the signal values Y(i,j) related to the reference pixels are actually used to calculate the direction smoothing values Y'(i,j) related to the pixels of interest 63 and 72. On the other hand, in the reference region 73, the reference pixels in a fifth column of a fifth row to a lowest column of a topmost row are not actually used to calculate the direction smoothing value Y'(i,j).

Thus, in the present embodiment, the contour direction of each pixel is calculated, and the pixel of interest is smoothed using the signal value related to the reference pixel that is in the quantization contour direction of the pixel of interest or in the direction approximating to the quantization contour direction and has the contour direction that is the same as or approximates to the contour direction of the pixel of interest. Thus, it is possible to visually reduce noise while carefully considering a reference pixel serving as an actual smoothing target even at a corner point serving as a pixel that is different in the contour direction from a neighboring or adjacent pixel.

Next, image processing according to the present embodiment will be described.

Figure 24:
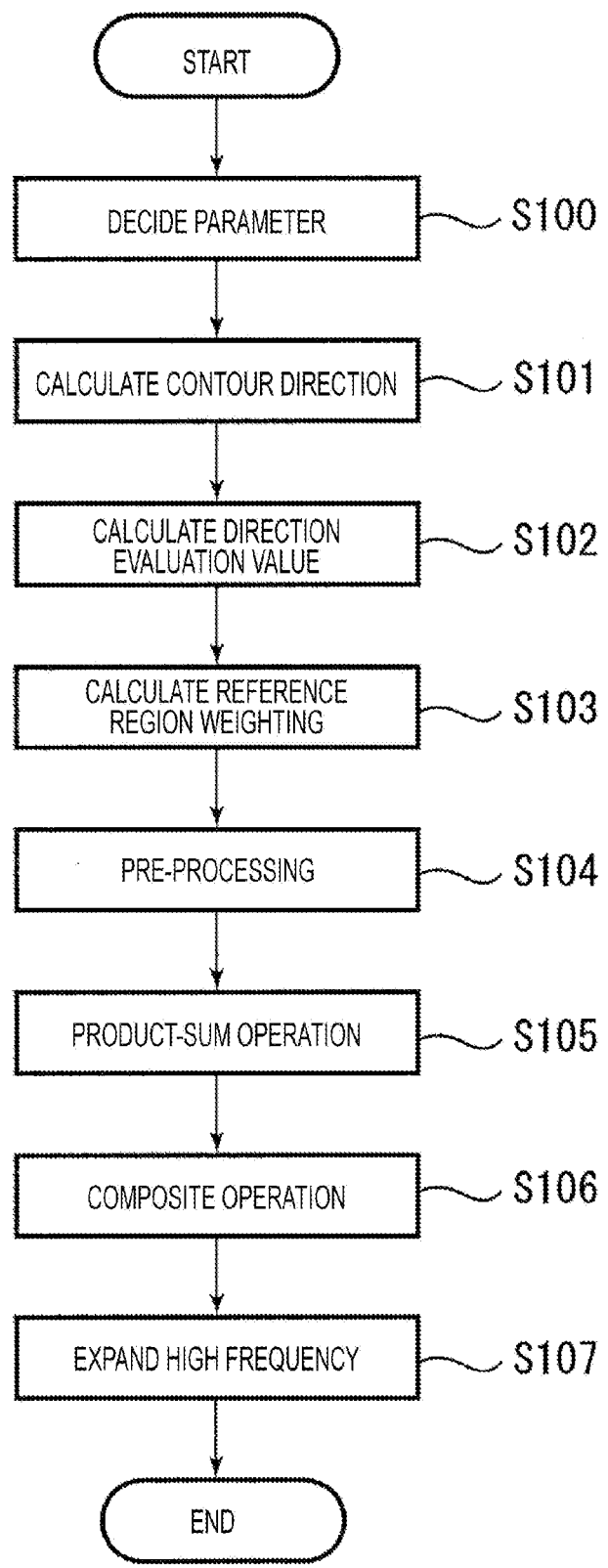
FIG. 24 is a flowchart illustrating image processing according to the present embodiment.

FIG. 24 is a flowchart illustrating image processing according to the present embodiment.

(Step S100) The parameter deciding unit 20*b* decides the parameter Pm and the parameter Pn based on the signal Ss input from the input unit 11. The parameter deciding unit 20*b* outputs the parameter Pm to the low pass filter unit 20*a*, and outputs the parameter Pn to the high frequency expanding unit 27. Thereafter, the process proceeds to step S101.

(Step S101) The contour direction estimating unit 21 calculates the contour direction of each pixel based on the signal value of each pixel indicated by the brightness signal Y input from the scaling unit 13. The contour direction estimating unit 21 quantizes the contour direction of each calculated pixel, and calculates the quantization contour direction. The contour direction estimating unit 21 outputs the quantization contour direction information indicating the calculated quantization contour direction to the direction evaluating unit 22 and the reference region weighting processing unit 23. Thereafter, the process proceeds to step S102.

(Step S102) The direction evaluating unit 22 calculates the direction evaluation value of each reference pixel belonging to the reference region centering on the pixel of interest for each pixel of interest based on the quantization contour direction of each pixel indicated by the quantization contour direction information input from the contour direction estimating unit 21. For example, the direction evaluating unit 22 calculates the direction evaluation value such that the reference pixel having the quantization contour direction that is the same or approximates to the quantization contour direction of the pixel of interest has a large direction evaluation value. The direction evaluating unit 22 outputs the direction evaluation value information indicating the direction evaluation value of each reference pixel for each pixel of interest to the product-sum operation unit 25. Thereafter, the process proceeds to step S103.

(Step S103) The reference region weighting processing unit 23 decides the reference region weighting information for each the pixel of interest based on the quantization contour direction information input from the contour direction estimating unit 21. The reference region weighting processing unit 23 reads the reference region weighting information corresponding to the quantization contour direction of each pixel of interest from the storage unit. The reference region weighting information indicates a weighting coefficient that increases as the reference pixel is in the quantization contour direction of the pixel of interest or the direction approximating to the quantization contour direction. The reference region weighting processing unit 23 outputs the read reference region weighting information to the product-sum operation unit 25. Thereafter, the process proceeds to step S104.

(Step S104) The pre-processing unit 24 extracts the brightness signal indicating the signal value Y(u,v) of each reference pixel (u,v) belonging to the reference region centering on the pixel of interest (i,j) from the brightness signal Y input from the scaling unit 13 for each pixel of interest (i,j) (pre-processing). The pre-processing unit 24 outputs the brightness signal Y extracted for each pixel of interest (i,j) to the product-sum operation unit 25. Thereafter, the process proceeds to step S105.

(Step S105) The product-sum operation unit 25 receives the direction evaluation value information, the reference region weighting information, and the brightness signal from the direction evaluating unit 22, the reference region weighting processing unit 23, and the pre-processing unit 24, respectively, for each pixel of interest. The product-sum operation unit 25 calculates a product-sum value, for example, using Formula (5) based on the direction evaluation value indicated by the direction evaluation value information, the reference region weighting indicated by the reference region weighting information, and the signal value indicated by the brightness signal. The product-sum operation unit 25 calculates the weighting area, for example, using Formula (6) based on the direction evaluation value indicated by the direction evaluation value information, and the reference region weighting indicated by the reference region weighting information. The product-sum operation unit 25 calculates the sum of the reference region weightings indicated by the reference region weighting information for the reference pixels belonging to the reference region as the reference area. The product-sum operation unit 25 generates the product-sum value information and the reference area information respectively indicated by the product-sum value, the weighting area, and the reference area, and outputs the generated product-sum value information, the weighting area information, and the reference area information to the composition operation unit 26. Thereafter, the process proceeds to step S106.

(Step S106) The composition operation unit 26 receives the parameter Pm from the parameter deciding unit 20b, receives the product-sum value information, the weighting area information and the reference area information from the product-sum operation unit 25, and receives the brightness signal from the scaling unit 13. The composition operation unit 26 calculates the direction smoothing value by dividing the product-sum value indicated by the product-sum value information by the weighting area C indicated by the weighting area information. The composition operation unit 26 calculates the mixing ratio by dividing the weighting area by the reference area indicated by the reference area information. The composition operation unit 26 performs a composition operation by weighting and adding the direction smoothing value and the signal value indicated by the brightness signal based on the mixing ratio and the parameter Pm, and calculates a composition signal value.

The composition operation unit 26 outputs the brightness signal indicated by the calculated composition signal value to the high frequency expanding unit 27. Thereafter, the process proceeds to step S107.

(Step S107) The high frequency expanding unit 27 calculates the high frequency component value based on the signal value indicated by the brightness signal input from the composition operation unit 26. The high frequency expanding unit 27 calculates the high frequency extension signal value by weighting-adding the calculated high frequency component value and the signal value indicated by the input brightness signal based on the parameter Pn. The high frequency expanding unit 27 outputs the brightness signal indicating the calculated high frequency extension signal value to the image format converting unit 14. Thereafter, the process ends.

As described above, in the present embodiment, the contour direction of each pixel is estimated based on the signal value of each pixel of interest. In the present embodiment, the signal value of each pixel of interest is filtered using the signal value of each reference pixel that is arranged in the estimated contour direction of each pixel of interest and in a predetermined reference region from each pixel of interest. Further, in the present embodiment, the high frequency component of the filtered signal value of each pixel of interest is generated, and the frequency band of the signal value of each pixel of interest is expanded.

Thus, the signal value of each pixel of interest is smoothed in the contour direction, and the noise in the visually sensitive contour direction is removed or reduced. Further, since the high frequency component of the smoothed signal value is compensated, it is possible to sharpen an image while preventing or suppressing noise caused by aliasing.

Further, in the present embodiment, intensity of smoothing and high frequency extension is controlled according to an enlargement factor of an image. Accordingly, it is possible to prevent the occurrence of an artifact when the enlargement factor is small.

Second Embodiment

Figure 25:
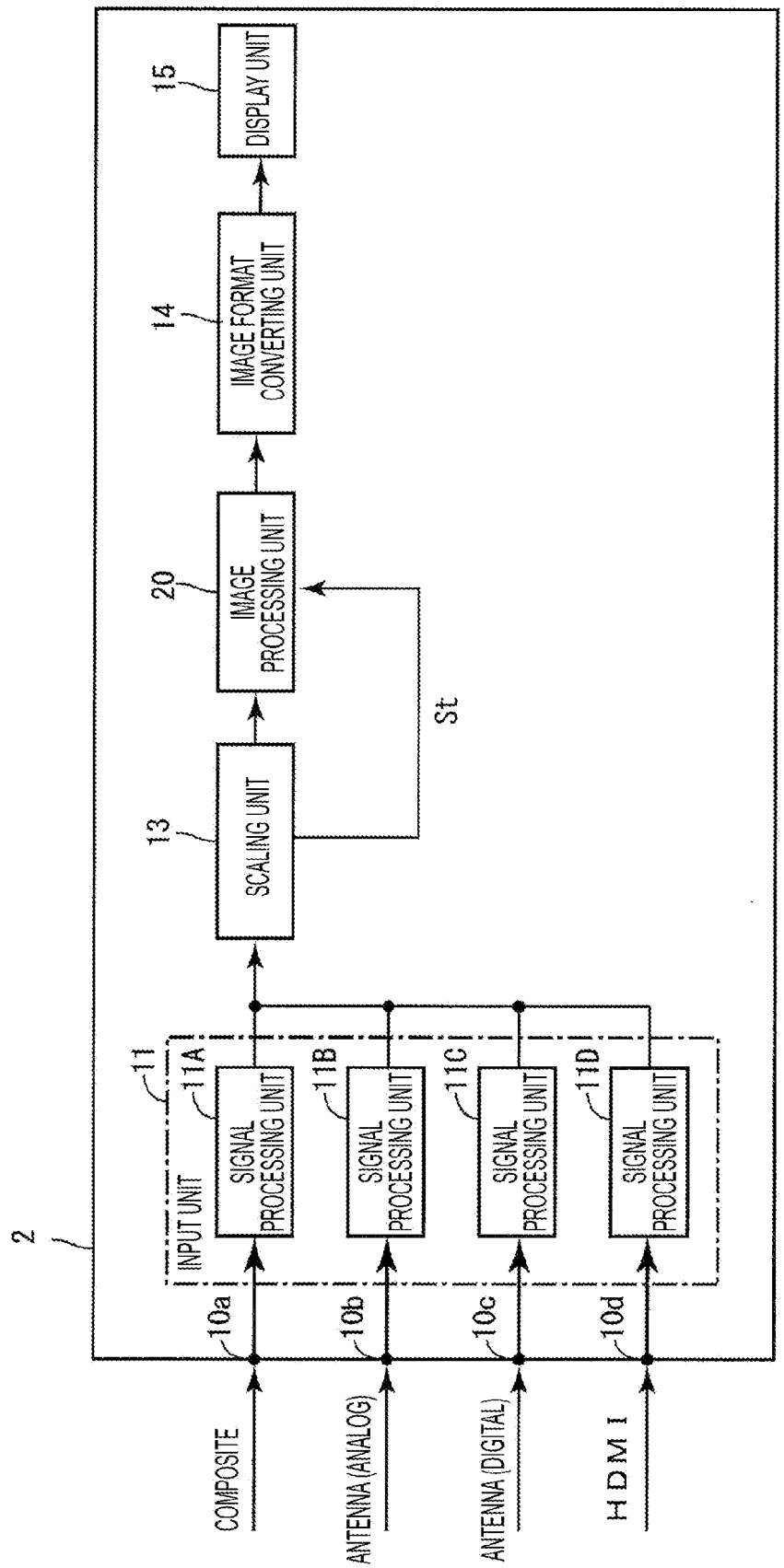
FIG. 25 is a schematic diagram illustrating a configuration of a display device according to a second embodiment of the present invention.

FIG. 25 is a schematic diagram illustrating a configuration of a display device 2 according to a second embodiment of the present invention.

The display device 2 differs from the display device 1 in a method of deciding the parameter Pm and the parameter Pn. In the display device 2, the scaling unit 13 outputs resolution ratio St serving as a ratio of the resolution of an input image and the resolution of an output image to the image processing unit 20. More specifically, the scaling unit 13 estimates horizontal resolution and vertical resolution from a horizontal synchronous signal and a vertical synchronous signal included in an input signal, respectively, and calculates the resolution ratio St of the resolution of the output image. The parameter deciding unit 20b decides the parameter Pm and the parameter Pn using the resolution ratio St input from the scaling unit 13 as the enlargement factor.

Figure 26:
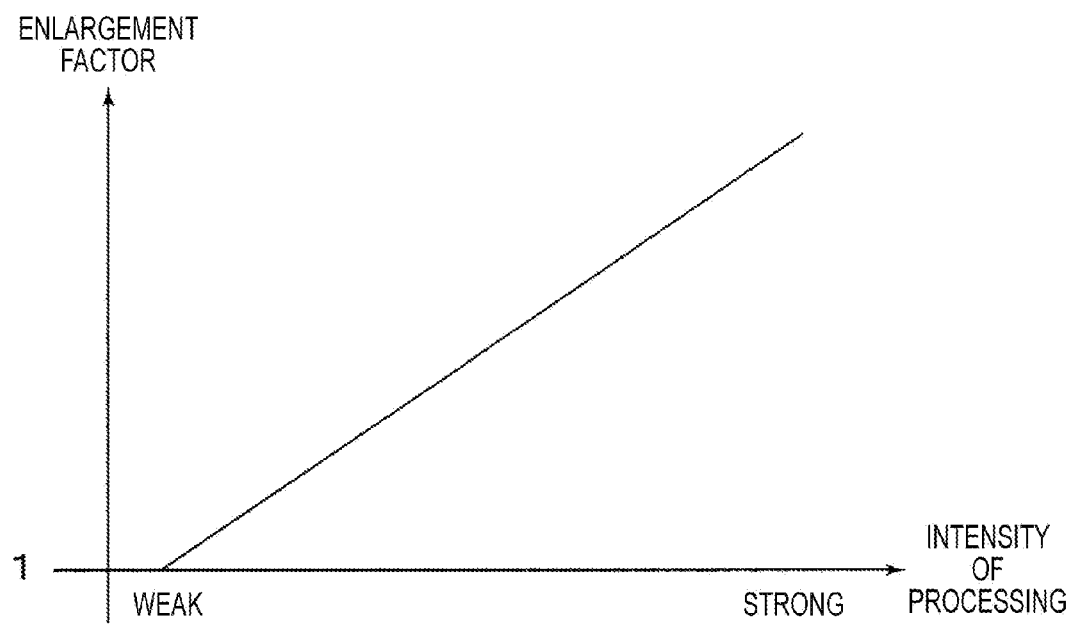
FIG. 26 is a diagram schematically illustrating a relation between an enlargement factor and intensity of processing by a low pass filter unit and a high frequency expanding unit.

FIG. 26 is a diagram schematically illustrating a relation between the enlargement factor and the intensity of processing by the low pass filter unit 20a and the high frequency expanding unit 27.

As the enlargement factor is increased, the jaggy is increased, and the noise is increased. For this reason, it is desirable to enhance processing by the low pass filter unit 20a and the high frequency expanding unit 27 as the enlargement factor is increased as illustrated in FIG. 26. Here, even when the enlargement factor is 1 (when the interpolation and the like are not performed), it is desirable to perform the processing weakly instead of stopping all processing by the low pass filter unit 20a and the high frequency expanding unit 27 in order to enhance by removing a fine noise. FIG. 26 illustrates that the enlargement factor is in proportion to the intensity of processing by the low pass filter unit 20a and the high frequency expanding unit 27, but the relation may be non-linear.

According to the present embodiment, it is possible to perform appropriate image processing even when it is difficult to determine input resolution based on only terminal information as in the case of the HDMI signal in the first embodiment.

Third Embodiment

Figure 27:
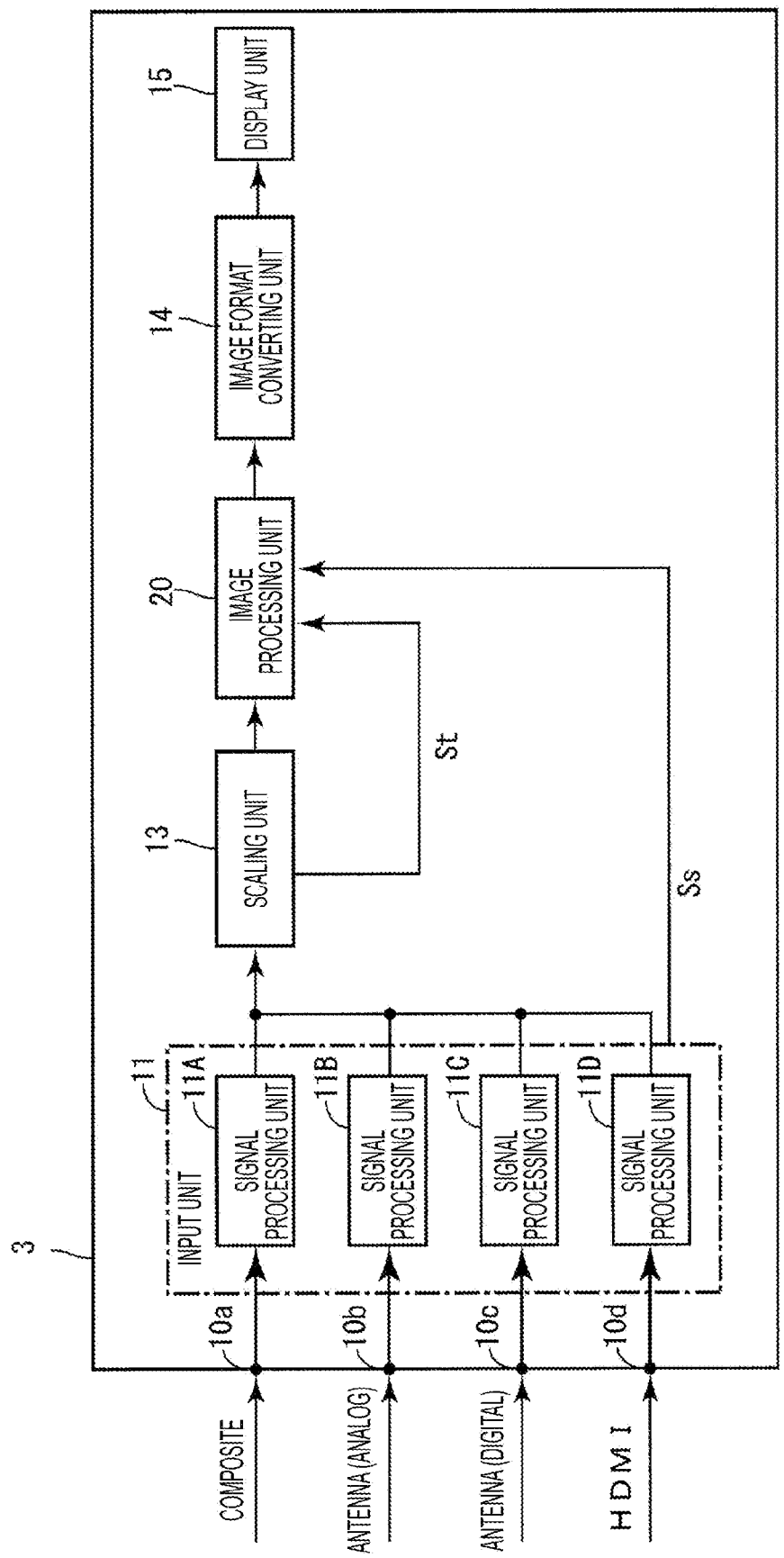
FIG. 27 is a schematic diagram illustrating a configuration of a display device according to a third embodiment of the present invention.

FIG. 27 is a schematic diagram illustrating a configuration of a display device 3 according to a third embodiment of the present invention.

The display device 3 differs from the display device 1 and the display device 2 in a method of deciding the parameter Pm and the parameter Pn. In the display device 3, the input unit 11 outputs the signal Ss identifying the input signal to the image processing unit 20, the scaling unit 13 calculates the resolution ratio St, and the calculated enlargement factor to the image processing unit 20. The parameter deciding unit 20b decides the parameter Pm and the parameter Pn based on the signal Ss input from the input unit 11 and the resolution ratio St input from the scaling unit 13.

An example of a relation among an input terminal (terminal), input resolution, and intensity of processing (processing intensity) by the low pass filter unit 20a and the high frequency expanding unit 27 in the present embodiment is shown in Table 2.

TABLE 2

| Terminal | Input resolution | Processing intensity |
| --- | --- | --- |
| Composite | SD | Strong |
| Antenna (analog) | SD | Strong |
| Antenna (digital) | HD | weak |
| HDMI | SD to HD | Changed according to enlargement factor |

As shown in Table 2, it is possible to determine input resolution of input signals from the composite terminal, the antenna (analog) terminal, and the antenna (digital) terminal based on terminal information. For this reason, when the signals are selected, the parameter deciding unit 20b decides intensity of processing based on the signal Ss input from the input unit 11. On the other hand, it is difficult to determine the input resolution of the input signal from the HDMI terminal based on only the terminal information. In this case, the parameter deciding unit 20b decides intensity of processing using the resolution ratio St input from the scaling unit 13 as the enlargement factor.

In the present embodiment, intensity of processing is decided using the resolution ratio St as the enlargement factor only when it is difficult to determine the input resolution based on the terminal information. According to this configuration, compared to the case of the display device 2 according to the second embodiment, it is possible to reduce the size of a circuit related to image processing and reduce a manufacturing cost.

First Modified Example

Next, in a first modified example of the present embodiment, the same components and processes as in the above embodiment are denoted by the same reference numerals, and the description proceeds. The display device 1 (see FIG. 1) according to the present modified example includes an image processing unit 30 instead of the image processing unit 20.

Figure 28:
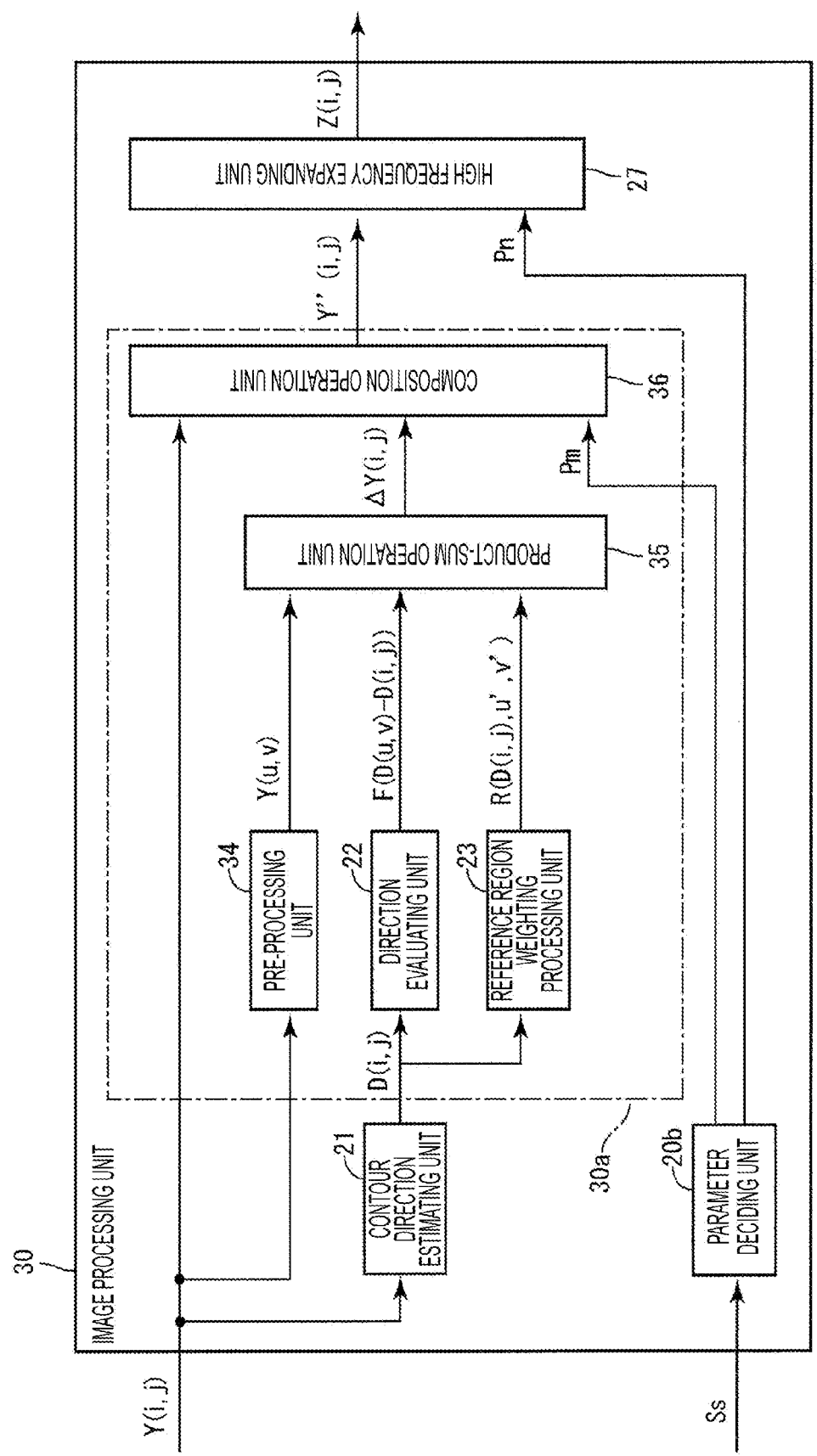
FIG. 28 is a schematic diagram illustrating a configuration of an image processing unit according to a first modified example of the present embodiment.

FIG. 28 is a schematic diagram illustrating a configuration of the image processing unit 30 according to the present modified example.

The image processing unit 30 is configured to include a contour direction estimating unit 21, a direction evaluating unit 22, a reference region weighting processing unit 23, a pre-processing unit 34, a product-sum operation unit 35, a composition operation unit 36, the parameter deciding unit 20b, and a high frequency expanding unit 27. In other words, the image processing unit 30 includes the pre-processing unit 34, the product-sum operation unit 35, and the composition operation unit 36 in a low pass filter unit 30a instead of the pre-processing unit 24, the product-sum operation unit 25, and the composition operation unit 26 in the low pass filter unit 20a of the image processing unit 20.

The pre-processing unit 34 extracts the brightness signal indicating the signal value Y(u,v) of each reference pixel (u,v) belonging to the reference region centering on the pixel of interest (i,j) from the brightness signal Y input from the scaling unit 13 for each pixel of interest (i,j). The pre-processing unit 34 subtracts the signal value Y(i,j) of the pixel of interest from the signal value Y(u,v) of the reference signal indicated by the extracted brightness signal, and calculates the differential signal value Y(u,v)−Y(i,j). The pre-processing unit 34 generates a differential signal indicating the calculated differential signal value, and outputs the generated differential signal to the product-sum operation unit 35.

The product-sum operation unit 35 receives the direction evaluation value information, the reference region weighting information, and the differential signal from the direction evaluating unit 22, the reference region weighting processing unit 23, and the pre-processing unit 34, respectively, for each pixel of interest (i,j).

The product-sum operation unit 35 calculates a smoothing differential value Y(i,j) by performing the product-sum operation on the differential signal value Y(u,v)−Y(i,j) indicated by the differential signal, the direction evaluation value F(|ΔD|) indicated by the direction evaluation value information, and the reference region weighting R(D(i,j),u', v') indicated by the reference region weighting information. The product-sum operation unit 35 uses, for example, Formula (9) to calculate the smoothing differential value Y(i,j).

[Mathematical Formula 9]

$$\Delta Y(i, j) = \frac{1}{N(i, j)} \left( \sum_{u', v'} F(|\Delta D|) R(D(i, j), u', v')(Y(u, v) - Y(i, j)) \right) \quad (9)$$

Formula (9) represents that the product of the direction evaluation value F(|ΔD|), the reference region weighting R(D(i,j),u',v'), and the differential signal value Y(u,v)−Y(i,j) indicated by the differential value is calculated for each reference pixel, and the sum of the calculated products for the reference pixels belonging to the reference region is calculated. Formula (9) represents that the smoothing differential value Y(i,j) is calculated by dividing the calculated sum by the reference area N(i,j). The product-sum operation unit 35 generates a smoothing differential signal indicating the calculated smoothing differential value Y(i,j), and outputs the generated smoothing differential signal to the composition operation unit 36.

The composition operation unit 36 receives the parameter Pm from the parameter deciding unit 20b, receives the smoothing differential signal from the product-sum operation unit 35, and receives the brightness signal Y from the scaling unit 13. The composition operation unit 36 calculates a low pass signal value Y"(i,j) by performing an addition (a composition operation) of the product of the smoothing differential value ΔY(i,j) indicated by the smoothing differential signal and the parameter Pm to the signal value Y(i,j) indicated by the brightness signal Y for each pixel of interest (i,j). The low pass signal value Y"(i,j) becomes the same value as the low pass signal value Y"(i,j) calculated using Formula (7).

The composition operation unit 36 outputs the brightness signal Y" based on the calculated low pass signal value Y"(i,j) to the high frequency expanding unit 27.

Next, image processing according to the present modified example will be described.

Figure 29:
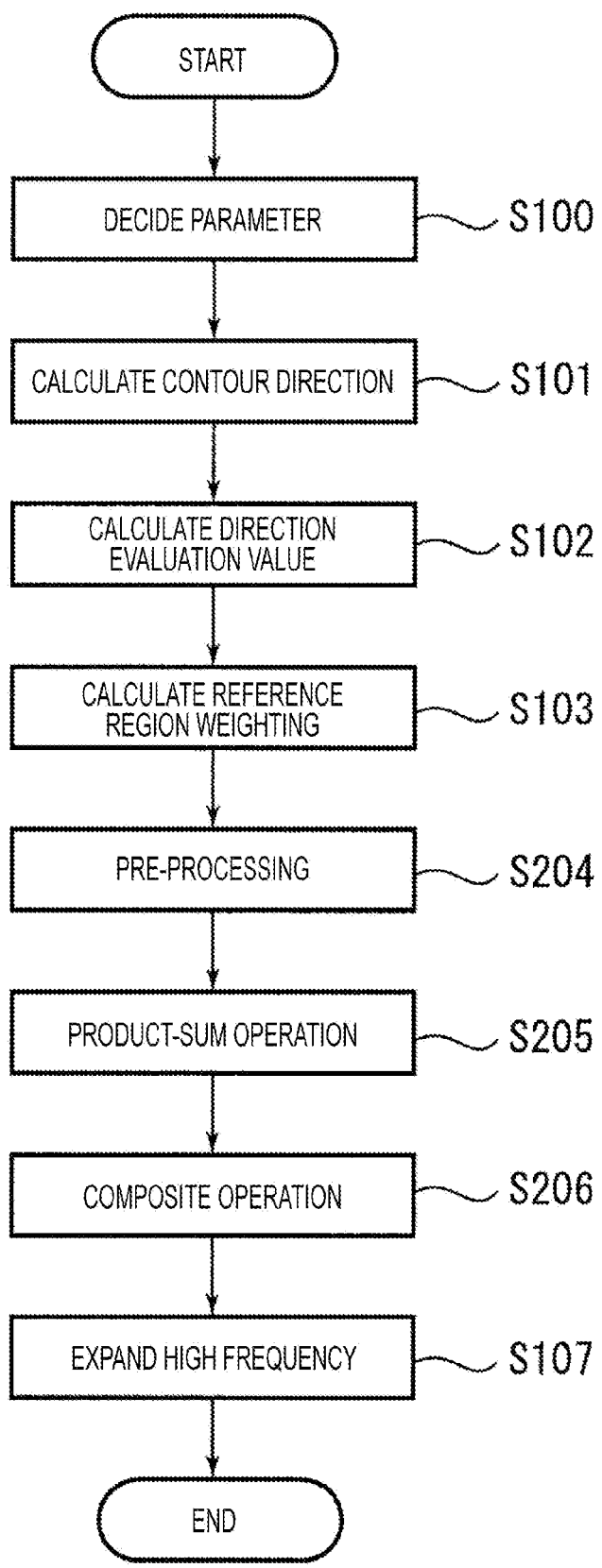
FIG. 29 is a flowchart illustrating image processing according to the present modified example.

FIG. 29 is a flowchart illustrating image processing according to the present modified example.

The image processing according to the present modified example includes steps S204 to S206 instead of steps S104 to S106 in image processing illustrated in FIG. 24. Step S204 is performed after step S103.

(Step S204) The pre-processing unit 34 extracts the brightness signal indicating the signal value Y(u,v) of each reference pixel (u,v) belonging to the reference region centering on the pixel of interest (i,j) from the brightness signal Y input from the scaling unit 13 for each pixel of interest (i,j). The pre-processing unit 34 calculates the differential signal value Y(u,v)−Y(i,j) based on the extracted brightness signal (pre-processing). The pre-processing unit 34 outputs the differential value indicating the calculated differential signal value to the product-sum operation unit 35.

Thereafter, the process proceeds to step S205.

(Step S205) The product-sum operation unit 35 receives the direction evaluation value information, the reference region weighting information, and the differential signal from the direction evaluating unit 22, the reference region weighting processing unit 23, and the pre-processing unit 34, respectively, for each pixel of interest (i, j). The product-sum operation unit 35 calculates the smoothing differential signal Y(i,j), for example, using Formula (8) based on the differential signal value Y(u,v)−Y(i,j) indicated by the differential value, the direction evaluation value F(|ΔD|) indicated by the direction evaluation value information, and the reference region weighting R(D(i,j),u',v') indicated by the reference region weighting information. The product-sum operation unit 35 outputs the smoothing differential signal indicating the calculated smoothing differential value Y(i,j) to the composition operation unit 36. Thereafter, the process proceeds to step S206.

(Step S206) The composition operation unit 36 calculates the low pass signal value Y"(i,j) by adding the product of the smoothing differential value Y(i,j) indicated by the smoothing differential signal input from the product-sum operation unit 35 and the parameter Pm to the signal value Y(i,j) indicated by the brightness signal Y input from the scaling unit 13. The composition operation unit 36 outputs the brightness signal Y" indicating the calculated low pass signal value Y"(i,j) to the high frequency expanding unit 27. Thereafter, the process proceeds to step S107.

As described above, in the present modified example, the composition signal value of each pixel is calculated using the value obtained by performing the product-sum operation on the differential signal value based on the signal value of each reference pixel between the reference pixels that are in the direction of the predetermined range from the contour direction of each pixel. As a result, it is possible to reduce a processing amount without undermining the effect of removing or reducing the noise of the visually sensitive contour direction.

Second Modified Example

Next, in a second modified example of the present embodiment, the same components and processes as in the above embodiment are denoted by the same reference numerals, and the description proceeds. The display device 1 (see FIG. 1) according to the present modified example includes an image processing unit 40 instead of the image processing unit 20.

Figure 30:
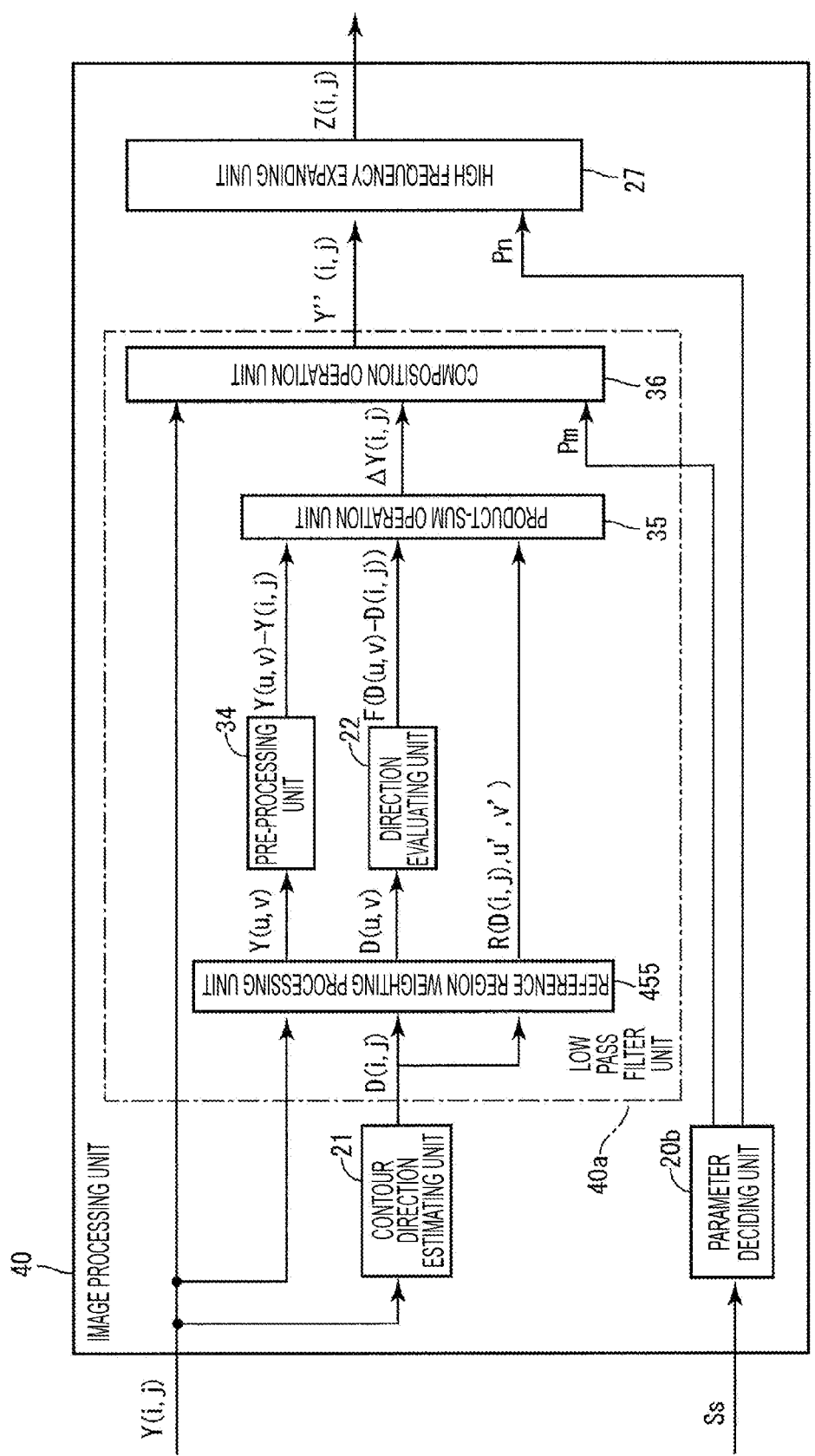
FIG. 30 is a schematic diagram illustrating a configuration of an image processing unit according to a second modified example of the present embodiment.

FIG. 30 is a schematic diagram illustrating a configuration of the image processing unit 40 according to the present modified example.

The image processing unit 40 is configured to include a contour direction estimating unit 21, a direction evaluating unit 22, a reference region weighting processing unit 43, a pre-processing unit 34, a product-sum operation unit 35, a composition operation unit 36, the parameter deciding unit 20b, and a high frequency expanding unit 27. In other words, the image processing unit 40 includes the reference region weighting processing unit 43 in a low pass filter unit 40a instead of the reference region weighting processing unit 23 in the low pass filter unit 30a of the image processing unit 30.

The reference region weighting processing unit 43 decides the weighting coefficient R(D(i,j),u',v') based on the quantization contour direction D(i,j) of each pixel indicated by the quantization contour direction information input from the contour direction estimating unit 21, similarly to the reference region weighting processing unit 23. The reference region weighting processing unit 43 selects the weighting coefficient R(D(i,j),u',v') of each reference pixel (u',v') in which (D(i,j),u',v') has a non-zero value among the weighting coefficients R(D(i,j),u',v'). The reference pixel is positioned in the contour direction or in the direction approximating to the contour direction from the pixel of interest (i,j) and thus referred to as a contour direction reference pixel. The reference region weighting processing unit 43 generates the reference region weighting information indicating the weighting coefficient R(D(i,j),u',v') related to each contour direction reference pixel, and outputs the generated reference region weighting information to the product-sum operation unit 35.

The reference region weighting processing unit 43 extracts the quantization contour direction information indicating the quantization contour direction D(u,v) related to each contour direction reference pixel from the input quantization contour direction information. The reference region weighting processing unit 43 outputs the extracted quantization contour direction information to the direction evaluating unit 22.

The reference region weighting processing unit 43 extracts the brightness signal indicating the signal value Y(u,v) related to each contour direction reference pixel from the brightness signal input from the scaling unit 13. The reference region weighting processing unit 43 outputs the extracted brightness signal to the pre-processing unit 34.

The pre-processing unit 34, the direction evaluating unit 22, and the product-sum operation unit 35 perform the product-sum operation on the direction evaluation value F(|ΔD|), the weighting coefficient R(D(i,j),u',v'), and the differential value Y(u,v)−Y(i,j) to calculate the smoothing differential value Y(i,j) for each contour direction reference pixel. Here, the product-sum operation unit 35 uses Formula (10) instead of Formula (9).

[Mathematical Formula 10]

$$\Delta Y(i,j) = \frac{1}{N(i,j)}\left(\sum_{u',v' \in Rs(D(i,j))} F(|\Delta D|)R(D(i,j),u',v')(Y(u,v)-Y(i,j))\right) \quad (10)$$

In Formula (10), $R_s(D(i,j))$ indicates a function (a region selection function) of selecting the contour direction reference pixel among the reference pixels related to the pixel of interest (i, j). In other words, u',v'∈Rs (D(i,j)) indicates the contour direction reference pixel. Thus, the product-sum operation unit 35 can calculate the smoothing differential value Y(i,j) equal to the smoothing differential value Y(i,j) calculated when Formula (9) is used.

As described above, the reference region weighting processing unit 43 extracts the signal value or the coefficient related to each contour direction reference pixel and thus can reduce a computation amount in the pre-processing unit 34, the direction evaluating unit 22, and the product-sum operation unit 35 while obtaining the same operation result as in the first modified example.

Next, the image processing according to the present modified example will be described.

Figure 31:
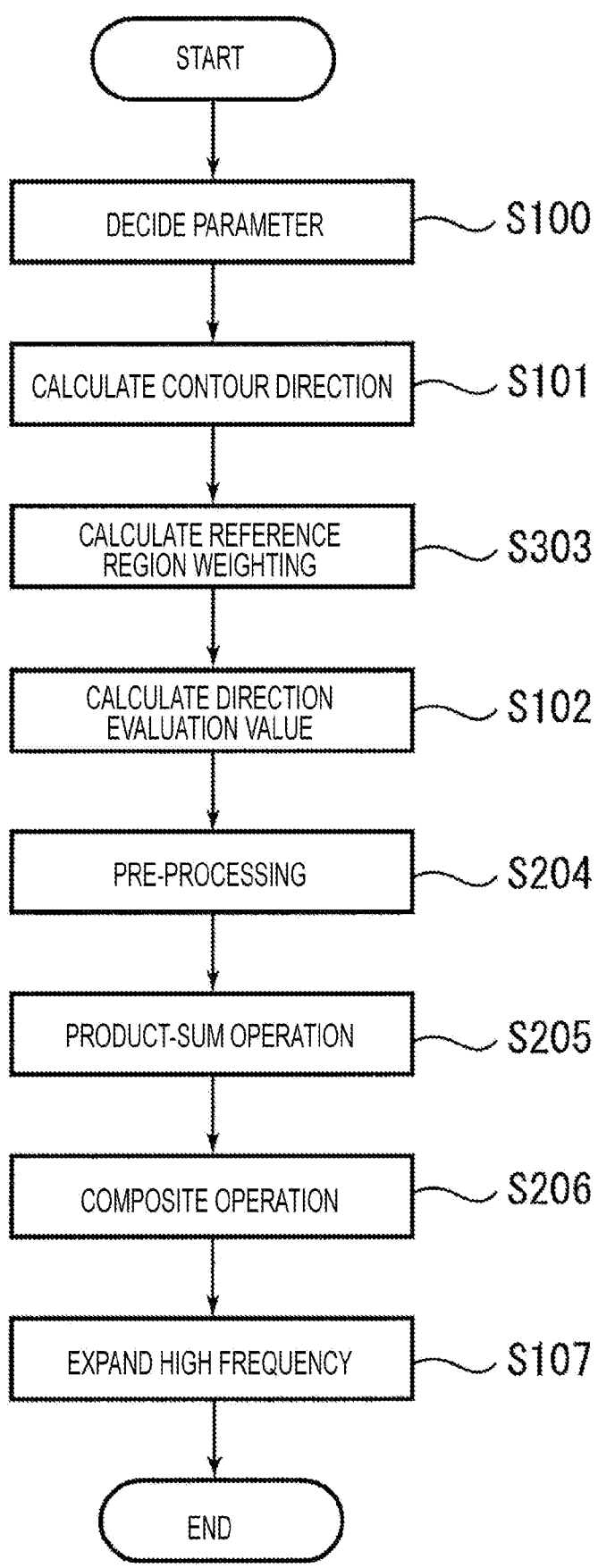
FIG. 31 is a flowchart illustrating image processing according to the present modified example.

FIG. 31 is a flowchart illustrating the image processing according to the present modified example.

The image processing according to the present modified example includes step S303 instead of step S103 in image processing illustrated in FIG. 29. Step S303 is performed after step S101. Step S204 is performed after step S102. Steps S204 to S206 are performed on each contour direction reference pixel instead of each reference pixel of each pixel of interest.

(Step S303) The reference region weighting processing unit 43 decides the weighting coefficient R(D(i,j),u',v') for each pixel based on the quantization contour direction information input from the contour direction estimating unit 21. The reference region weighting processing unit 43 selects a weighting coefficient R(D(i,j),u',v') having a non-zero value among the decided weighting coefficients R(D(i,j),u',v') as the weighting coefficient R(D(i,j),u',v') of each contour direction reference pixel. The reference region weighting processing unit 43 outputs the reference region weighting information indicating the selected weighting coefficient R(D(i,j),u',v') to the product-sum operation unit 35. The reference region weighting processing unit 43 extracts the quantization contour direction information indicating the quantization contour direction D(u,v) related to each contour direction reference pixel from the input quantization contour direction information, and outputs the extracted quantization contour direction information to the direction evaluating unit 22. The reference region weighting processing unit 43 extracts the brightness signal indicating the signal value Y(u,v) related to each contour direction reference pixel from the brightness signal input from the scaling unit 13, and outputs the extracted brightness signal to the pre-processing unit 34. Thereafter, the process proceeds to step S102.

As described above, in the present modified example, the weighting coefficient, the evaluation value, and the signal value of each reference pixel that is in the direction of the predetermined range from the contour direction of each image are extracted, and the product-sum operation is performed using the extracted weighting coefficient, the evaluation value, and the signal value of each reference pixel. Thus, the weighting coefficient, the evaluation value, and the signal value that do not contribute to the operation result are excluded. Thus, it is possible to reduce a processing amount related to an operation and the storage capacity of the storage unit without undermining the effect of removing or reducing the noise of the visually sensitive contour direction with the relative small computation amount.

Third Modified Example

Next, in a third modified example of the present embodiment, the same components and processes as in the above embodiment are denoted by the same reference numerals, and the description proceeds. The display device 1 (see FIG. 1) according to the present modified example includes a high frequency expanding unit 37 instead of the high frequency expanding unit 27 in the image processing unit 20 (FIG. 2), the image processing unit 30 (FIG. 28), or the image processing unit 40 (FIG. 30).

Figure 32:
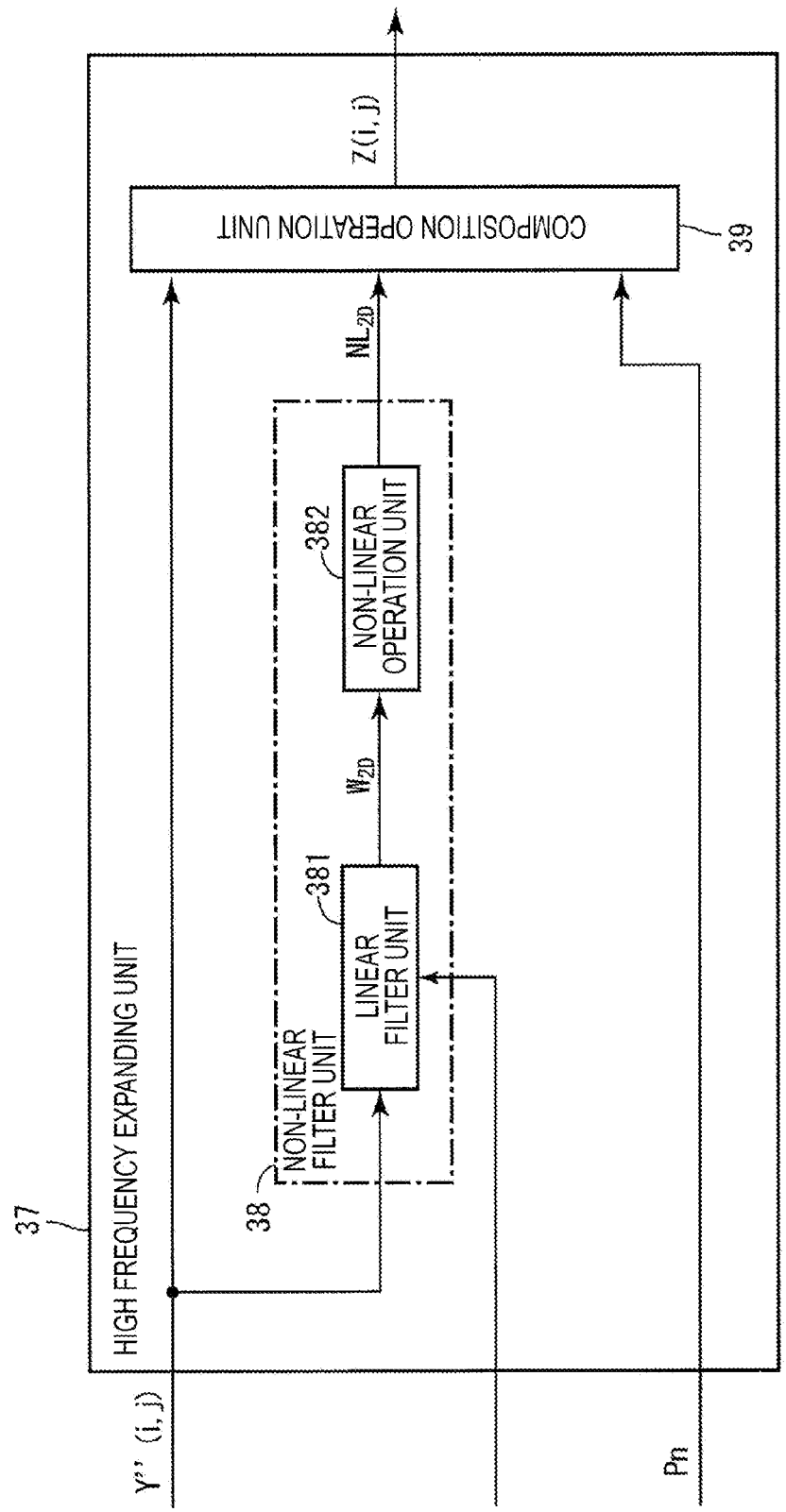
FIG. 32 is a schematic diagram illustrating a configuration of a high frequency expanding unit according to a third modified example of the present embodiment.

FIG. 32 is a schematic diagram illustrating a configuration of the high frequency expanding unit 37 according to the present modified example.

The high frequency expanding unit 37 is configured to include a non-linear filter unit 38 and a composition operation unit 39.

The non-linear filter unit 38 is configured to include a 2D high pass filter unit 381 and a non-linear operation unit 382.

The 2D high pass filter unit 381 receives the brightness signal Y" and the quantization contour direction information from the composition operation unit 26 (or the composition operation unit 36) and the contour direction estimating unit 21, respectively. The 2D high pass filter unit 381 calculates a contour direction component signal $W_{2D}$ indicating a high-pass component related to the quantization contour direction $D(i,j)$ indicated by the quantization contour direction information for the low pass signal value $Y"(i,j)$ indicated by the brightness signal Y". The 2D high pass filter unit 381 outputs the calculated contour direction component signal $W_{2D}$ to the non-linear operation unit 382. A configuration of the 2D high pass filter unit 381 will be described later.

The non-linear operation unit 382 has the same configuration as the non-linear operation unit 282-A or 282-B. The non-linear operation unit 382 performs the non-linear operation on the signal value indicated by the direction component signal $W_{2D}$ input from the 2D high pass filter unit 381. The non-linear operation unit 382 outputs the high frequency component value $NL_{2D}$ indicated by the calculated non-linear output value to the composition operation unit 39.

The composition operation unit 39 has the same configuration as the composition operation unit 29. The composition operation unit 39 calculates the high frequency extension signal value $Z(i,j)$ by adding (synthesizing) the low pass signal value $Y"(i,j)$ to the product of the high frequency component value $NL_{2D}$ input from the non-linear operation unit 382 and the parameter Pn. The composition operation unit 39 generates the brightness signal Z indicating the calculated high frequency extension signal value $Z(i,j)$, updates the brightness signal Y input from the scaling unit 13 to the brightness signal Z, and synthesizes the brightness signal Z with the color-difference signals Cb and Cr. The composition operation unit 39 outputs an image signal including the brightness signal Z and the color-difference signals Cb and Cr to the image format converting unit 14.

Next, a configuration of the 2D high pass filter unit 381 will be described.

Figure 33:
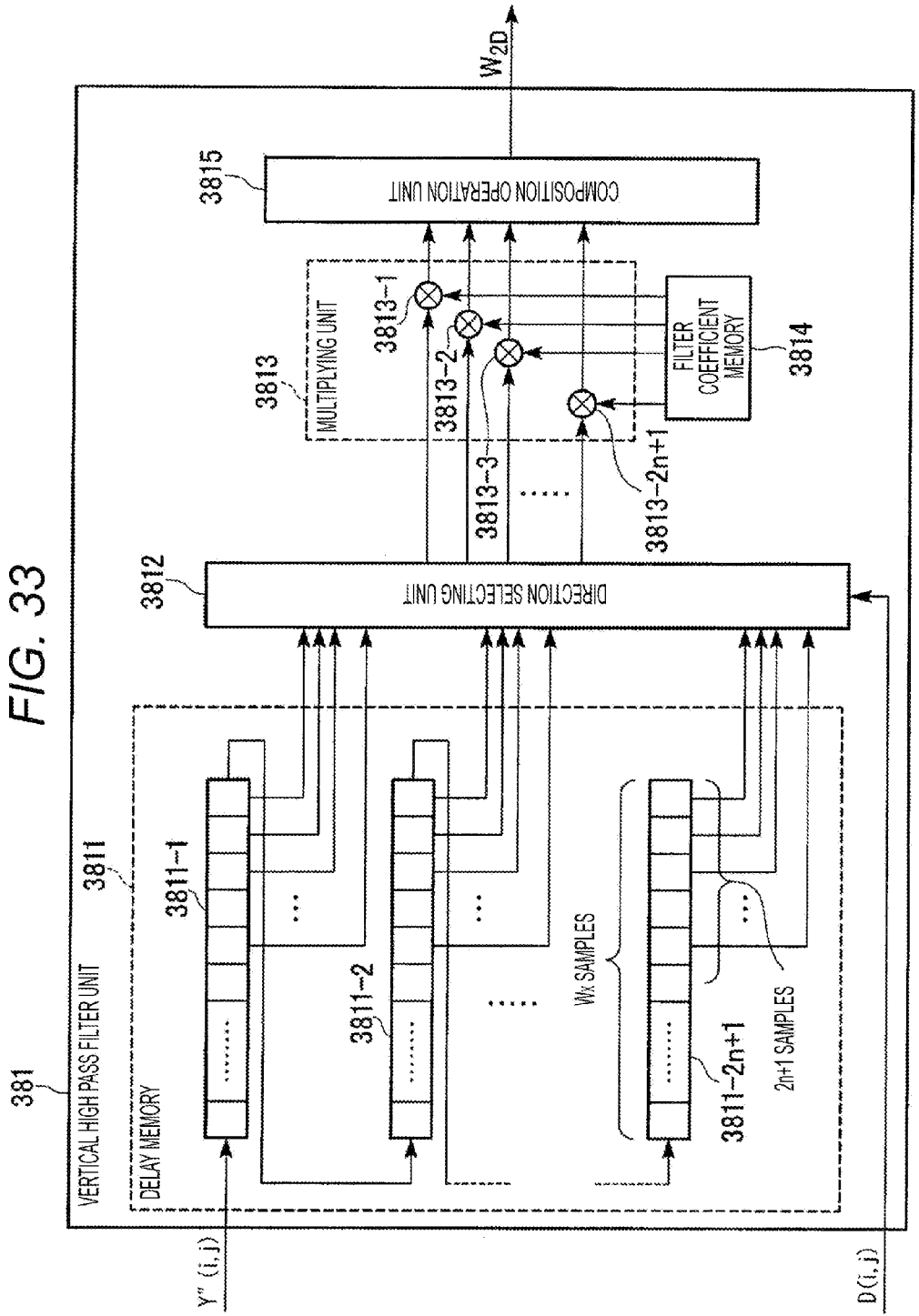
FIG. 33 is a schematic diagram illustrating a configuration of a 2D high pass filter unit according to the present modified example.

FIG. 33 is a schematic diagram illustrating a configuration of the 2D high pass filter unit 381 according to the present modified example.

The 2D high pass filter unit 381 is configured to include a delay memory 3811, a direction selecting unit 3812, a multiplying unit 3813, a filter coefficient memory 3814, and a composition operation unit 3815.

The delay memory 3811 includes delay elements 3811-1 to 3811-2n+1 that delay an input signal by 2n+1 $W_x$ samples. The delay elements 2811-v-1 to 2811-v-2n+1 output delay signals including signals value of 2n+1 samples obtained by delaying the input signal by $W_x$–2n, $W_x$–2n+1, . . . , and $W_x$ samples to the direction selecting unit 3812.

The delay elements 3811-1 to 3811-2n+1 are connected in series. One end of the delay element 3811-1 receives the low pass signal value $Y"(i,j)$ indicated by the brightness signal Y", and the other end of the delay element 3811-1 outputs the delay signal obtained by delaying by $W_x$ samples to one end of the delay element 3811-2. One ends of the delay element 3811-2 to 3811-2n+1 receive the delay signals obtained by delaying by $W_x$ to $2n \cdot W_x$ samples from the other ends of the delay elements 3811-1 to 3811-2n. The other end of the delay element 3811-2n+1 outputs the delay signal obtained by delaying $(2n+1) \cdot W_x$ samples to the direction selecting unit 3812. Thus, the signal values of $(2n+1) \cdot (2n+1)$ pixels neighboring one another in the horizontal direction and the vertical direction centering on the pixel of interest, which indicate the brightness signal Y", are output to the direction selecting unit 3812.

The pixels corresponding to the signal values are the reference pixels belonging to the reference region centering on the pixel of interest.

The direction selecting unit 3812 selects the reference pixel (u',v') that is in the quantization contour direction D from the pixel of interest (i,j) or the direction approximating to the quantization contour direction D based on the quantization contour direction $D(i,j)$ of each pixel indicated by the quantization contour direction information input from the contour direction estimating unit 21. For example, a reference pixel to be selected is a reference pixel satisfying the following condition: (1) a reference pixel (u',v') through which a line segment extending from the center of the pixel of interest (i,j) in the quantization contour direction passes; (2) a length in the horizontal direction or the vertical direction by which the line segment passes through is 0.5 pixel or larger; and (3) one reference pixel is selected for each of 2n+1 coordinates in at least one of the horizontal direction and the vertical direction. Hereinafter, the selected reference pixel is also referred to as a selection reference pixel.

The direction selecting unit 3812 determines whether a direction (hereinafter, also referred to as a "selection coordinates direction") in which each reference pixel is selected is the horizontal direction, the vertical direction, or both of the horizontal direction and the vertical direction for each of 2n+1 coordinates. For example, the direction selecting unit 3812 outputs signal values related to the 2n+1 selection reference pixels to the multiplying unit 3813 in the descending order of the indices of the selection coordinates directions.

The direction selecting unit 3812 may include a storage unit in which selection reference pixel information indicating the selection reference pixel of each quantization contour direction is stored in advance and select the selection reference pixel information corresponding to the quantization contour direction $D(i,j)$ of the pixel of interest (i,j). As a result, the direction selecting unit 3812 outputs the signal value related to the selection reference pixel indicated by the selected selection reference pixel information to the multiplying unit 3813.

Next, an exemplary selection reference pixel will be described.

Figure 34:
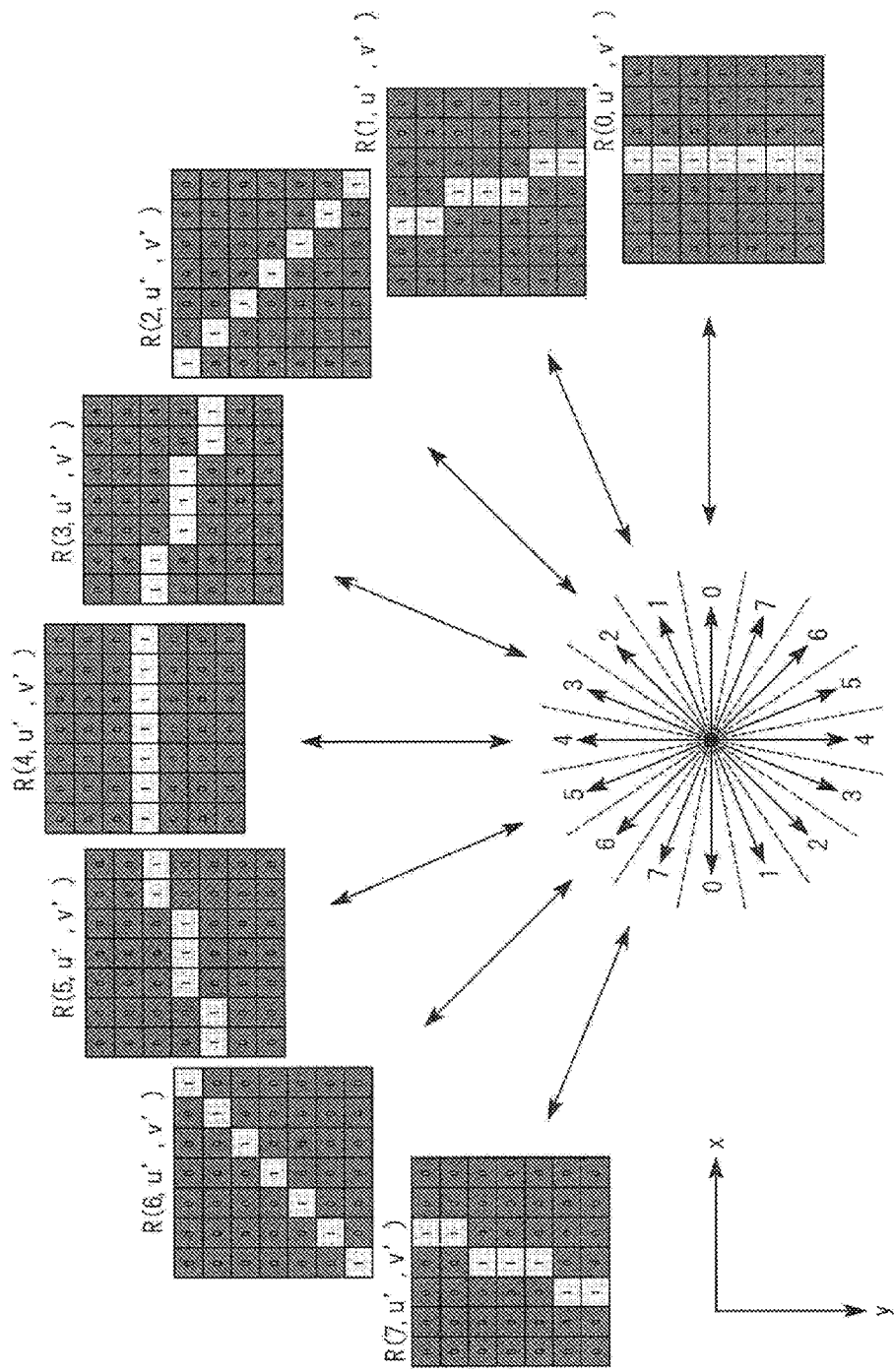
FIG. 34 is a conceptual diagram illustrating an exemplary selection reference pixel.

FIG. 34 is a conceptual diagram illustrating an exemplary selection reference pixel.

A relation between a horizontal axis and a vertical axis and arrows indicating quantization contour directions of FIG. 34 are the same as in FIG. 17.

Each of grid-like diagrams in directions in which arrows indicated by numerical values 0 to 7 counterclockwise from the right side of an original point move toward an upper half plane indicates selection reference pixel $R_s$ $(D(i,j),u',v')$ corresponding to the quantization contour direction $D(i,j)$. In FIG. 34, the number of reference images is 7 in the horizontal direction and 7 in the vertical direction. A numerical value shown in each quadrangle included in the grid-like diagram is a numerical value $R_s$ $(0,u',v')$ indicating whether or not each pixel is the selection reference pixel. 1 indicates that a pixel is the selection reference pixel, and 0 indicates that a pixel is not the selection reference pixel.

For example, the selection reference pixels $R_s$ (0,u',v') corresponding to the quantization contour direction 0 are all reference pixels in a fourth column. The reference pixels in the other columns are not the selection reference pixel. In other words, the selection coordinates direction for the quantization contour direction 0 is the vertical direction. The selection reference pixels corresponding to the quantization contour direction 5 are reference pixels in a first column of a fifth row, a second column of the fifth row, a third column of a fourth row, a fourth column of the fourth row, a fifth column of the fourth row, a sixth column of a third row, and a seventh column of the third row. In other words, the selection coordinates direction for the quantization contour direction 5 is a direction that is closer to the horizontal direction than the vertical direction and oblique to the right.

Referring back to FIG. 33, the multiplying unit 3813 is configured to include 2n+1 multipliers 3813-1 to 3813-2n+1. The multipliers 3813-1 to 3813-2n+1 multiply the signal values input from the direction selecting unit 3812 by the filter coefficients read from the filter coefficient memory 3814, and output multiplication values to the composition operation unit 3815. Here, the signal values are input so that the order of the multipliers 3813-1 to 3813-2n+1 matches the order (the descending order of the indices of the selection coordinates directions) of the signal values input thereto.

The filter coefficient memory 3814 stores 2n+1 filter coefficients $a_{D-n}$, $a_{D-n+1}$, . . . , and $a_{D+n}$ used in the multipliers 3813-1 to 3813-2n+1 in advance. The filter coefficients $a_{D-n}$, $a_{D-n+1}$, . . . , and $a_{D+n}$ are high-pass filter coefficients for implementing the high pass filter through the product-sum operation with the signal value. The high-pass filter coefficient may have a value that has the same high pass characteristics as the filter coefficients $a_{D-n}$, $a_{D-n+1}$, . . . , and $a_{D+n}$ and has characteristics of blocking a DC component. The composition operation unit 3815 adds the 2n+1 multiplication values input from the multiplying unit 3813, and generates a contour direction component signal $W_{2D}$ having a signal value serving as the sum of the 2n+1 multiplication values. The composition operation unit 3815 outputs the generated contour direction component signal $W_{2D}$ to the non-linear operation unit 382.

Next, image processing according to the present modified example will be described.

FIG. 35 is a flowchart illustrating image processing according to the present modified example.

The image processing according to the present modified example includes step S407 instead of step S107 in the image processing illustrated in FIG. 31.

(Step S407) The high frequency expanding unit 37 calculates the contour direction component signal $W_{2D}$ indicating the high-pass component for the quantization contour direction D(i,j) indicated by the quantization contour direction information input from the contour direction estimating unit 21 with respect to the brightness signal Y" input from the composition operation unit 26 (or the composition operation unit 36). The high frequency expanding unit 37 performs the non-linear operation on the signal value indicated by the contour direction component signal $W_{2D}$, and calculates the high frequency component value $NL_{2D}$ indicating the high frequency component. The high frequency expanding unit 37 synthesizes the product of the high frequency component value $NL_{2D}$ and the parameter Pn with the low pass signal value Y"(i,j) indicated by the brightness signal Y", and calculates the high frequency extension signal value Z(i,j). The high frequency expanding unit 27 outputs the brightness signal indicating the calculated high frequency extension signal value Z(i,j) to the image format converting unit 14. Thereafter, the process ends.

As described above, in the present modified example, the high frequency component of the contour direction of each image of interest is generated, and the generated high frequency component is synthesized with the low-pass component smoothed in the contour direction. As a result, it is possible to remove or reduce noise in a visually sensitive contour direction and sharpen an image extending in the tangent direction vertical to the contour direction.

(Exemplary Processing)

Next, an exemplary image generated by performing processing according to the present embodiment will be described.

The following description will proceed with an example in which the value of the parameter Pn is 1, and the value of the parameter Pm is 1.

FIG. 36 illustrates exemplary images (images 86 to 88) related to brightness signals before and after processing is performed.

The image 86 is an image indicated by a brightness signal obtained by scaling a brightness signal related to a low resolution image with a triple enlargement factor. Step-like noise (jaggy) occurs in the boundary between a bright region and a dark region of the image 86, and an unclear boundary (blur) is shown.

The image 87 is an image indicated by a brightness signal obtained by performing the processing according to the example of the present embodiment on the brightness signal related to the image 86. In the image 87, the boundary between the bright region and the dark region is smooth, and the step-like noise is removed, and the boundary is clearly shown.

The image 88 is an image indicated by a brightness signal obtained by performing a high-pass component emphasis process performed in the related art on the brightness signal related to the image 86. In the image 88, the boundary between the bright region and the dark region is clearer than in the image 86, but the step-like noise shown in the image 86 is also clearly shown.

As a result, it is clearly shown that the noise is reduced by the processing according to the present embodiment, and the image is sharpened.

FIG. 37 illustrates exemplary spatial frequency characteristics (images 89 to 92) of an image before and after processing is performed.

In the images 89 to 92, a left-right direction indicates a spatial frequency in the horizontal direction, and an up-down direction indicates a spatial frequency in the vertical direction. In the images 89 to 92, the center indicates a zero spatial frequency, that is, a DC component. The images 89 to 92 are images in which the level in each spatial frequency is indicated by the contrasting density. A level is larger in a bright portion, and a level is smaller in a dark portion.

The image 89 shows a spatial frequency characteristic of a low resolution image. In the image 89, dots distributed from an upper right portion to a lower left portion on an oblique line indicate that corresponding spatial frequency components are included in the low resolution image.

The image 90 is an image indicating the spatial frequency characteristic of the image 86. In the image 90, dots distributed from an upper right portion to a lower left portion on an oblique line are shown, but no dot is shown in portions surrounded by dotted lines at upper and lower ends. This represents that the high-pass component is blocked in the scaling process for generating the image 86. A lack of the high-pass component causes the boundary to be unclear.

Meanwhile, dots are shown in portions surrounded by alternated long and short dash lines of the image 90 at both left and right sides. This represents that aliasing occurs with the scaling. The aliasing corresponds to the step-like noise in the image 86.

The image 91 is an image indicating a spatial frequency characteristic of the image 87, that is, an image obtained by performing the processing according to the present embodiment. In the image 91, the same dots as in the image 89 are shown even in portions surrounded by the dotted lines. This represents that the lack of the high-pass component in the image 86 is compensated, and the boundary in the image 87 becomes clear. In the image 91, no dot is shown in the same frequency regions as the portions surrounded by the alternated long and short dash lines of the image 90. This represents that the step-like noise shown in the image 86 has been removed.

The image 92 is an image indicating a spatial frequency characteristic of the image 86, that is, an image obtained by the high-pass component emphasis process. In portions surrounded by alternated long and short dash lines at the left and right sides of the image 92, dots are shown more noticeably than in the image 90. This represents that as the high-pass component is emphasized, aliasing is also emphasized, and the step-like noise is clearly shown in the image 88.

Next, exemplary data used or generated in the present embodiment will be described.

Figure 38:
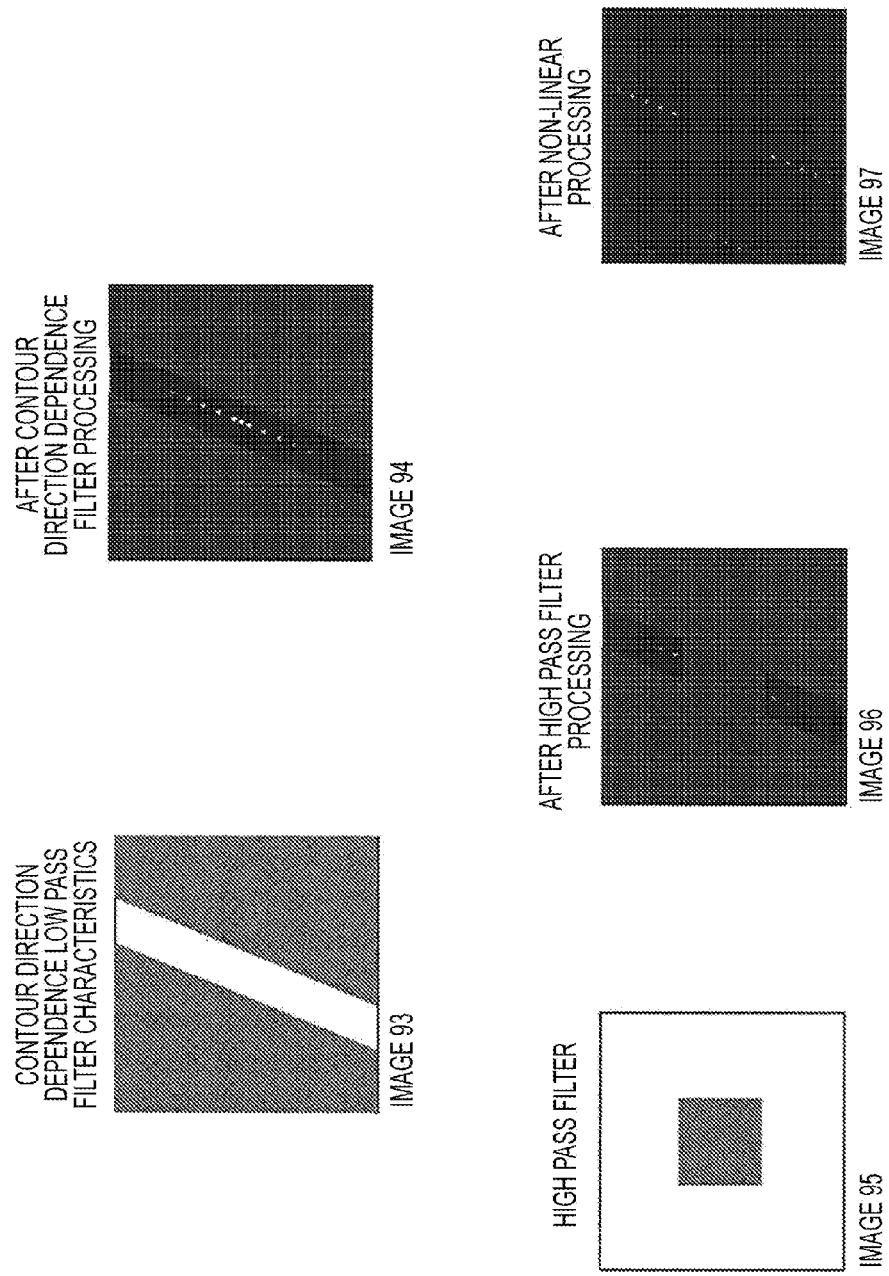
FIG. 38 illustrates a spatial frequency characteristic of data used or generated in the present embodiment.

FIG. 38 illustrates spatial frequency characteristic (images 93 to 97) of data used or generated in the present embodiment.

In the images 93 to 97, a left-right direction indicates a spatial frequency in the horizontal direction, and an up-down direction indicates a spatial frequency in the vertical direction. In the images 93 to 97, the center indicates a zero spatial frequency, that is, a DC component. In the images 94, 96, and 97, a level is large in a bright portion, and a level is small in a dark portion.

The image 93 is an image indicating filter characteristics of the low pass filter unit 20$a$ for the brightness signal Y. In the image 93, a shaded region is a blocking region, and a white region is a passing region. The passing region is a strip-like region extending from an upper right to a lower left. Thus, the low pass filter unit 20$a$ transmits a frequency component lower than a blocking frequency among spatial frequency components corresponding to the contour direction, and transmits spatial frequency components corresponding to the other directions without band limitation. Through this operation, the low pass filter unit 20$a$ performs smoothing on the signal values in the contour direction. The blocking frequency may differ according to the selected direction evaluation region weighting but is averagely smaller than $f_s/(2 \cdot n)$ when the size of the reference region (the number of pixels in one direction) is decided to be 2n+1. $f_s$ is a sampling frequency of a brightness signal of a processing target, and $f_s/(2 \cdot n)$ corresponds to a Nyquist frequency $f_{nyq}'$ of a brightness signal before enlarged.

The image 94 is an image indicating a spatial frequency characteristic of the brightness signal Y" indicated by the low pass signal value Y"(i,j) output from the low pass filter unit 20$a$. In the image 94, dots passing through the central portion of the image 90 are shown, but dots at both left and right sides are not shown. This represents that the spatial frequency component corresponding to the contour direction has been extracted by the low pass filter unit 20$a$. It represents that the step-like noise occurring by the aliasing has been consequently removed.

The image 95 is an image indicating filter characteristics in which the filter characteristics of the horizontal high pass filter unit 281-$h$ is synthesized with the filter characteristics of the vertical high pass filter unit 281-$v$. In the image 93, a shaded region is a blocking region, and a white region is a passing region. The passing region is a frame-like region surrounding the blocking region of a quadrangle centering an original point.

The image 96 is an image indicating a spatial frequency characteristic of the direction component signal W obtained by causing the low pass signal value Y"(i,j) to pass through the horizontal high pass filter unit 281-$h$ and the vertical high pass filter unit 281-$v$. The dots shown in the image 94 are not shown in a central portion of the image 96. This represents that the components of the passing band indicated by the image 95 among the spatial frequency components indicated by the image 94 has been extracted.

The image 97 is an image indicating a spatial frequency characteristic of the high frequency component value $NL_A$ obtained by inputting the direction component signal W to the non-linear operation unit 282-A. Here, unclear dots that are not shown in the image 96 and are unclear near the upper end and the lower ends are clearly shown in the image 97. This represents that a high frequency component for the direction vertical to the contour direction has been generated. The spatial frequency characteristic indicated by the image 91 corresponds to what the spatial frequency characteristic indicated by the image 97 and the spatial frequency characteristic indicated by the image 94 are complementary, and approximates to the spatial frequency characteristic of the image 89. Thus, in the present embodiment, it is proved that it is possible to sharpen an image while reducing noise by synthesizing the low pass signal value Y"(i,j) with the high frequency component value $NL_A$ and generating the high frequency extension signal value Z(i,j).

Next, an exemplary high frequency component generated through the non-linear operation will be described.

Here, an output frequency of an output value y obtained by executing a function f(x) for a sine wave of an input frequency serving as an input value x is illustrated.

Figure 39:
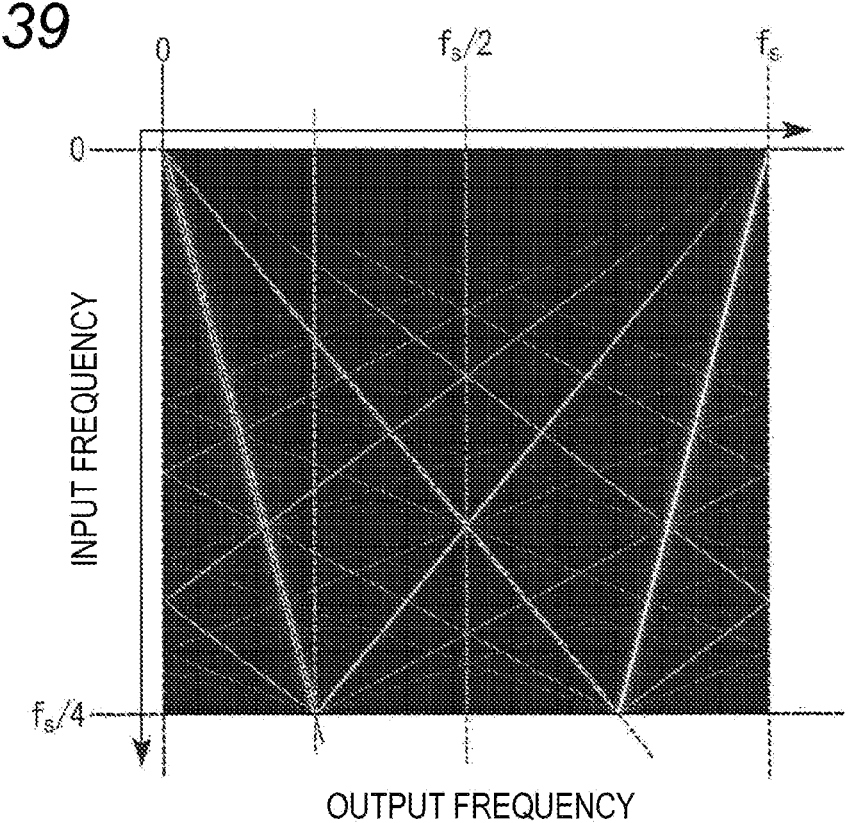
FIG. 39 is a diagram illustrating an exemplary output frequency by a non-linear operation.

FIG. 39 is a diagram illustrating an exemplary output frequency by a non-linear operation.

In FIG. 39, a vertical axis denotes an input frequency, and a horizontal axis denotes an output frequency. FIG. 39 illustrates an output frequency obtained by using the function $f(x)=\text{sgn}(x)|x|^2$ when the input frequency is changed from 0 to $f_s/4$. $f_s$ is a sampling frequency. In FIG. 39, the input frequency is a thick sold line, and a frequency of a component having the highest level among the output values is indicated by a thick dotted line. The thick dotted line represents that the output frequency changes from 0 to $3 \cdot f_s/4$ when the input frequency is changed from 0 to $f_s/4$. In other words, a triple harmonic that is three times as high as an input frequency is mainly output. Thus, it is represented that a high frequency component that is not included in the input value x is obtained by executing the function f(x) on the input value x.

Figure 40:
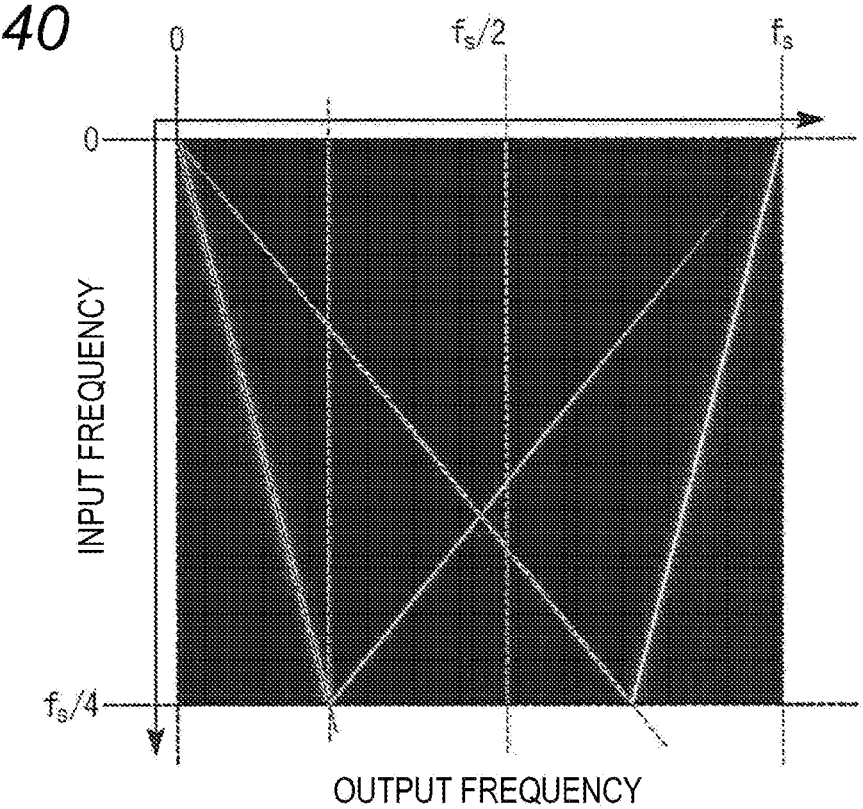
FIG. 40 is a diagram illustrating another exemplary output frequency by a non-linear operation.

FIG. 40 is a diagram illustrating another exemplary output frequency by a non-linear operation.

A vertical axis, a horizontal axis, and an input frequency of FIG. 40 are the same as in FIG. 39. Here, FIG. 40 illustrates an output frequency obtained using the function $f(x)=|x|^3$. In FIG. 40, an output frequency is indicated by a thick dotted line. The thick dotted line represents that the output frequency changes from 0 to $3 \cdot f_s/4$ when the input frequency is changed from 0 to $f_s/4$. Only a triple harmonic that is three times as high as an input frequency is output.

Similarly to the example illustrated in FIG. 39, a high frequency component that is not included in the input value x is obtained by executing the function f(x) on the input value x, but a component other than a triple harmonic is not output.

In the above embodiment, the antenna is not limited to a radio wave related to television broadcasting and may receive a radio wave related to public wireless communication.

The above description has proceeded under the assumption that a color system of a generated image signal is a YCbCr color system. When a generated image signal is indicated by a color system configured with signal values indicating brightness of respective colors (for example, an RGB color system), the image processing unit 20 may perform processing on signal values of respective colors.

In the above embodiment, by the contour direction estimating unit 21, the contour directions θ (before quantization) calculated for respective pixels may be averaged within an image block including a predetermined number (for example, 3 in the horizontal direction and 3 in the vertical direction, that is, a total of 9) of neighboring pixels centering on the pixel of interest. The contour direction estimating unit 21 quantizes the averaged contour direction. As a result, it is possible to smooth an error locally and notably occurring in the contour direction between pixels and reproduce a natural image as a whole.

In the above embodiment, in the differential filter, the range of the differential direction (the x direction) in which the filter coefficient $W_x(uy,vy)$ is 1 and the range of the differential direction in which the filter coefficient $W_x(u',v')$ is −1 may not be the same in the direction (the y direction) vertical to the differential direction. When the range of the differential direction in which the filter coefficient $W_x(u',v')$ is 1 and the range of the differential direction in which the filter coefficient $W_x(u',v')$ is −1 are symmetric with respect to u'=0, and v' is 0, it is preferable that the ranges be n or larger. For example, the range of the differential direction in which the filter coefficient $W_x(u',v')$ is 1 may be n when v'=0 and may be smaller than n when v'≠0.

Similarly, the range of the differential direction (the y direction) in which the filter coefficient $W_y(u',v')$ is 1 and the range of the differential direction in which the filter coefficient $W_y(u',v')$ is −1 may not be the same in the direction (the x direction) vertical to the differential direction. When the range of the differential direction in which the filter coefficient $W_y(u',v')$ is 1 and the range of the differential direction in which the filter coefficient $W_y(u',v')$ is −1 are symmetric with respect to v'=0, and u' is 0, it is preferable that the ranges be n or larger. For example, the range of the differential direction in which the filter coefficient $W_y(u',v')$ is 1 may be n when u'=0 and may be smaller than n when u'≠0.

In the above embodiment, some components of the display device 1, for example, the input unit 11, the scaling unit 13, the image format converting unit 14, and the image processing units 20, 30, and 40 may be implemented by a computer. In this case, a program for implementing this control function is recorded in a computer readable recording medium, and the program may be implemented such that the program recorded in the recording medium is read and executed by a computer system. Here, the "computer system" is assumed to be a computer system installed in the display device 1 and include an operating system (OS) and hardware such as a peripheral device. The "computer readable recording medium" refers to a storage device such as a flexible disk, a magneto optical disc, read only memory (ROM), a portable medium such as a CD-ROM, or a hard disk installed in a computer system. The "computer readable recording medium" may also include a medium holding a program dynamically during a short period of time such as a communication line when a program is transmitted via a network such as the Internet or a communication line such as a telephone line and a medium holding a program for a certain period of time such as a volatile memory in a computer system serving as a server or a client in this case. The program may implement some functions among the above-described functions and may implement the above-described functions in combination with a program previously stored in a computer system.

In the above embodiment, some or all components of the display device 1 may be implemented as integrated circuits (ICs) such as large scale integration (LSI). Each of the functional blocks of the display device 1 may be implemented as a processor, and all or some of the functional blocks may be integrated and implemented as a processor. An IC technique is not limited to the LSI, and implementation may be performed by a dedicated circuit or a general-purpose processor. Further, when an IC technique replacing the LSI is developed with the advance of semiconductor technology, an IC by such technique may be used.

One embodiment of the invention have been described above in detail with reference to the appended drawings, but a concrete constitution is not limited to the above embodiment, and various design changes or the like can be made within the scope not departing from the gist of the invention.

The invention claimed is:

1. An image processing device, comprising:
    a plurality of input terminals to which an input image signal is input;
    contour direction estimating circuitry that estimates a contour direction in which a signal value is a constant value for each of a plurality of pixels;
    a low pass filter that smoothes the signal value of a pixel of the plurality of pixels based on the signal value of each reference pixel serving as a pixel of a reference region according to the pixel and arranged in the contour direction of the pixel estimated by the contour direction estimating circuitry for each of the plurality of pixels; and
    parameter deciding circuitry that decides an intensity of smoothing by the low pass filter, wherein
    the parameter deciding circuitry decides the intensity of smoothing based on a type of the input terminal when a resolution of the input image signal is determined to be unique based on the type of the input terminal to which the input image signal is input among the plurality of input terminals, and
    the parameter deciding circuitry decides the intensity of smoothing based on a resolution ratio that is a ratio of resolution of an input image signal and resolution of an output image signal when the resolution of the input image signal is not determined to be unique based on the input terminal to which the input image signal is input among the plurality of input terminals.

2. The image processing device according to claim 1, further comprising:
    scaling circuitry that performs interpolation of the input image signal based on the resolution ratio, and outputs the resolution ratio to the parameter deciding circuitry.

3. The image processing device according claim 1, further comprising:
    high frequency expanding circuitry that generates a high frequency component of the signal value of the pixel for each of the plurality of pixels, and expands a frequency band for the signal value of the pixel, wherein the parameter deciding circuitry decides intensity of processing by the high frequency expanding circuitry based on the type of the input terminal when the resolution of the input image signal is determined to be unique based on the type of the input terminal to which the input image signal is input among the plurality of input terminals, and the parameter deciding circuitry decides the intensity of processing by the high frequency expanding circuit based on the resolution ratio when the resolution of the input image signal is not determined to be unique based on the input terminal to which the input image signal is input among the plurality of input terminals.

* * * * *